US008615797B2

(12) United States Patent
Levien et al.

(10) Patent No.: US 8,615,797 B2
(45) Date of Patent: *Dec. 24, 2013

(54) SELECTIVE ITEM ACCESS PROVISION IN RESPONSE TO ACTIVE ITEM ASCERTAINMENT UPON DEVICE TRANSFER

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Clarence T. Tegreene, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 96 days.

This patent is subject to a terminal disclaimer.

(21) Appl. No.: 13/199,286

(22) Filed: Aug. 23, 2011

(65) Prior Publication Data

US 2012/0254984 A1 Oct. 4, 2012

Related U.S. Application Data

(63) Continuation of application No. 13/199,237, filed on Aug. 22, 2011, and a continuation-in-part of application No. 13/065,885, filed on Mar. 30, 2011, and a continuation-in-part of application No. 13/065,964, filed on Mar. 31, 2011, and a continuation-in-part of application No. 13/066,848, filed on Apr. 25, 2011, now Pat. No. 8,402,535, and a continuation-in-part of application No. 13/066,917, filed on Apr. 26, 2011, now Pat. No. 8,347,399, and a continuation-in-part of application No. 13/135,314, filed on Jun. 29, 2011, and a continuation-in-part of application No. 13/135,392, filed on Jun. 30, 2011.

(51) Int. Cl.
*G06F 21/00* (2013.01)

(52) U.S. Cl.
USPC ............. 726/16; 726/1; 726/2; 726/3; 726/4; 726/17; 726/26; 726/27; 726/28; 726/29; 726/30; 713/164; 713/165; 713/166; 713/167; 713/182; 713/183; 713/184; 713/185; 713/186; 455/403; 455/404.2; 455/410; 455/411; 455/456.1; 455/456.2; 455/456.3; 455/463; 455/26.1

(58) Field of Classification Search
USPC .......... 726/1–4, 16–17, 26–30; 713/164–167, 713/182–186; 455/403–414.4, 456.1–460, 455/26.1, 410–411, 463
See application file for complete search history.

(56) References Cited

U.S. PATENT DOCUMENTS 6,002,427 A 12/1999 Kipust
7,200,248 B2 4/2007 Horiguchi
(Continued)

OTHER PUBLICATIONS

"Computer Detecting User Presence Video Mockup [Ubuntu]": Web Upd8.org; Bearing a date of Sep. 14, 2010; pp. 1-11; located at: http://www. webupd8.org/2010/09/computer-detecting-user-presence-video.html; printed on Mar. 30, 2011.

(Continued)

*Primary Examiner* — Madhuri Herzog

(57) ABSTRACT

A computationally implemented method includes, but is not limited to: determining that a computing device used by a first user has been transferred from the first user to a second user; ascertaining, in response to said determining, which of one or more items that are at least conditionally accessible through the computing device are active; and providing one or more selective levels of access to the one or more items based, at least in part, on said ascertaining. In addition to the foregoing, other method aspects are described in the claims, drawings, and text forming a part of the present disclosure.

47 Claims, 23 Drawing Sheets

(56) References Cited

U.S. PATENT DOCUMENTS

| | | | |
|---|---|---|---|
| 7,260,726 B1 | 8/2007 | Doe et al. | |
| 7,437,765 B2 | 10/2008 | Elms et al. | |
| 7,649,444 B1 | 1/2010 | Fear et al. | |
| 8,279,242 B2 | 10/2012 | Bentley | |
| 8,289,130 B2 | 10/2012 | Nakajima et al. | |
| 2002/0176603 A1 | 11/2002 | Bauer et al. | |
| 2003/0107584 A1 | 6/2003 | Clapper | |
| 2005/0039027 A1 | 2/2005 | Shapiro | |
| 2005/0149726 A1* | 7/2005 | Joshi et al. | 713/164 |
| 2006/0052132 A1 | 3/2006 | Naukkarinen et al. | |
| 2007/0005616 A1 | 1/2007 | Hay et al. | |
| 2007/0030824 A1 | 2/2007 | Ribaudo et al. | |
| 2007/0042714 A1 | 2/2007 | Ayed | |
| 2007/0052672 A1 | 3/2007 | Ritter et al. | |
| 2007/0118604 A1 | 5/2007 | Costa Requena | |
| 2007/0150827 A1 | 6/2007 | Singh et al. | |
| 2007/0162574 A1 | 7/2007 | Williamson et al. | |
| 2007/0174633 A1 | 7/2007 | Draper et al. | |
| 2007/0234209 A1 | 10/2007 | Williams | |
| 2007/0247425 A1* | 10/2007 | Liberty et al. | 345/158 |
| 2008/0159496 A1 | 7/2008 | Brown | |
| 2008/0201783 A1* | 8/2008 | Tamai | 726/28 |
| 2008/0233996 A1 | 9/2008 | Ogasawara et al. | |
| 2008/0266089 A1 | 10/2008 | Haren et al. | |
| 2008/0271109 A1* | 10/2008 | Singh et al. | 726/1 |
| 2009/0006962 A1 | 1/2009 | Ives et al. | |
| 2009/0015425 A1 | 1/2009 | Palmqvist et al. | |
| 2009/0179765 A1 | 7/2009 | Nymark et al. | |
| 2009/0210932 A1 | 8/2009 | Balakrishnan et al. | |
| 2009/0253410 A1 | 10/2009 | Fitzgerald et al. | |
| 2009/0292930 A1* | 11/2009 | Marano et al. | 713/189 |
| 2009/0297064 A1 | 12/2009 | Koziol et al. | |
| 2010/0053322 A1 | 3/2010 | Marti et al. | |
| 2010/0124363 A1 | 5/2010 | Ek et al. | |
| 2010/0157135 A1 | 6/2010 | Dossaji et al. | |
| 2010/0167783 A1 | 7/2010 | Alameh et al. | |
| 2010/0180210 A1 | 7/2010 | Toyama et al. | |
| 2010/0222141 A1 | 9/2010 | LaSalvia et al. | |
| 2010/0235667 A1 | 9/2010 | Mucignat et al. | |
| 2011/0025842 A1 | 2/2011 | King et al. | |
| 2011/0069940 A1 | 3/2011 | Shimy et al. | |
| 2011/0072452 A1 | 3/2011 | Shimy et al. | |
| 2011/0093806 A1 | 4/2011 | Cohen et al. | |
| 2011/0107427 A1 | 5/2011 | Cohen et al. | |
| 2011/0110557 A1 | 5/2011 | Clark et al. | |
| 2011/0133908 A1 | 6/2011 | Leung | |
| 2011/0141011 A1 | 6/2011 | Lashina et al. | |
| 2011/0166972 A1 | 7/2011 | Cohen et al. | |
| 2011/0197121 A1 | 8/2011 | Kletter | |
| 2011/0202269 A1 | 8/2011 | Reventlow | |
| 2011/0227856 A1 | 9/2011 | Corroy et al. | |
| 2011/0231911 A1 | 9/2011 | White et al. | |
| 2011/0265179 A1 | 10/2011 | Newman et al. | |
| 2011/0317872 A1 | 12/2011 | Free | |
| 2011/0321143 A1 | 12/2011 | Angaluri et al. | |
| 2012/0017147 A1 | 1/2012 | Mark | |
| 2012/0028625 A1 | 2/2012 | Konig | |
| 2012/0062729 A1 | 3/2012 | Hart et al. | |
| 2012/0081392 A1 | 4/2012 | Arthur | |
| 2012/0088543 A1 | 4/2012 | Lindner et al. | |
| 2012/0108215 A1 | 5/2012 | Kameli | |
| 2012/0151339 A1 | 6/2012 | Zhang et al. | |
| 2012/0166966 A1 | 6/2012 | Wood et al. | |
| 2012/0191764 A1 | 7/2012 | Leibu et al. | |
| 2012/0235790 A1 | 9/2012 | Zhao et al. | |
| 2012/0256967 A1 | 10/2012 | Baldwin et al. | |
| 2012/0293528 A1 | 11/2012 | Larsen | |
| 2012/0330660 A1 | 12/2012 | Jaiswal | |

OTHER PUBLICATIONS

"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the- chair-in-front-of-a-computer.

Pike, John; "Homeland Security: Biometrics"; GlobalSecurity.org; Bearing a date of Mar. 9, 2007; 4 Total pages; located at: http://www.globalsecurity.org/security/systems/biometrics.htm.

Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.

U.S. Appl. No. 13/374,479, Levien et al.
U.S. Appl. No. 13/374,352, Levien et al.
U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.

* cited by examiner

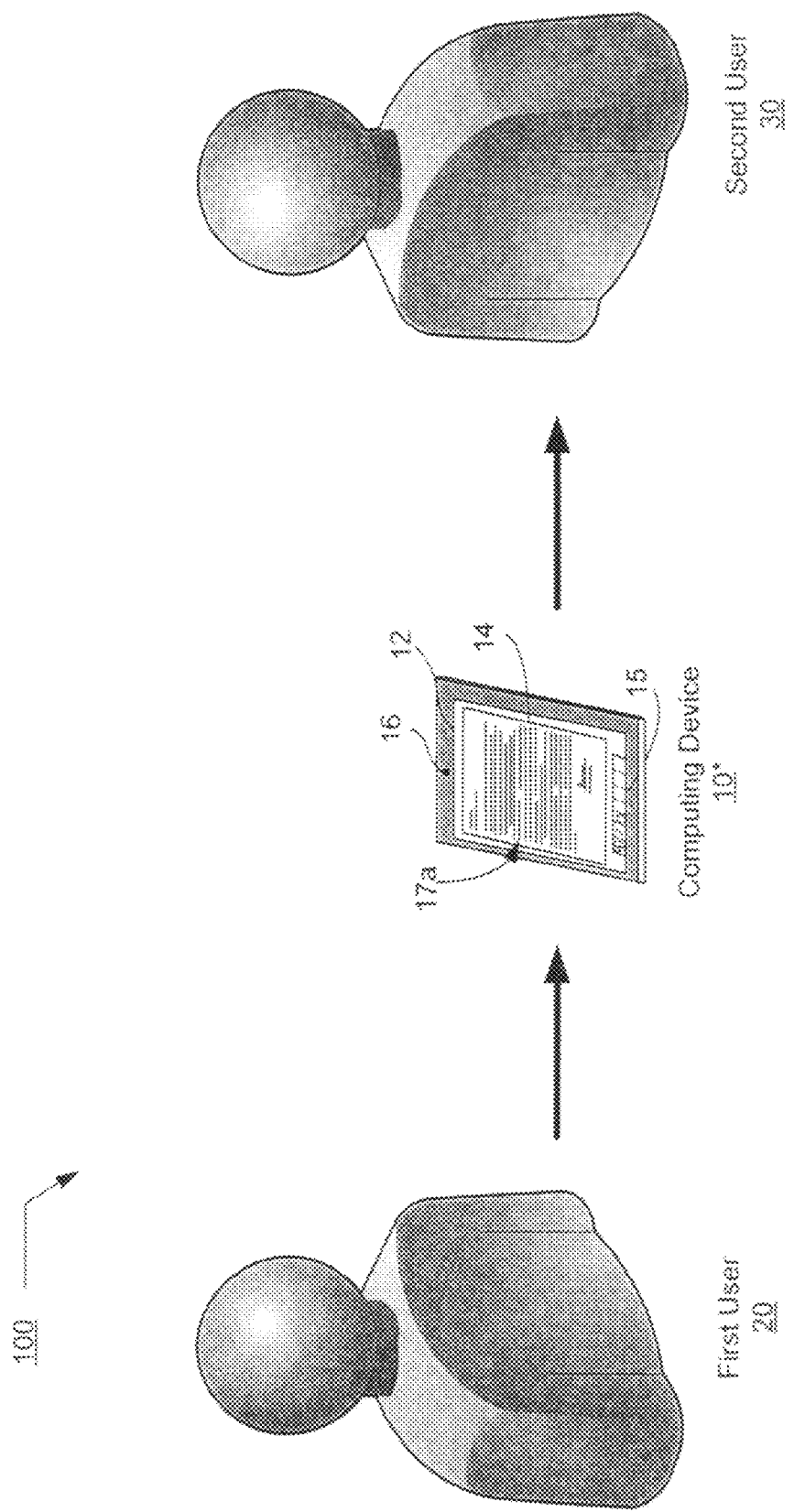

406 Providing one or more selective levels of access to the one or more items based, at least in part, on said ascertaining

778 Providing a plurality of selective levels of access to a plurality of items based, at least in part, on said ascertaining

779 Providing at least two selective levels of access to the plurality of items including at least a first level of access to a first one or more items and a second level of access to a second one or more items in response to said ascertaining, the first level of access being a greater extent of access than the second level of access

780 Providing the first level of access to the first one or more items and the second level of access to the second one or more items, the first one or more items being one or more items that were ascertained to be active and the second one or more items being one or more items that were ascertained not to be active

781 Providing the first level of access to the second one or more items and the second level of access to the first one or more items, the first one or more items including one or more items that are determined to be included in one or more folders that include the one or more items that were ascertained to be active

782 Providing the first level of access to the first one or more items and the second level of access to the second one or more items, the first one or more items including one or more items that are determined to be the same type of items as the one or more items that were ascertained to be active

783 Providing the first level of access to the first one or more items and the second level of access to the second one or more items, the first one or more items including one or more items that are determined to be associated with one or more third party entities that are associated with the one or more items that were ascertained to be active

784 Providing the first level of access to the first one or more items and the second level of access to the second one or more items, the first one or more items including one or more items that are determined to have been associated with one or more predefined time segments or points in time that are associated with the one or more items that were ascertained to be active

785 Providing the first level of access to the first one or more items and the second level of access to the second one or more items, the first one or more items including one or more items that are determined to have been associated with one or more predefined time segments or points in time that are associated with the one or more items that were ascertained to be active

FIG. 7b

SELECTIVE ITEM ACCESS PROVISION IN RESPONSE TO ACTIVE ITEM ASCERTAINMENT UPON DEVICE TRANSFER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation of U.S. patent application Ser. No. 13/199,237, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 22 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011 now U.S. Pat. No 8,402,535, which is currently or is an application of which a currently application is entitled to the benefit of the filing date.

For purposes of the USPTO extra-statutory requirements, the present application constitutes a continuation-in-part of U.S. patent application Ser. No. 13/066,917, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011 now U.S. Pat. No 8,347,399, which is currently or is an application of which a currently application is entitled to the benefit of the filing date.

For purposes of the USPTO extra-statutory requirements, the present application constitutes a continuation-in-part of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,392, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 30 Jun. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining that a computing device used by a first user has been transferred from the first user to a second user; ascertaining, in response to said determining, which of one or more items that are at least conditionally accessible through the computing device are active; and providing one or more selective levels of access to the one or more items based, at least in part, on said ascertaining. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining that a computing device used by a first user has been transferred from the first user to a second user; means for ascertaining, in response to said determining, which of one or more items that are at least conditionally accessible through the computing device are active; and means for providing one or more selective levels of access to the one or more items based, at least in part, on said ascertaining. In addition to the foregoing, other system aspects are described in the claims, drawings, and text forming a part of the present disclosure.

A computationally implemented system includes, but is not limited to: circuitry for determining that a computing device used by a first user has been transferred from the first user to a second user; circuitry for ascertaining, in response to said determining, which of one or more items that are at least conditionally accessible through the computing device are active; and circuitry for providing one or more selective levels of access to the one or more items based, at least in part, on said ascertaining. In addition to the foregoing, other system aspects are described in the claims, drawings, and text forming a part of the present disclosure.

A computer program product comprising an article of manufacture bearing one or more instructions for determining that a computing device used by a first user has been transferred from the first user to a second user; one or more instructions for ascertaining, in response to said determining, which of one or more items that are at least conditionally accessible through the computing device are active; and one or more instructions for providing one or more selective levels of access to the one or more items based, at least in part, on said ascertaining. In addition to the foregoing, other computer program product aspects are described in the claims, drawings, and text forming a part of the present disclosure.

A method for providing selective access to one or more items through a computing device, the method includes determining that a computing device used by a first user has been transferred from the first user to a second user, wherein said determining that a computing device used by a first user has been transferred from the first user to a second user is performed via at least one of a machine, article of manufacture, or composition of matter; ascertaining, in response to said determining, which of one or more items that are at least conditionally accessible through the computing device are active; and providing one or more selective levels of access to the one or more items based, at least in part, on said ascertaining.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 shows a computing device 10* being transferred between two users in an exemplary environment 100.

FIG. 7b is a high-level logic flowchart of a process depicting alternate implementations of the access providing operation 406 of FIG. 4.

DETAILED DESCRIPTION

Figure 2A:
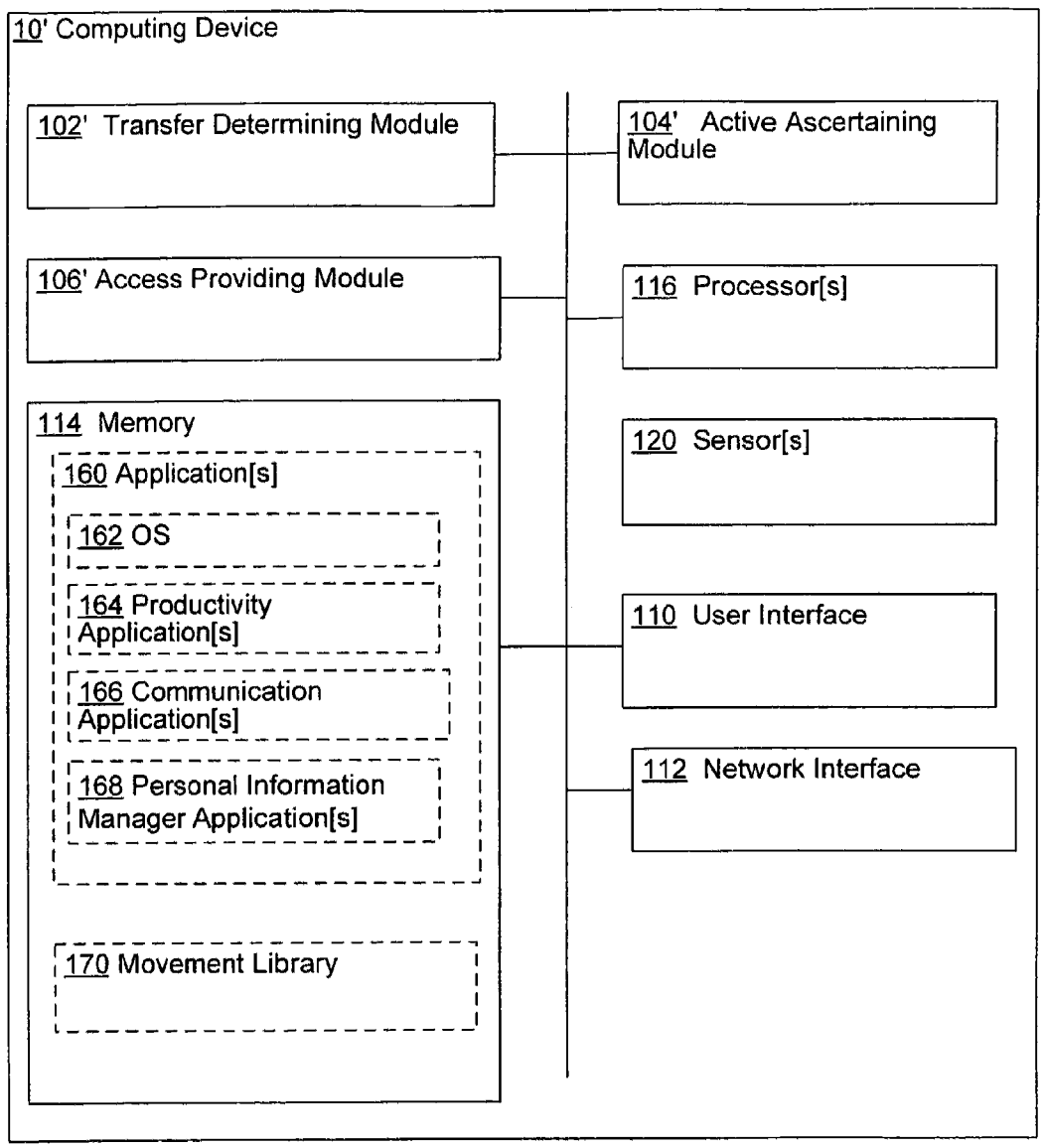
FIG. 2a shows a particular implementation of the computing device 10* of FIG. 1 illustrated as computing device 10'.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have resulted in the development of computing devices having increasingly smaller and smaller form factors while still maintaining exceptional processing capabilities. Examples of such computing devices include, for example, laptops, Netbooks, tablet computers (i.e., "slate" computers), e-readers, Smartphones, and so forth. Because of their compactness, such devices are becoming much easier to share among a plurality of users. That is, because of their small form factors, such devices allow users of such devices to easily pass or handoff their devices for others to use in order to access various items (e.g., documents, files, applications, and so forth). For example, suppose a primary user (e.g., an owner) of a tablet computer wants to show an electronic document that is being displayed through his/her tablet computer to a friend sitting across a table from the primary user. Typically, in order to show the electronic document that is being displayed through the tablet computer to the friend, the primary user may simply pass or handover the tablet computer to the friend thereby allowing the friend to view the electronic document.

Unfortunately by doing so, the primary user's friend, in addition to having access to the electronic document, may have access to many other things that the primary user may not want the friend to have access to. For example, upon being handed the tablet computer from the primary user, the friend may be able to view any confidential documents, images, applications, websites, passwords, and so forth, that may be open or running at the time that the tablet computer was handed over to the friend. Even worse, the primary user's friend may be able to not just access open applications and content, but may be able to retrieve/use/modify any content (e.g., documents, image files, audio files, etc.) or applications that may be accessible through the tablet computer (e.g., stored in the tablet computer or stored on a network and available via the tablet computer).

In accordance with various embodiments, computationally implemented methods, systems, and articles of manufacture are provided that can determine whether a computing device used by a first user has been transferred from the first user to a second user; ascertain, in response to such a determination, which of one or more items (e.g., documents, files, image or audio files, applications, passwords, and so forth) that are at least conditionally accessible through the computing device are active (e.g. being used, open, running, and so forth); and provide (e.g., audibly and/or visually presenting) one or more selective levels of access (e.g., full, partial, and/or no access) to the one or more items based, at least in part, on said ascertaining. In some cases, such methods, systems, and articles of manufactures may prevent a third party from accessing (e.g., visual and/or audio access, editorial access, functional access, etc.) through a computing device that is being transferred or has been transferred from, for example, a primary user to the third party, those items that are unrelated to the items that were being presented through the computing device when the computing device was being transferred from the primary user to the third parties. In various embodiments, such computationally implemented methods, systems, and articles of manufacture may be implemented at the computing device.

Referring now to FIG. 1 illustrating a computing device 10* in an exemplary environment 100 being transferred between two users. As will be further described herein the illustrated computing device 10* may employ the computationally implemented methods, systems, and articles of manufacture in accordance with various embodiments. The computing device 10*, in various embodiments, may be endowed with logic that is designed to determine that the computing device 10* is being transferred (e.g., handed or passed-off) from a first user 20 to a second user 30, and in response to such a determination, automatically ascertain which of one or more items (e.g., electronic documents, image or audio files, passwords, applications, and so forth) that are conditionally accessible through the computing device 10* are active items (e.g., items that are being used, displayed, running, etc. through the computing device 10*). In various embodiments, an item may be "conditionally accessible" through a computing device 10* if, for example, the item is available through the computing device 10* when certain conditions exists such as when a first user 20 (e.g., a primary user or a user with superior access rights to the computing device 10* or to the items accessed through the computing device 10*) has logged on to the computing device 10* or is using the computing device 10*.

Upon determining which of the one or more conditionally accessible items are active items, the computing device 10* may be further endowed with logic to provide one or more selective levels of access (e.g., full, partial, or no access) to the one or more items based, at least in part, on said ascertaining. In some cases, the first user 20 may be the primary user, such as the owner, of the computing device 10*, and the second user 30 may be a third party who may have inferior access rights to the computing device 10* or to items (e.g., documents, images, applications, etc.) stored in the computing device 10*. Alternatively, the first user 20 may be any user having superior accessing rights to the computing device 10* than a third party (e.g., second user 30).

Figure 2B:
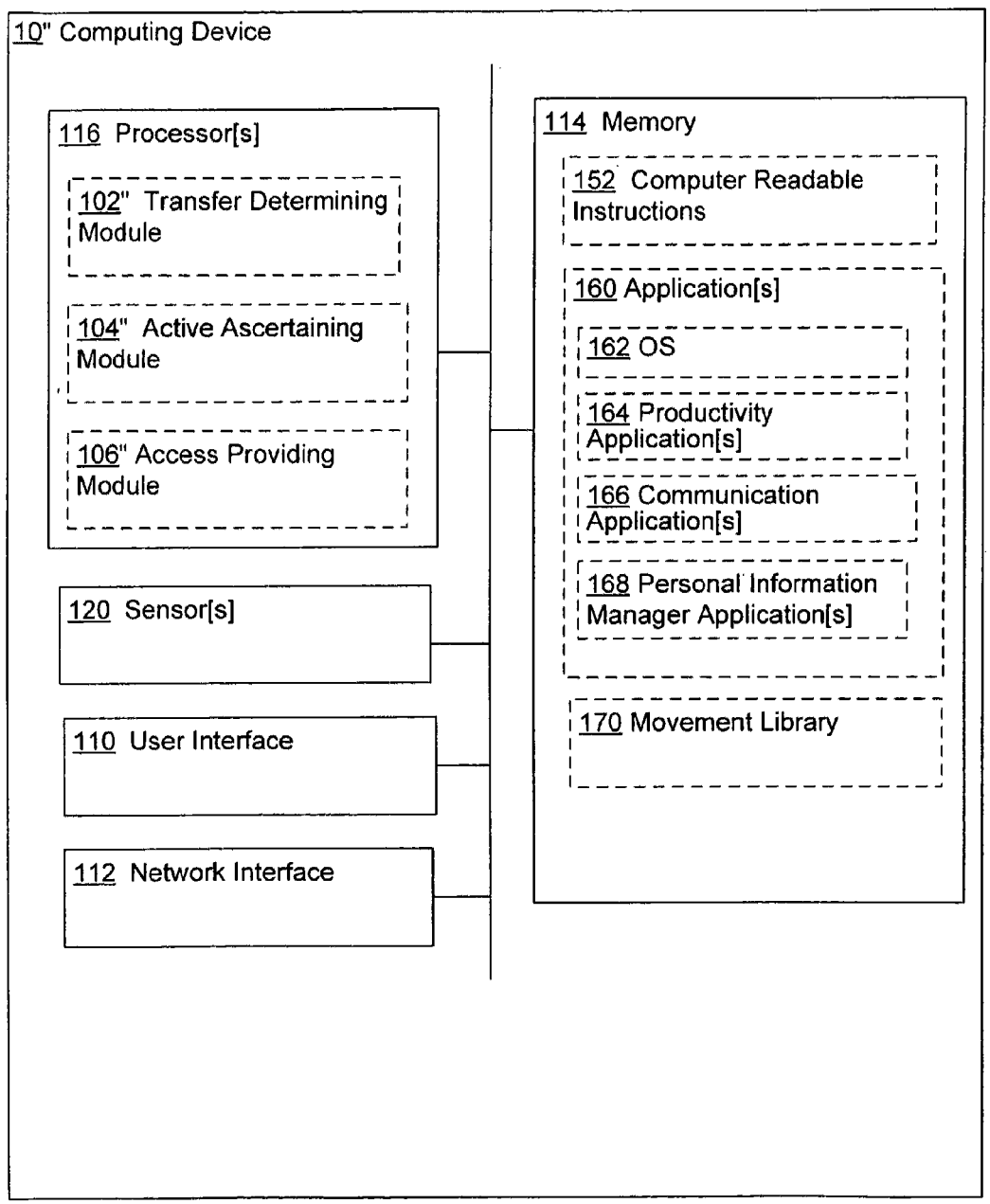
FIG. 2b shows another implementation of the computing device 10* of FIG. 1 illustrated as computing device 10".

Turning now to FIGS. 2a and 2b, which illustrate two different implementations of the computing device 10* of FIG. 1. For example, the computing device 10* of FIG. 1 is illustrated in FIG. 2a as computing device 10' and in FIG. 2b as computing device 10". Note that for purposes of the following, "*" represents a wildcard. Thus, references in the following to the "computing device 10*" may be in reference to the computing device 10* of FIG. 1, to the computing device 10' of FIG. 2a, or to the computing device 10" of FIG. 2b.

Although the computing device 10* illustrated in FIG. 1 is depicted as being a tablet computer, in alternative embodiments, the computationally implemented methods, systems, and articles of manufacture in accordance with various embodiments may be embodied in other types of computer systems having other form factors including form factors of other types of portable computer devices such as, for example, laptops, Netbooks, Smartphones, e-readers, and so forth. As illustrated, the computing device 10* includes a display 12, such as a touchscreen, on the front side 17a of the computing device 10*. As further depicted in FIG. 1, the display 12 displaying an exemplary item in the form of a document 14, and a tool bar 15. As further depicted, the computing device 10* may also include a camera 16 (e.g., a webcam) disposed on the front side 17a of the computing device 10*. In some embodiments, additional cameras may be included on the front side 17a and/or backside 17b (see, for example, FIGS. 3a-3d) of the computing device 10*.

There are a number of ways to determine whether a computing device 10* is or has been transferred from one user to another user. In some cases, for instance, various sensor-provided data may be collected in order to make such a determination. Such data may indicate various environmental aspects surrounding the computing device 10* and/or aspects of the computing device 10* itself (e.g., movements displayed by the computing device 10* as a result of being in contact with one or more users). For example, when the computing device 10* of FIG. 1 is passed from, for example, the first user 20 (e.g., a primary user such as an owner or anyone with superior access rights to the computing device 10* or to one or more items through the computing device 10*) to a second user 30, the first user 20 may exhibit certain gestures that may at least infer that the computing device 10* is being transferred from the first user 20 to another user (e.g., a second user 30). Such gestures may include, for example, the first user 20 extending his/her arms out with the computing device 10* in one or both hands (e.g., as if to offer the computing device 10* to the second user 30); the first user 20 passing the computing device 10* from one hand to another hand, and extending the second hand with the computing device 10* out and away from the first user 20; the first user 20 rotating the computing device 10* around using his/her hands so that the front side 17a of the computing device 10* faces away from the first user 20 and faces the second user 30, who is standing or sitting across from the first user 20, and so forth. These movements or gestures made by the first user 20, when detected, may infer that the transfer (e.g., change in possession) of the computing device 10* from a first user 20 to a second user 30 has occurred.

One way to track the movements or gestures of the first user 20 is to track the movements of the computing device 10*. That is, these gestures that may be exhibited by the first user 20 during the transfer of a computing device 10* from the first user 20 to the second user 30 may cause the computing device 10* to be spatially moved in particular ways. Thus, in order to detect whether a computing device 10* is being transferred from a first user 20 to a second user 30, one may observe the spatial movements of the computing device 10* in order to detect signature movements that when detected at least infer the transfer of the computing device 10* between the first user 20 and the second user 30. For example, the computing device 10* may maintain in its memory 114 (see FIGS. 2a and 2b) a movement library 170 (see FIGS. 2a and 2b), which is a catalog or library that identifies those signature spatial movements that when detected as occurring at least infers (e.g., implies) that a transfer of the computing device 10* has occurred between two users (e.g., first user 20 and second user 30).

One way to monitor for such movements of the computing device 10* is to directly detect such movements using one or more "movement" sensors that are designed to directly detect/measure spatial movements. Examples of such movement sensors include, for example, inertia sensors, accelerometers (e.g. three-axis or 3D accelerometers), gyroscopes, and so forth. These sensors (herein "movement" sensors 202—see FIG. 2f which illustrates the one or more types of sensors 120 that may be included in the computing device 10 of FIG. 1) when integrated with a computing device 10* may be used to directly detect the actual spatial movements/motions of the computing device 10* as the computing device 10* is being transferred from, for example, a first user 20 to a second user 30.

Since not all movements of the computing device 10* that may be detected will be as a result of the computing device 10* being transferred between two users, in various embodiments and as will be further described herein, the computing device 10* may be endowed with particular logic for determining (e.g., identifying) which movements associated with the computing device 10* that have been detected indicates or at least infers that the computing device 10* is or has been transferred from, for example, a first user 20 to a second user 30 and which detected movements may merely be "noise movements."

Various types of movements of the computing device 10* may be tracked in order to determine or at least infer that the computing device 10* is being transferred between, for example, a first user 20 and a second user 30. Examples of the types of movements that may be tracked include, for example, the overall three-dimensional movements of the computing device 10*, or specific types of movements including tilt type movements, spin-rotation type movements, spatial relocation type movements, vibration movements, and so forth of the computing device 10*. In order to determine or at least infer that the computing device 10* has been transferred from a first user 20 to a second user 30, these movements of the computing device 10* may be, individually or in combination, tracked using one or more sensors 120 that may be included with the computing device 10* as illustrated in FIG. 2f. For example, in various embodiments, one or more movement sensors 202 (e.g., inertia devices, accelerometers, etc.) that can directly detect movements, and/or other types of sensors 120 (e.g., image capturing devices 204, audio capturing devices 206, etc.) that may be able to indirectly detect movements may be employed in order to track the movements of the computing device 10* as will be further described herein.

Figure 3A:
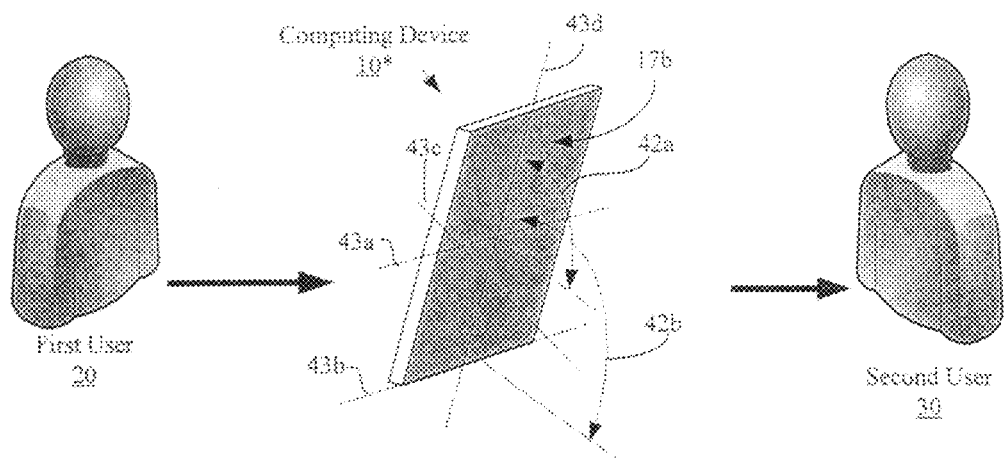
FIG. 3a shows one type of movement that may be detected/monitored by the computing device 10* of FIGS. 2a and 2b.

Referring now to FIG. 3a illustrating various types of tilts and tilt movements of the computing device 10* that may be detected and monitored using one or more sensors 120 (e.g., one or more movement sensors 202) in order to, for example, determine or infer that the computing device 10* has been transferred from a first user 20 to a second user 30 in accordance with various embodiments. That is, FIG. 3a shows the backside 17b of the computing device 10* and some of the tilt-type movements that may be monitored by the computing device 10* in order to, for example, determine whether the computing device 10* has been transferred from a first user 20, such as a primary user of the computing device 10*, to a second user 30, such as a third party (e.g., a friend or co-worker of the primary user) who may have at least a lower access rights to the computing device 10* than the first user 20. Note that for ease of illustration and understanding the computing device 10* in FIG. 3a (as well as in FIGS. 3b, 3c, and 3d) is not drawn to scale at least with respect to the first user 20 and the second user 30.

One type of tilt that may be detected/monitored is tilt 42a of the computing device 10* that may occur when the computing device 10* is at least partially rotated around a central horizontal axis 43a. A second type of tilt that may be detected is tilt 42b, which may occur when the computing device 10* is at least partially rotated around a bottom horizontal axis 43b. Although not depicted, another type of tilt that may occur and that may be monitored is when the computing device 10* is at least partially rotated around an angular axis 43c that is angular with respect to a horizontal axis (e.g., axis 43a or 43b) and is parallel to the plane of the backside 17b similar to axis 43a and axis 43b. Yet another type of tilt that may occur and that may also be monitored is when the computing device 10* is at least partially rotated around a vertical axis 43d. Note that although the vertical axis 43d is depicted as being centered along the backside 17b of the computing device 10*, just like the horizontal axis 43b, the vertical axis 43d does not have to be centered on the backside 17b and instead, may be offset from the center of the backside 17b of the computing device 10*(e.g., may be closer to one end of the device rather than an opposite end of the device). Although only a few types of tilts were illustrated in FIG. 3a, those of ordinary skill in the art will recognize that other types of tilts or tilt movements of the computing device 10* may alternatively or additionally be monitored in various alternative implementations in order to determine whether the computing device 10* has been transferred between two users.

By detecting that the computing device 10* has been tilted in a particular manner from a first tilt orientation to a second tilt orientation, a determination or an inference may be made that the computing device 10* has been transferred from the first user 20 to the second user 30. In particular, when the first user 20 is handing off or transferring the computing device 10* to the second user 30, the first user 20 may tilt the computing device 10* in a particular way that may be identifiable. Thus, when the computing device 10* is being transferred from a first user 20 to a second user 30, the computing device 10*(or rather the logic endowed with the computing device 10*) may track the movements of the computing device 10* as it moves from a first tilt orientation (e.g., the tilt of the computing device 10* at the beginning of the transfer or when the first user 20 was using the computing device 10*) to a second tilt orientation (e.g., the tilt of the computing device 10* at the end of the transfer or when the second user 30, for example, has obtained possession of the computing device 10*).

In order to make a determination or inference that a transfer was made from the first user 20 to the second user 30, the computing device 10* or at least the logic endowed in the computing device 10* may examine the particular movements of the computing device 10*(e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to determine or infer that the computing device 10* has been transferred. To further determine or at least infer that the computing device 10* has been transferred from the first user 20 to the second user 30, the examination/analysis of the detected tilt movements of the computing device 10* may involve comparing the detected tilt movements of the computing device 10* with catalogued or library tilt movements (which may be stored in the memory 114 of the computing device 10) that are identified as being movements associated with transfer of the computing device 10* between two users.

That is, the computing device 10* may maintain in its memory 114 (see FIGS. 2A and 2B) a movement library 170 that may include a catalogue or library of movements including signature tilt movements that have been previously identified as tilt movements that may occur when, for example, a computing device 10* is transferred between two users (e.g., first user 20 and second user 30). Thus, when tilt movements that match with catalogued or library tilt movements (e.g., signature tilt movements) have been detected, then a determination or inference may be made that a transfer of the computing device 10* between two users has occurred. Note that the above discussed tilt movements relates to the movement of the computing device 10* as it moves from a first tilt orientation to a second tilt orientation.

Thus, another aspect of tilt orientation changes that may be considered in order to determine or infer that a transfer has taken place is to simply look at the end points of the tilt reorientation and their differences. In other words, to analyze the first tilt orientation (e.g., the tilt orientation of the computing device 10* before the computing device 10* being reoriented) and the second tilt orientation (e.g., the end tilt orientation of the computing device 10* after it has been reoriented) with respect to each other, and the differences between the first tilt orientation and the second tilt orientation. Thus, in some embodiments, the computing device 10* may also or additionally maintain a catalogue or library of changes of tilt orientation (e.g., tilt orientation changes) that have been previously identified as tilt changes that occur when, for example, a computing device 10* is transferred between two users. Such catalogue or library of tilt orientation changes may be stored as part of a movement library 170 stored in memory 114 (see FIGS. 2a and 2b) of the computing device 10* of FIG. 1 (e.g., the computing device 10' of FIG. 2a or the computing device 10" of FIG. 2b). Therefore, when tilt orientation changes that match with catalogued or library tilt orientation changes (e.g., as stored in the movement library 170 of the memory 114) have been detected, then at least an inference may be made that a transfer of the computing device 10* between two users has occurred.

Figure 3B:
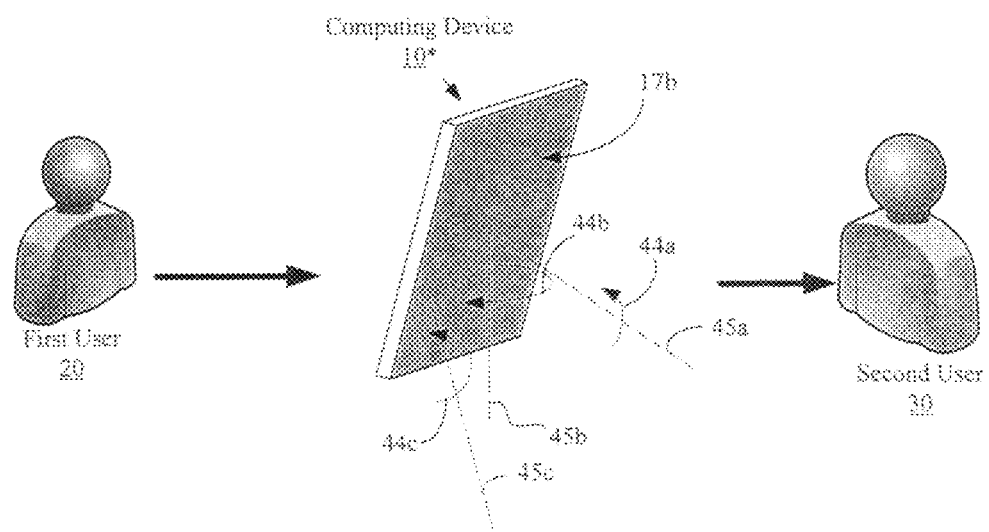
FIG. 3b shows another type of movement that may be detected/monitored by the computing device 10* of FIGS. 2a and 2b.

Referring now to FIG. 3b illustrating another type of movement of the computing device 10* that may be detected/monitored in order to determine or infer that the computing device 10* has been transferred between two users. In particular, FIG. 3b shows a couple types of spin rotation and spin rotation movements of the computing device 10* that may be detected/monitored using one or more sensors 120 (e.g., one or more movement sensors 202) in order to determine or infer that a transfer of the computing device 10* has occurred between at least two users. Note that this type of rotation (e.g., spin rotation) is different from the type of rotation associated with the previously described tilt movement where the "tilt" rotation involves the entire backside 17b of the computing device 10* rotating around some axis in a sweeping motion. In a spin rotation, the backside 17b (or the front side 17a) of the computing device 10* substantially spins around an axis without the sweeping motion. Referring back to FIG. 3b, which shows some of the various types of spin rotations that may be detected/monitored by the computing device 10* in order to, for example, determine whether the computing device 10* has been transferred from a first user 20, such as a primary user of the computing device 10*, to a second user 30, such as a third party who may have inferior access rights to the computing device 10 than the first user 20. Examples of the type of spin rotations that may be monitored include a spin rotation 44a of the computing device 10* that occurs when the computing device 10* is rotated around a center axis 45a that is centered and vertical to the backside 17b of the computing device 10*. Another type of rotation that may be monitored is a spin rotation 44b of the computing device 10* that occurs when the computing device 10* is rotated around a center axis 45b that may be centered but not vertical to the backside 17B of the computing device 10*. Instead, the center axis 45b is angular to the backside 17b of the computing device 10* such that when the computing device 10* is rotating around the center axis 45b, the computing device 10* will have a constant tilt with respect to the center axis 45b. Another type of rotation that may be monitored is spin rotation 44c of the computing device 10* that may occur when the computing device 10* is rotated around an axis 45c that may not be centered on the backside 17B of the computing device 10* and that may not be vertical to the backside 17B of the computing device 10*.

By detecting that the computing device 10* has been spin rotated in a particular manner, a determination or an inference may be made that the computing device 10* has been transferred from the first user 20 to the second user 30. In particular, when the first user 20 is handing off or transferring the computing device 10* to the second user 30, the first user 20 may spin rotate the computing device 10* in a particular way. Thus, when the computing device 10* is being transferred from a first user 20 to a second user 30, the computing device 10*(or rather the logic endowed with the computing device 10*) may track the movements of the computing device 10* as it moves from a first spin orientation (e.g., the orientation of the computing device 10* at the beginning of the transfer or when the first user 20 was using the computing device 10*) to a second spin orientation (e.g., the orientation of the computing device 10* at the end of the transfer or when the second user 30 has obtained possession of the computing device 10*).

Similar to the tilt or tilt movement detection/analysis described earlier, in order to make a determination or inference that a transfer was made from the first user 20 to the second user 30, the computing device 10* or at least the logic endowed in the computing device 10* may scrutinize the particular movements of the computing device 10* as the computing device 10* spin rotates from a first orientation to a second orientation. The computing device 10* may additionally or alternatively analyze the second orientation (e.g., the orientation of the computing device 10* after it has finished being spin rotated) at least with respect to the first orientation (e.g., the orientation of the computing device 10* before it was spin rotated) in order to determine or at least infer that the computing device 10* has been transferred.

To further determine or at least infer that the computing device 10* has been transferred from the first user 20 to the second user 30, the examination/analysis of the detected spin rotation of the computing device 10* from the first orientation to the second orientation may involve comparing the detected spin rotation movement of the computing device 10* with catalogued or library spin rotation movements that are identified as being associated with transfer of the computing device 10*. That is, the computing device 10* may maintain in its memory 114 (see FIGS. 2a and 2b) a movement library 170 that may include a catalogue or library of movements including signature spin rotation movements that when detected as occurring may infer that a transfer of the computing device 10* between two users has occurred.

Figure 3C:
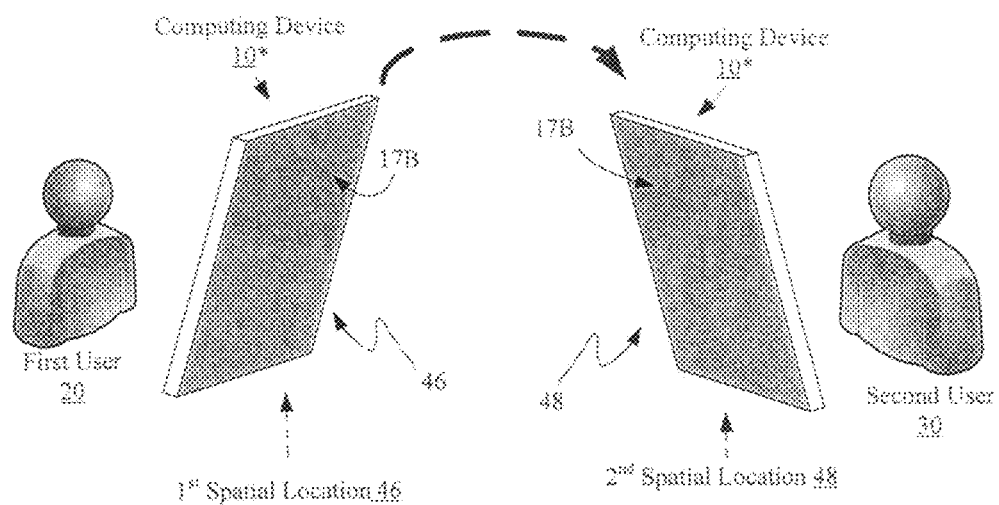
FIG. 3c shows another type of movement that may be detected/monitored by the computing device 10* of FIGS. 2a and 2b.

Turning now to FIG. 3c illustrating yet another type of movement of the computing device 10* that may be detected/monitored in order to determine or infer that the computing device 10* has been transferred between two users. In particular, FIG. 3c shows the computing device 10* being relocated by moving from a first spatial location 46 to a second spatial location 48 when the computing device 10* is transferred from a first user 20 to a second user 30. In various embodiments, such movements from the first spatial location 46 to the second spatial location 48, which will be referred to herein as "spatial relocation movements," may be detected using one or more sensors 120 (e.g., one or more movement sensors 202). In order to make a determination or inference that a transfer was made from the first user 20 to the second user 30, the computing device 10* or at least the logic endowed in the computing device 10* may examine/analyze the particular spatial relocation movements of the computing device 10 as it moves from the first spatial location 46 to the second spatial location 48, and to compare the pattern of spatial relocation movements (e.g., path, speed, acceleration, and so forth) with those catalogued or library signature spatial movements stored in a movement library 170 that when detected as occurring at least infers that the computing device 10* has been transferred between at least two users (e.g., between a first user 20 and a second user 30).

In some cases, the computing device 10*(or rather the logic endowed with the computing device 10*) may additionally or alternatively analyze the second spatial location 48 with respect to the first spatial location 46 in order to determine or at least infer that the computing device 10* has been transferred from the first user 20 to the second user 30. To further determine or infer that the computing device 10* has been transferred from the first user 20 to the second user 30, the examination/analysis of the detected spatial relocation movements of the computing device 10* may be compared with catalogued or library signature spatial relocation movements that have been identified as being associated with the transfer of the computing device 10* between two users. That is, the computing device 10* may maintain in its memory 114 (see FIGS. 2a and 2b) a movement library 170 that may include a catalogue or library of movements including signature spatial movements that when detected as occurring may infer that a transfer of the computing device 10* between two users has occurred.

In some embodiments, in order to determine or at least infer that the computing device 10* has been transferred from the first user 20 to the second user 30, the computing device 10* may be endowed with logic that detects/monitors vibrations. That is, each user who may come in contact with the computing device 10* may pass on to the computing device 10* unique vibration pattern or signature (e.g., as a result of the heartbeat of the "touching" user). Thus, when the first user 20 is holding the computing device 10*, the computing device 10* may vibrate in a particular vibration pattern that is associated with the first user 20. In contrast, when the computing device 10* has been transferred to the second user 30 and the second user 30 is holding the computing device 10*, the computing device 10* may vibrate in a manner that is associated with the second user 30. Thus, one way to determine whether the computing device 10* has been transferred from the first user 20 to the second user 30 is to detect/monitor at least changes in vibrations of the computing device 10*. In some cases, this may involve the computing device 10*(or at least the logic endowed with the computing device 10*) initially detecting the particular vibration pattern of the computing device 10* when the computing device 10* is being used by the first user 20, and to detect when the computing device 10* no longer vibrates in such a particular vibration pattern. In order to determine whether the computing device 10* has been transferred from the first user 20 to the second user 30, in some cases, the computing device 10* may be further designed to determine that the computing device 10* is vibrating in a way that matches with a vibration pattern of the second user 30. By making such a determination, an inference may be made that the computing device 10* is being held or is in contact with the second user 30.

In some embodiments, the computing device 10* may include logic that is designed to determine whether the computing device 10 has moved away from the first user 20 in order to determine whether the computing device 10* has been transferred from the first user 20 to the second user 30. That is, by making such a determination, an inference may be made that the computing device 10* has been transferred from the first user 20 to the second user 30. In some embodiments, in order to make such a determination, data from a combination of sensors 120 may be processed and analyzed. That is, in order to determine whether the computing device 10 has moved away from the first user 20, a combination of one or more movement sensors 202 (see FIG. 2f) for directly detecting movements of the computing device 10*, one or more image capturing devices 204 (e.g., webcam or digital camera), and/or one or more audio capturing devices 206 (e.g., microphones) may be employed in order to determine whether the computing device 10* is moving away from the first user 20 (and thus, an inference that the computing device 10* has been transferred to the second user 30). For example, the computing device 10* in some cases may employ one or more movement sensors 202 to detect the actual movements of the computing device 10* and one or more image capturing devices 204 (along with facial recognition system/application) to determine that a face associated with the first user 20 is moving away from the computing device 10*. Based on the data provided by both the movement sensors 202 and the image capturing devices 204, at least an inference may be made that the computing device 10* has moved away from the first user 20*.

Figure 3D:
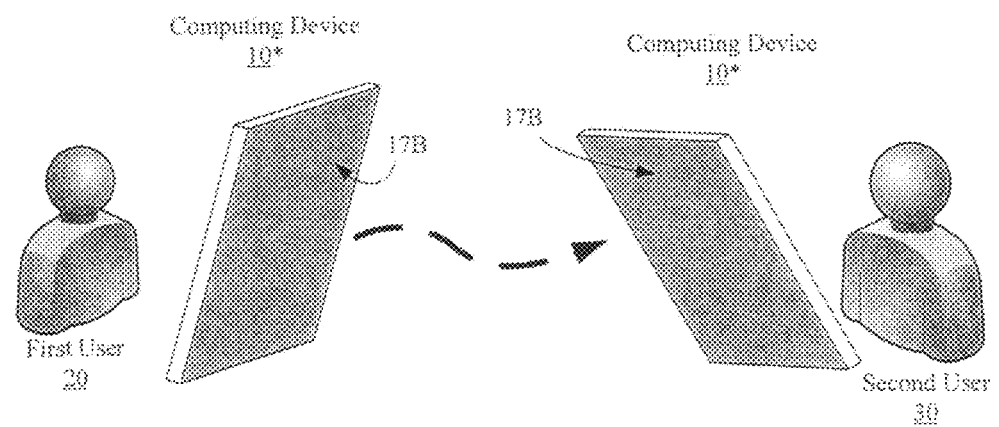
FIG. 3d shows overall 3-dimensional movements of the computing device 10* of FIGS. 2a and 2b that may be detected/monitored by the computing device 10*.

In some embodiments, and as illustrated in FIG. 3d, rather than only detecting/monitoring for a particular type of movement (e.g., tilt-type movements, spin rotation movements, spatial relocation movements, vibration movements, and so forth) the computing device 10* may be endowed with logic that is designed to detect/monitor the overall three-dimensional movements of the computing device 10* and to determine whether the computing device 10* has moved in a particular three-dimensional way that infers that the computing device 10* has been transferred from the first user 20 to the second user 30. In order to accomplish this, the computing device 10 may maintain in its memory 114 (see FIGS. 2a and 2b) a movement library 170 that may include a catalogue or library of movements including signature three-dimensional movements that when detected as occurring may infer at least that a transfer of the computing device 10* between two users has occurred.

As described briefly above, in addition to directly detecting the movements of the computing device 10* using movement sensors 202 (e.g., inertia sensors, accelerometers, gyroscopes, and so forth), other types of environmental aspects may be detected/monitored in order to determine whether the computing device 10* has been transferred from a first user 20 to a second user 30. For instance, in some embodiments, the computing device 10* or the logic endowed with the computing device 10* may be designed to detect, using one or more image capturing devices 204, certain visual cues that when detected at least infers the transfer of the computing device 10* from a first user 20 to a second user 30. For example, in some embodiments, the computing device 10* may be endowed with logic that at least detects, via one or more image capturing devices 204, changes in lighting in the proximate vicinity of the computing device 10*. That is, generally when an object is moved from one spatial location to another spatial location, as in the case of a computing device 10* being transferred between two users, the object will be exposed to changes in lighting conditions. Thus, by merely detecting changes in lighting conditions of the computing device 10*, at least an inference may be made that the computing device 10* is being transferred between users.

Alternatively or additionally, in some embodiments, the computing device 10* may be endowed with a facial recognition system (e.g., facial recognition software) that when employed with one or more image capturing devices 204 may be used in order to determine the presence or absence of a face associated with the first user 20 or the second user 30 within the proximate vicinity of the computing device 10*. If the face associated with the first user 20 is not detected in the proximate vicinity of the computing device 10* and/or if a face not associated with the first user 20 is detected in the proximate vicinity of the computing device 10*, such as the face of the second user 30, then a determination or at least an inference may be made by the computing device 10*or by the endowed logic of the computing device 10* that a transfer of the computing device 10* from the first user 20 to the second user 30 may have occurred. The phrase "proximate vicinity" as used here is in reference to the immediate area surrounding the computing device 10* or within a distance from the computing device 10* from which an object or a person is visually (or audibly) discernable or identifiable by the computing device 10* using, for example, a facial recognition system (or a voice verification/recognition system).

In some cases, an inference that the computing device 10* has been transferred from the first user 20 to the second user 30 will not be made until the computing device 10*(or at least the logic endowed with the computing device 10*) determines that the face of a person other than the first user 20 is detected as being in the proximate vicinity of the computing device 10* and is detected as being located at one or more specified locations relative to the specific orientation of the computing device 10*. For example, in some cases, the inference that the computing device 10* has been transferred from the first user 20 to the second user 30 will not be made at least until it is determined that the face of the second user 30 is determined to be in the proximate vicinity of the computing device 10* and is detected as being at or on the display side (e.g., front side 17a) of the computing device 10*. Note that since the computing device 10* may be endowed with multiple sensors 120 (e.g., image capturing devices 204 and/or audio capturing devices 206) located on both the front side 17a as well as the backside 17b of the computing device 10*, it may be possible to detect the presence of a person or a face of the person on either side of the computing device 10*.

Another type of visual cues that the computing device 10* or at least the logic endowed with the computing device 10* may look for in order to determine whether the computing device 10* has been transferred from a first user 20 to a second user 30 is the presence or absence of one or more eyeballs or eyes (e.g., irises or retinas) in the proximate vicinity of the computing device 10* that are determined to be associated with the first user 20 or the second user 30. In particular, if the eyes of the first user 20 is determined not to be at least in the field of view of a image capturing device 204 (e.g., the image capturing device 204 disposed on the front side 17a) of the computing device 10* and/or if one or more eyes of another person (e.g., second user 30) other than the first user 20 is determined to be in the field of view of the image capturing device 204, then at least an inference may be made that the computing device 10* has been transferred from the first user 20 to the second user 30.

In some cases, an inference that the computing device 10* has been transferred from the first user 20 to the second user 30 will not be made until the computing device 10 (or at least the logic endowed with the computing device 10*) determines that the eye of a person other than the first user 20 is detected in the proximate vicinity of the computing device 10* and is detected as being located at one or more specified locations (e.g., nearby the front side 17a) relative to the specific orientation of the computing device 10*. In other words, the inference or determination that the computing device 10* has been transferred from the first user 20 to the second user 30 will not be made at least until it is determined that the eye or eyes of the second user 30 is determined to be in the proximate vicinity of the computing device 10\* and is detected as being at or on the display side (e.g., the front side 17a) of the computing device 10\*.

In various embodiments, the computing device 10\* or at least the logic that may be endowed with the computing device 10\* may be designed to detect for the absence or presence of audio cues in the proximate vicinity of the computing device 10\* in order to determine or at least infer as to whether the computing device 10\* has been transferred from a first user 20 to a second user 30. For example, in some embodiments, the computing device 10\* may be endowed with voice verification system that may be designed to detect, via one or more audio capturing devices 206 (e.g., one or more microphones), a voice in the proximate vicinity of the computing device 10\* having a voice pattern that may be different from the signature voice pattern of the first user 20. By making such a determination and/or by detecting absence for at least a predefined period of time of a voice pattern associated with the first user 20 in the proximate vicinity of the computing device 10\*, an inference may be made that the computing device 10\* has been transferred from the first user 20. In some embodiments, an inference may be made that the computing device 10\* has been transferred from the first user 20 to the second user 30 when a voice pattern belonging to person other than the first user 20 is detected in the proximate vicinity of the computing device 10\* and is detected being originating from a point on the display side (e.g., the front side 17a) of the computing device 10\*.

In some embodiments, the computing device 10\* or at least the logic endowed with the computing device 10\* may be designed to determine the transfer of the computing device 10\* from the first user 20 to the second user 30 based on one or more detected movements of the computing device 10\*, one or more detected visual cues, and/or one or more detected audio cues. That is, since in many situations, a particular type of data or measurement (e.g., detected movements of the computing device 10\* or detected visual cues in the proximate vicinity of the computing device 10\*) may not reliably or conclusively indicate that the transfer of the computing device 10\* from the first user 20 to the second user 30 has occurred, in various embodiments, the computing device 10\* may make the determination as to whether the computing device 10\* has been transferred based on different types of measurements (e.g., movements of the computing device 10\*, visual cues, and/or audio cues).

In some embodiments, the determination as to whether the computing device 10\* has been transferred from the first user 20 to the second user 30 may be executed only after it is determined that the computing device 10\* is in (or outside of) one or more predefined geographic locations. That is, in some cases, it may not be necessary or even desirable for the computing device 10\* to make a determination as to whether the computing device 10\* has been transferred from the first user 20 to the second user 30. For example, if the computing device 10\* is located at the home of the first user 20, than there may be no need to make a determination as to whether the computing device 10\* has been transferred from the first user 20 to a second user 30. Thus, in various embodiments, the computing device 10\* may be designed to initiate the determination of whether the computing device 10\* has been transferred from a first user 20 to a second user 30 based on the geographic location of the computing device 10\* as detected by, for example, a global positioning system (GPS) 208 (see FIG. 2f), which may be included with the computing device 10\*.

As described earlier, in response to determining that the computing device 10\* has been transferred from the first user 20 to the second user 30, the computing device 10\* or at least the logic that may be endowed with the computing device 10\* may be designed to, in response to determining that the computing device 10\* has been transferred from the first user 20 to the second user 30, ascertain which of one or more items that are at least conditionally accessible through the computing device 10\* are active (e.g., open, running, being visually and/or audibly presented, etc.). In various embodiments, the one or more items that are at least conditionally accessible through the computing device 10\* may include a wide variety of electronic items that may be conditionally accessible through the computing device 10\* in various alternative implementations. For example, in various embodiments, the one or more items that are at least conditionally accessible through the computing device 10\* may include one or more alphanumeric documents (e.g., textual documents such as a word processing document or electronic messages such as email messages), productivity documents (e.g., word processing documents, spreadsheet documents, presentation documents, etc.), image files (e.g., digital photos, video files, etc.), audio files (e.g., voice messages), electronic folders, software applications (e.g., productivity applications, messaging applications, or gaming applications), passwords, website addresses, hyperlinks, and so forth.

As briefly described earlier, an item may be "conditionally accessible" through a computing device 10\* when certain conditions exists. For example, in some embodiments, such items may be accessible through the computing device 10\* whenever a first user, such as a primary user of the computing device 10\*, who has superior access rights to the items than other users (e.g., the second user 30) is using the computing device 10\* (e.g., is detected as using or having possession of the computing device 10\*). In the same or different embodiments, such conditionally accessible items may include items that are stored in the computing device 10\*, items (e.g., passwords) that have been entered or saved through the computing device 10\*, and/or items that are stored in a computer network but accessible through the computing device 10\*.

In various embodiments, an item that is at least conditionally accessible through the computing device 10\* may be determined to be active when the item (e.g., an application or an electronic file or document) is open, when the item (e.g., an email message) has been selected by, for example, the first user 20, when the item (e.g., an application) is running, and/or when the item (e.g., password) is automatically retrievable. A more detailed discussion related to the determination as to whether one or more items that are conditionally accessible through the computing device 10\* are active will be provided below with respect to the processes and operations to be described herein.

After ascertaining which of one or more items that are at least conditionally accessible through the computing device 10\* are active, the computing device 10\* or at least logic endowed with the computing device 10\* may be designed to provide (present) one or more selective levels of access to the one or more items based, at least in part, on the ascertainment as to which of the one or more items that were at least conditionally accessible through the computing device 10\* were active items. The type of access (e.g., full, partial, or no access, functional access, editorial access, viewing and/or audio access, etc.) that may be provided to the one or more items may depend on a number of factors including the type of items (e.g., applications, word processing document, image or audio files, etc.) that may be included in the one or more items that access may or may not be provided to. Other factors may additionally or alternatively be considered when selecting the type of access to be provided to the one or more items as will be described in greater detail below.

As will also be further described below, in various embodiments, the computing device 10*(or at least the endowed logic) may be designed to provide multiple (e.g., at least two) selective levels of access to a plurality (e.g., at least two) items that were at least conditionally accessible through the computing device 10* in response to ascertaining which of the plurality of items were active items when the computing device 10* was transferred from the first user 20 to the second user 30. In some embodiments, the providing of multiple selective levels of access to the plurality of items may involve providing at least two selective levels of access to the plurality of items including at least a first level of access to a first one or more items and a second level of access to a second one or more items, the first level of access (e.g., full viewing or editorial access) being a greater extent of access than the second level of access (e.g., no viewing or editorial access).

In some cases, and as will be further described herein, the first one or more items that may be provided with greater access may include not only those items ascertained to be active but may also include those items that may be "associated" with the items that were ascertained to be active. In some cases, one item may be "associated" with another item if, for example, the items are included in the same electronic folder, associated with the same third party (e.g., emails from the same third party), are of the same type of items (e.g., digital images), and/or share some other commonalities. In contrast to the first one or more items, the second one or more items may include those items that are determined to be not associated with the one or more items that were ascertained to be active when the computing device 10*, for example, was being transferred from the first user 20 to the second user 30.

Referring now to FIGS. 2a and 2b illustrating two embodiments (illustrated in FIGS. 2a and 2b as computing device 10' and computing device 10") of the computing device 10* of FIGS. 1, 3a, 3b, 3c, and 3d. Referring particularly now to FIG. 2a, which illustrates a computing device 10' that includes a transfer determining module 102', an active ascertaining module 104', an access providing module 106', a memory 114 (which may store one or more applications 160 and/or a movement library 170), one or more processors 116 (e.g., microprocessors, controllers, etc.), one or more sensors 120, user interface 110 (e.g., a display monitor such as a touchscreen, a keypad, a mouse, a microphone, a speaker, etc.), and a network interface 112 (e.g., network interface card or NIC).

In various embodiments, the transfer determining module 102' of FIG. 2a is a logic module that is designed to determine whether the computing device 10' has been transferred from a first user 20 to a second user 30. The active ascertaining module 104' is a logic module that is designed to, among other things, ascertain, in response to said determining by the transfer determining module 102', which of one or more items that are at least conditionally accessible through the computing device 10* are active items. In contrast, the access providing module 106' is a logic module that is designed to, among other things, provide one or more selective levels of access to the one or more items based, at least in part, on the ascertainment executed by the active ascertaining module 104'. For this particular embodiment of the computing device 10* of FIGS. 1, 3a, 3b, 3c, and 3d, the three logic modules (e.g., the transfer determining module 102', the active ascertaining module 104', and the access providing module 106') are implemented using purely circuitry components such as application specific integrated circuit or ASIC. Thus, the computing device 10' illustrated in FIG. 2a may be referred to as the "hardwired" version or embodiment of the computing device 10* of FIGS. 1, 3a, 3b, 3c, and 3d.

Turning now to FIG. 2b, which illustrates a "soft" version or embodiment of the computing device 10* of FIGS. 1, 3a, 3b, 3c, and 3d. In particular, FIG. 2b shows a computing device 10" that has components similar or the same as the components of the computing device 10' of FIG. 2a. That is, computing device 10", similar to computing device 10' of FIG. 2a, may comprise of a memory 114 (storing one or more applications 160 and/or a movement library 170), one or more processors 116, one or more sensors 120, user interface 110, and/or a network interface 112. And similar to the computing device 10' of FIG. 2a, the computing device 10" of FIG. 2b may include logic modules including a transfer determining module 102", an active ascertaining module 104", and an access providing module 106" that correspond to and mirror the transfer determining module 102', the active ascertaining module 104', and the access providing module 106' of the computing device 10' of FIG. 2a. However, unlike the logic modules (e.g., the transfer determining module 102', the active ascertaining module 104', and the access providing module 106') of the computing device 10' of FIG. 2a, the logic modules (e.g., the transfer determining module 102", the active ascertaining module 104", and the access providing module 106") of the computing device 10" of FIG. 2b are implemented by the one or more processors 116 executing computer readable instructions 152 (e.g., software and/or firmware) that may be stored in the memory 114.

Note that although FIG. 2a illustrates all of the logic modules (e.g., the transfer determining module 102', the active ascertaining module 104', and the access providing module 106') being implemented using purely circuitry components such as ASIC, and although FIG. 2b illustrates all of the logic modules (e.g., the transfer determining module 102", the active ascertaining module 104", and the access providing module 106") being implemented using one or more processors 116 executing computer readable instructions 152, in other embodiments, these logic modules may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as FPGA) executing computer readable instructions 152 (e.g., software and/or firmware).

In various embodiments, the memory 114 of the computing device 10' of FIG. 2a and the computing device 10" of FIG. 2b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments the one or more applications 160 stored in memory 114 may include, for example, an operating system 162, one or more productivity applications 164 such as a word processing application or a spreadsheet application, one or more communication applications 166 such as an email or IM application, and one or more personal information manager applications 168 (e.g., Microsoft Outlook).

Figure 2C:
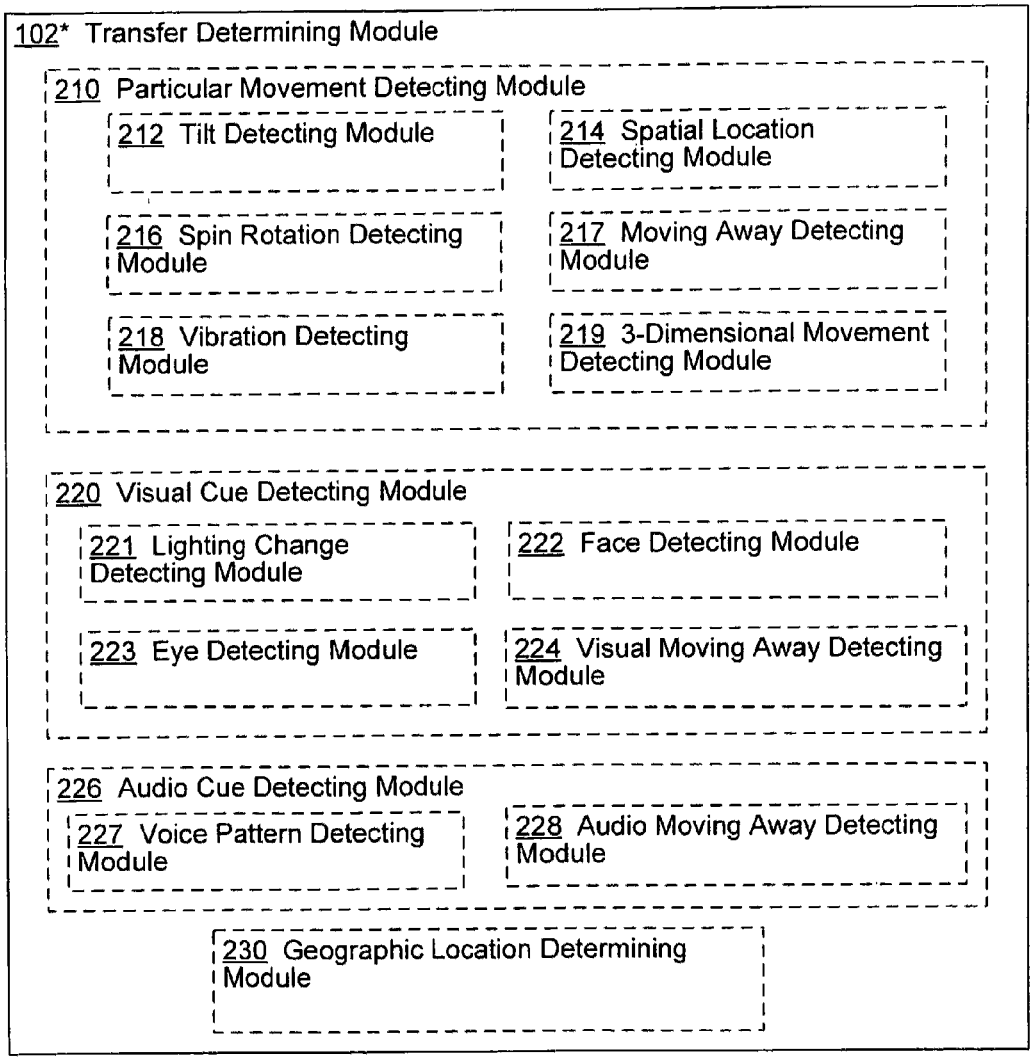
FIG. 2c shows another perspective of the transfer determining module 102* of FIGS. 2a and 2b.

Turning now to FIG. 2c illustrating a particular implementation of the transfer determining module 102*(e.g., the transfer determining module 102' or the transfer determining module 102") of FIGS. 2a and 2b. As illustrated, the transfer determining module 102* may include one or more sub-logic modules in various alternative implementations. For example, in various implementations, the transfer determining module 102* may include a particular movement detecting module 210 (which may further include a tilt detecting module 212, a spatial location detecting module 214, a spin rotation detecting module 216, a moving away detecting module 217, a vibration detecting module 218, and/or a 3-dimensional movement detecting module 219), a visual cue detecting module 220 (which may further include a lighting change detecting module 221, a face detecting module 222, an eye detecting module 223, and/or a visual moving away detecting module 224), an audio cue detecting module 226 (which may further include a voice pattern detecting module 227 and/or an audio moving away detecting module 228), and/or a geographic location determination module 230. Specific details related to the transfer determining module 102* as well as the above-described sub-modules of the transfer determining module 102* will be provided below with respect to the operations and processes to be described herein.

Figure 2D:
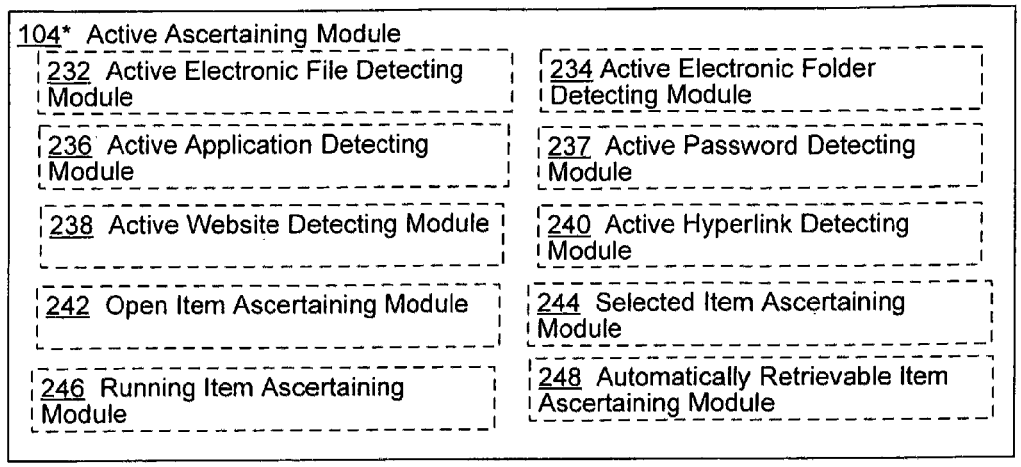
FIG. 2d shows another perspective of the active ascertaining module 104* of FIGS. 2a and 2b.

Referring now to FIG. 2d illustrating a particular implementation of the active ascertaining module 104*(e.g., the active ascertaining module 104' or the active ascertaining module 104") of FIGS. 2a and 2b. As illustrated, the active ascertaining module 104* may include one or more sub-logic modules in various alternative implementations. For example, in various implementations, the active ascertaining module 104* may include an active electronic file detecting module 232, an active electronic folder detecting module 234, an active application detecting module 236, an active password detecting module 237, an active website detecting module 238, an active hyperlink detecting module 240, an open item ascertaining module 242, a selected item ascertaining module 244, a running item ascertaining module 246, and/or an automatically retrievable item ascertaining module 248. Specific details related to the active ascertaining module 104* as well as the above-described sub-modules of the active ascertaining module 104* will be provided below with respect to the operations and processes to be described herein.

Figure 2E:
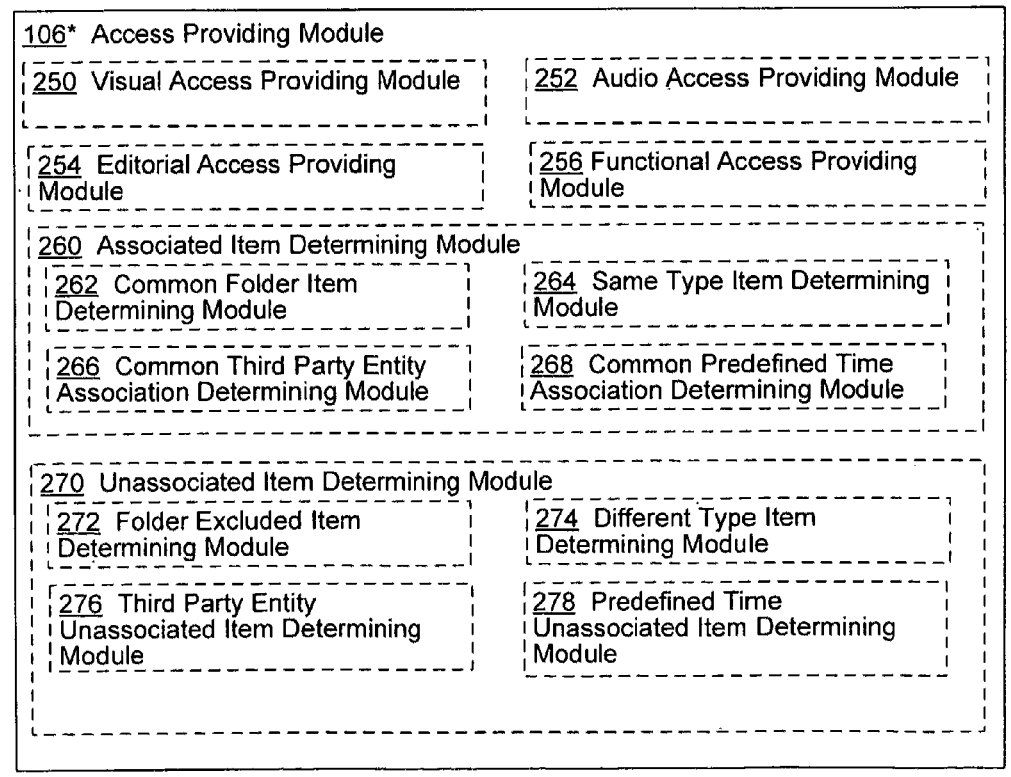
FIG. 2e shows another perspective of the access providing module 106* of FIGS. 2a and 2b.
Figure 2F:
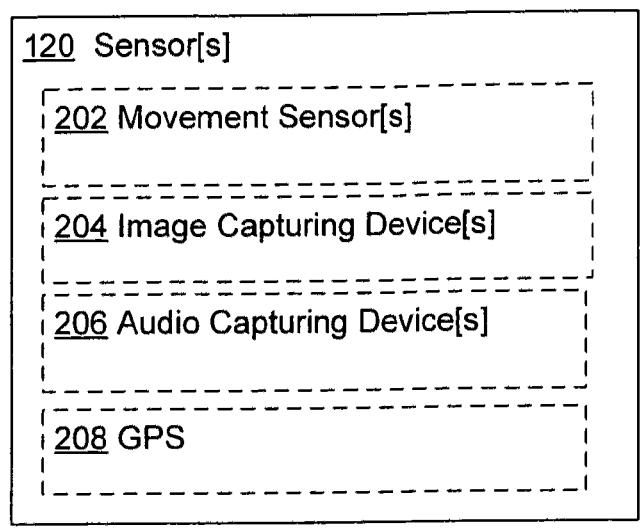
FIG. 2f shows various types of sensors 120 that may be included in the computing device 10* of FIGS. 2a and 2b.

Referring to FIG. 2e illustrating a particular implementation of the access providing module 106*(e.g., the access providing module 106' or the access providing module 106") of FIGS. 2a and 2b. As further illustrated in FIG. 2e, the access providing module 106* may include one or more sub-logic modules in various alternative implementations. For example, in various implementations, the access providing module 106* may include a visual access providing module 250, an audio access providing module 252, an editorial access providing module 254, a functional access providing module 256, an associated item determining module 260 (which may further include a common folder item determining module 262, a same type item determining module 264, a common third party entity association determining module 266, and/or a common predefined time association determining module 268), and/or an unassociated item determining module 270 (which may further include a folder excluded item determining module 272, a different type item determining module 274, a third party entity unassociated item determining module 276, and/or a predefined time unassociated item determining module 278). Specific details related to the access providing module 106* as well as the above-described sub-modules of the access providing module 106* will be provided below with respect to the operations and processes to be described herein.

FIG. 2f illustrates the various types of sensors 120 that may be included with the computing device 10*(e.g., the computing device 10' of FIG. 2a or the computing device 10" of FIG. 2b) of FIGS. 1, 3a, 3b, 3c, and 3d. As illustrated, the sensors 120 that may be included with the computing device 10* may include one or more movement sensors 202 (e.g., an accelerometer, an inertia sensor, and/or a gyro sensor), one or more image capturing devices 204 (e.g., a web cam, a digital camera, etc.), one or more audio capturing devices 206 (e.g., microphones), and/or a global positioning system (GPS) 208 (which may include any device that can determine its geographic location including those devices that determine its geographic location using triangulation techniques applied to signals transmitted by satellites or by communication towers such as cellular towers).

Figure 4:
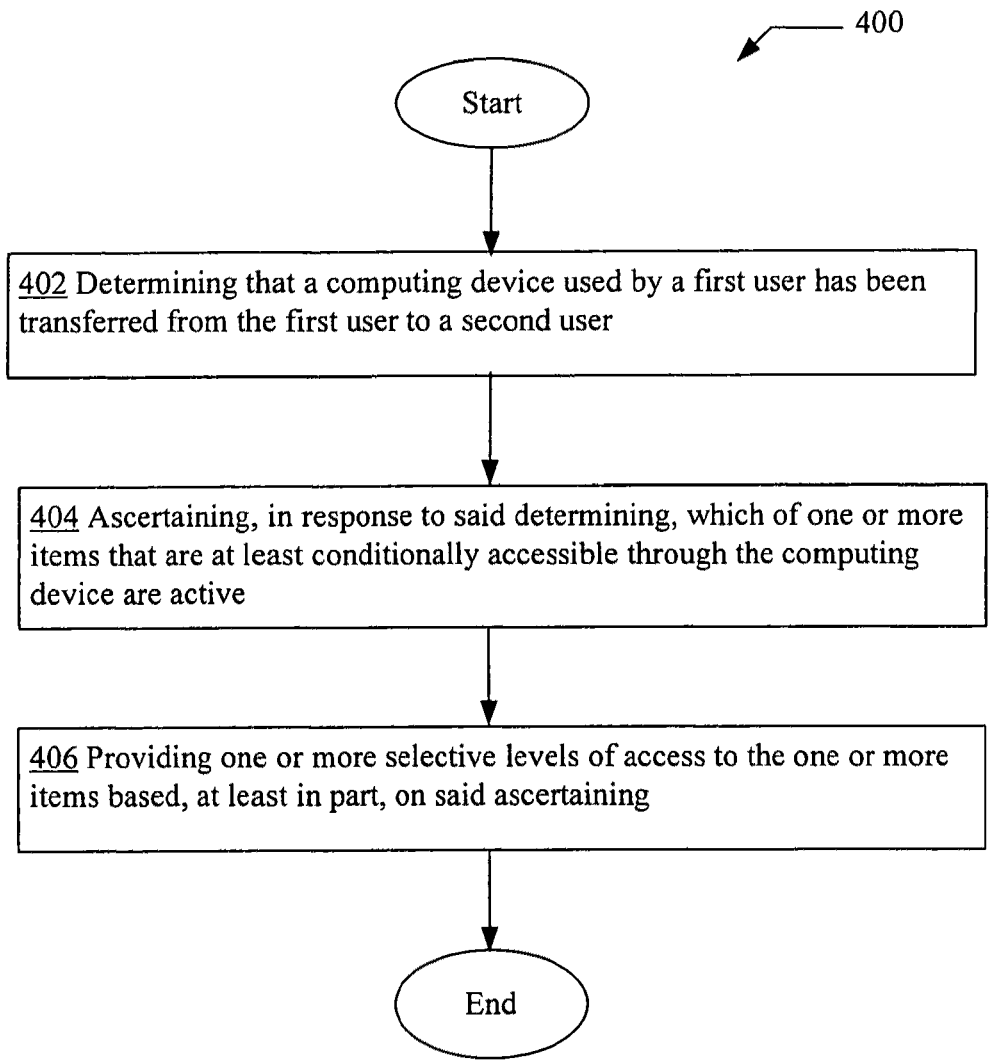
FIG. 4 is a high-level logic flowchart of a process.

A more detailed discussion related to the computing device 10* of FIGS. 1, 3a, 3b, 3c, and 3d (e.g., the computing device 10' of FIG. 2a or the computing device 10" of FIG. 2b) will now be provided with respect to the processes and operations to be described herein. FIG. 4 illustrates an operational flow 400 representing example operations for, among other things, providing one or more selective levels of access via a computing device to one or more items (e.g., software applications, electronic documents including productivity documents, audio or image files, electronic messages including emails, passwords, so forth) that are at least conditionally accessible through the computing device, the providing of the one or more selective levels of access, in some implementations, being in response to determining that the computing device 10* has been transferred from a first user 20 to a second user 30 and based on ascertaining which of the one or more items that are conditionally accessible through the computing device 10* were active (e.g., open, running, being displayed, etc.) when the computing device 10* was determined to have been transferred from the first user 20 to the second user 30. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 2a, 2b, 2c, 2d, 2e, 2f, 3a, 3b, 3c, and 3d) and contexts. However, it should be understood that the operational flows may be executed in a number of other environments and contexts, and/or in modified versions of FIGS. 2a, 2b, 2c, 2d, 2e, 2f, 3a, 3b, 3c, and 3d. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer determining operation 402 for determining that a computing device used by a first user has been transferred from the first user to a second user. For instance, and as an illustration, the transfer determining module 102*(e.g., transfer determining module 102' of FIG.

2a or transfer determining module 102" of FIG. 2b) of the computing device 10* of FIG. 1 (e.g., the computing device 10' of FIG. 2a or the computing device 10" of FIG. 2b) determining that a computing device 10* used by a first user 20 (e.g., a primary user such as an owner of the computing device 10* of FIG. 1) has been transferred from the first user 20 to a second user 30 (e.g., a person having inferior access rights than the first user 20 to the computing device 10*). Note that in various implementations, the first user 20* may "use" the computing device 10* by simply turning on the computing device 10, by logging onto the computing device 10, and/or by employing the computing device 10* to access one or more items that may be at least conditionally accessible through the computing device 10*.

In addition to the transfer determining operation 402, operational flow 400 may include an active ascertaining operation 404 for ascertaining, in response to said determining, which of one or more items that are at least conditionally accessible through the computing device are active. For instance, the active ascertaining module 104*(e.g., the active ascertaining module 104' of FIG. 2a or the active ascertaining module 104" of FIG. 2b) of the computing device 10* of FIG. 1 (e.g., the computing device 10' of FIG. 2a or the computing device 10" of FIG. 2b) ascertaining, in response to said determining, which of one or more items (e.g., documents, image or audio files, passwords, applications, and so forth) that are at least conditionally accessible through the computing device 10* are active (e.g., are open, are running, are being displayed, and so forth). For example, in response to determining that the computing device 10* has been transferred from the first user 20 to the second user 30, ascertaining which word processing files or email messages that are at least conditionally accessible (e.g., accessible when the first user 20* is using the computing device 10* or when the first user 20 has logged in) through the computing device 10* were active items (e.g., items that were open or being displayed) when the computing device 10* was being transferred from the first user 20 to the second user 30.

In addition to the transfer determining operation 402 and the active ascertaining operation 404, the operational flow 400 of FIG. 4 may further include an access providing operation 406 for providing one or more selective levels of access to the one or more items based, at least in part, on said ascertaining. For instance, the access providing module 106* (e.g., access providing module 106' of FIG. 2a or access providing module 106" of FIG. 2b) of the computing device 10* of FIG. 1 (e.g., the computing device 10' of FIG. 2a or the computing device 10" of FIG. 2b) providing one or more selective levels of access (e.g., full, partial, or no access, visual and/or audio access, functional access, editorial access, etc.) to the one or more items based, at least in part, on said ascertaining.

The types of selective levels of access to be (or not to be) provided to the one or more items may, in some instances, depend on the type of items that access are (or are not) being provided to. For example, if the one or more items include one or more software applications, then providing access to such items may involve allowing (or not allowing) use of one or more functionalities associated with such items. Such access may be referred to as functional access. For example, if the one or more items include a productivity application such as a word processing application or an email application, then providing a selective level of access to such an application may involve enabling (or disabling) one or more functionalities such as editing functions of the application or other functions such as a saving function.

If, on the other hand, the one or more items include a messaging application such as an email application then the selective level of access to be provided may be functional access related to a send and/or a save functionality. In contrast, if the one or more items include one or more electronic documents or files such as, for example, productivity documents including word processing documents, image or audio files, and electronic messages (emails or voicemails) then the selective level of access that may be provided to such items may be related to editorial access to such items and/or general visual and/or audio accessibility to view/listen to such items. In any event, the various levels of access (which may include no access) to the various types of items that may be provided will be described in greater detail herein.

Figure 5A:
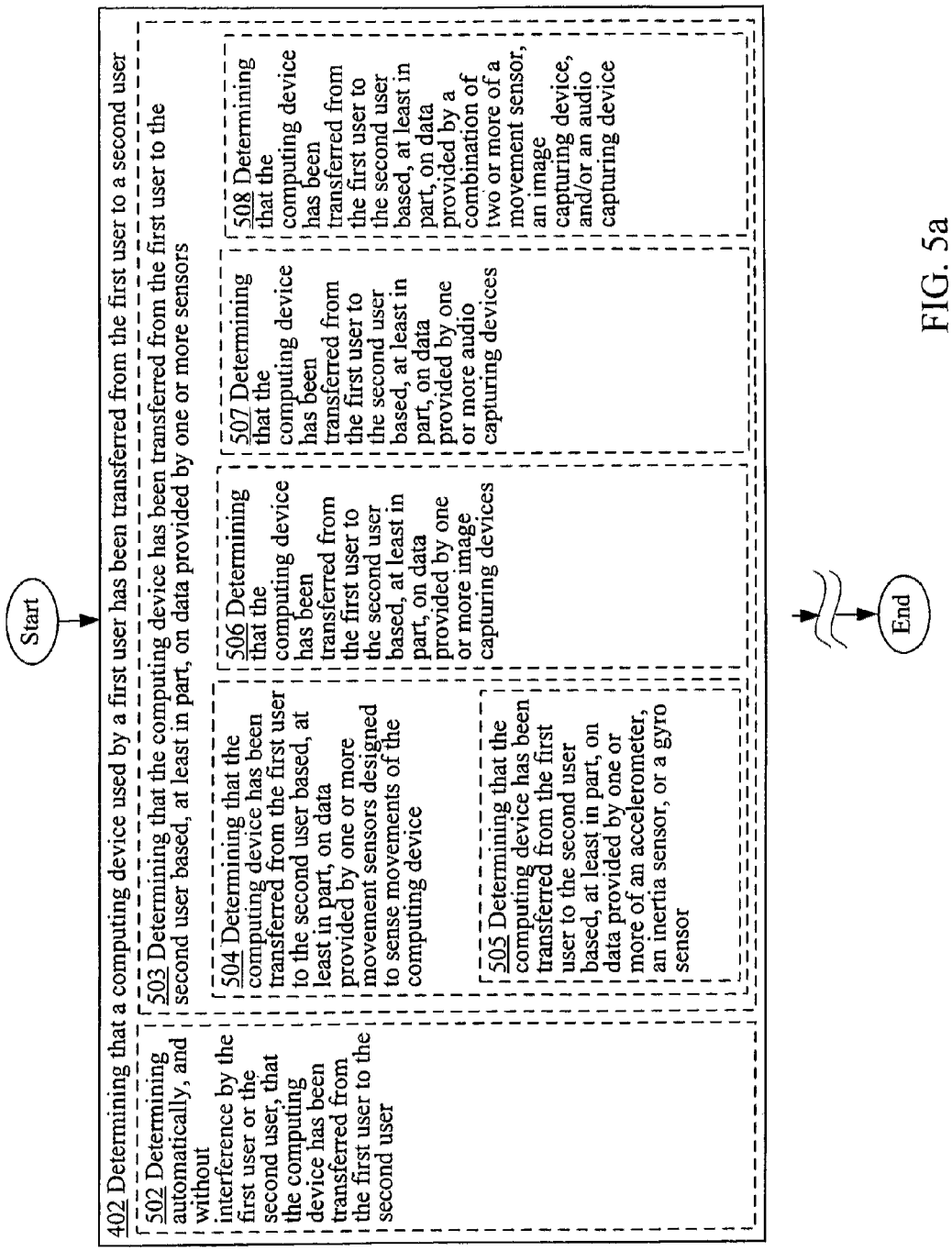
FIG. 5a is a high-level logic flowchart of a process depicting alternate implementations of the transfer determining operation 402 of FIG. 4.

As will be further described herein, the transfer determining operation 402, the active ascertaining operation 404, and the access providing operation 406 of FIG. 4 may be executed in a variety of different ways in various alternative implementations. FIGS. 5a, 5b, 5c, 5d, 5e, 5f, and 5g, for example, illustrate at least some of the alternative ways that the transfer determining operation 402 of FIG. 4 may be executed in various alternative implementations. For example, in various implementations, the transfer determining operation 402 of FIG. 4 may include an operation 502 for determining automatically, and without interference by the first user or the second user, that the computing device has been transferred from the first user to the second user as depicted in FIG. 5a. For instance, the transfer determining module 102*(see, for example, the transfer determining module 102' of FIG. 2a or the transfer determining module 102" of FIG. 2b) of the computing device 10* of FIG. 1 (e.g., the computing device 10' of FIG. 2a or the computing device 10" of FIG. 2b) determining automatically and without interference (e.g., without prompting) by the first user 20 or the second user 30 that the computing device 10 has been transferred from the first user 20 to the second user 30.

As further illustrated in FIG. 5a, in some implementations, the transfer determining operation 402 may additionally or alternatively include an operation 503 for determining that the computing device has been transferred from the first user to the second user based, at least in part, on data provided by one or more sensors. For instance, the transfer determining module 102* of the computing device 10* of FIG. 1 (e.g., the computing device 10' of FIG. 2a or the computing device 10" of FIG. 2b) determining that the computing device 10* has been transferred from the first user 20 to the second user 30 based, at least in part, on data provided by one or more sensors 120.

Data from various types of sensors 120 may be used in order to determine whether the computing device 10 has been transferred. For example, and as further illustrated in FIG. 5a, operation 503 may include an operation 504 for determining that the computing device has been transferred from the first user to the second user based, at least in part, on data provided by one or more movement sensors designed to sense movements of the computing device. For instance, the transfer determining module 102* of the computing device 10* of FIG. 1 determining that the computing device 10* has been transferred from the first user 20 to the second user 30 based, at least in part, on data provided by one or more movement sensors 202 that are designed to sense (e.g., directly detect) movements of the computing device 10*.

In some implementations, operation 504 may include an operation 505 for determining that the computing device has been transferred from the first user to the second user based, at least in part, on data provided by one or more of an accelerometer, an inertia sensor, or a gyro sensor as further depicted in FIG. 5a. For instance, the transfer determining module 102* of the computing device 10* of FIG. 1 determining that the computing device 10 has been transferred from the first user 20 to the second user 30 based, at least in part, on data provided by one or more of an accelerometer, an inertia sensor, or a gyro sensor. Note that references to "computing device 10*" in the following description, unless indicated otherwise, is in reference to the computing device 10' of FIG. 2a or to the computing device 10" of FIG. 2b.

In the same or different implementations, operation 503 may include an operation 506 for determining that the computing device has been transferred from the first user to the second user based, at least in part, on data provided by one or more image capturing devices. For instance, the transfer determining module 102* of the computing device 10* of FIG. 1 determining that the computing device 10* has been transferred from the first user 20 to the second user 30 based, at least in part, on data provided by one or more image capturing devices 204 (e.g., a webcam, a digital camera, and so forth), which may be integrated in the computing device 10*.

In the same or alternative implementations, operation 503 may include an operation 507 for determining that the computing device has been transferred from the first user to the second user based, at least in part, on data provided by one or more audio capturing devices. For instance, the transfer determining module 102* of the computing device 10* of FIG. 1 determining that the computing device 10* has been transferred from the first user 20 to the second user 30 based, at least in part, on data provided by one or more audio capturing devices 206 (e.g., microphone), which may be integrated in the computing device 10*.

In some cases, operation 503 may include an operation 508 for determining that the computing device has been transferred from the first user to the second user based, at least in part, on data provided by a combination of two or more of a movement sensor, an image capturing device, and/or an audio capturing device. For instance, the transfer determining module 102* of the computing device 10* determining that the computing device 10* has been transferred from the first user 20 to the second user 30 based, at least in part, on data provided by a combination of two or more of a movement sensor 202, an image capturing device 204, and/or an audio capturing device 206.

Figure 5B:
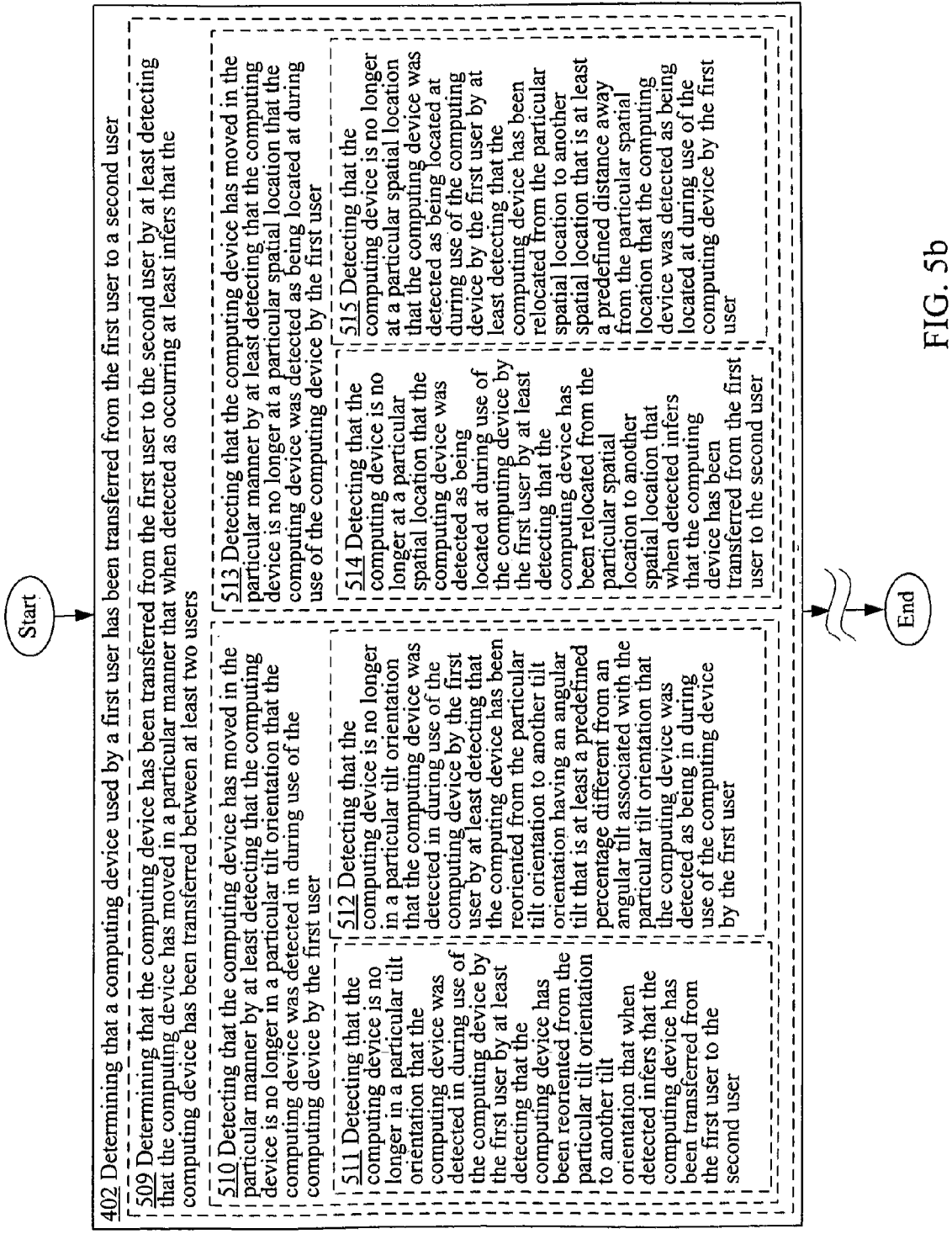
FIG. 5b is a high-level logic flowchart of a process depicting alternate implementations of the transfer determining operation 402 of FIG. 4.

In various implementations, the transfer determining operation 402 of FIG. 4 may involve making the determination that the computing device 10* has been transferred from the first user 20 to the second user 30 based, at least in part, on the movements of the computing device 10*. For example, in some implementations, the transfer determining operation 402 may include an operation 509 for determining that the computing device has been transferred from the first user to the second user by at least detecting that the computing device has moved in a particular manner that when detected as occurring at least infers that the computing device has been transferred between at least two users as depicted in FIG. 5b. For instance, the transfer determining module 102* including a particular movement detecting module 210 (see FIG. 2c) of the computing device 10* determining that the computing device 10* has been transferred from the first user 20 to the second user 30 when the particular movement detecting module 210 at least detects that the computing device 10* has moved in a particular manner (e.g., has spatially moved along a particular path or moved to a particular spatial location with respect to its initial spatial location) that when detected as occurring at least infers (e.g., implies) that the computing device 10* has been transferred between two users.

Figure 5C:
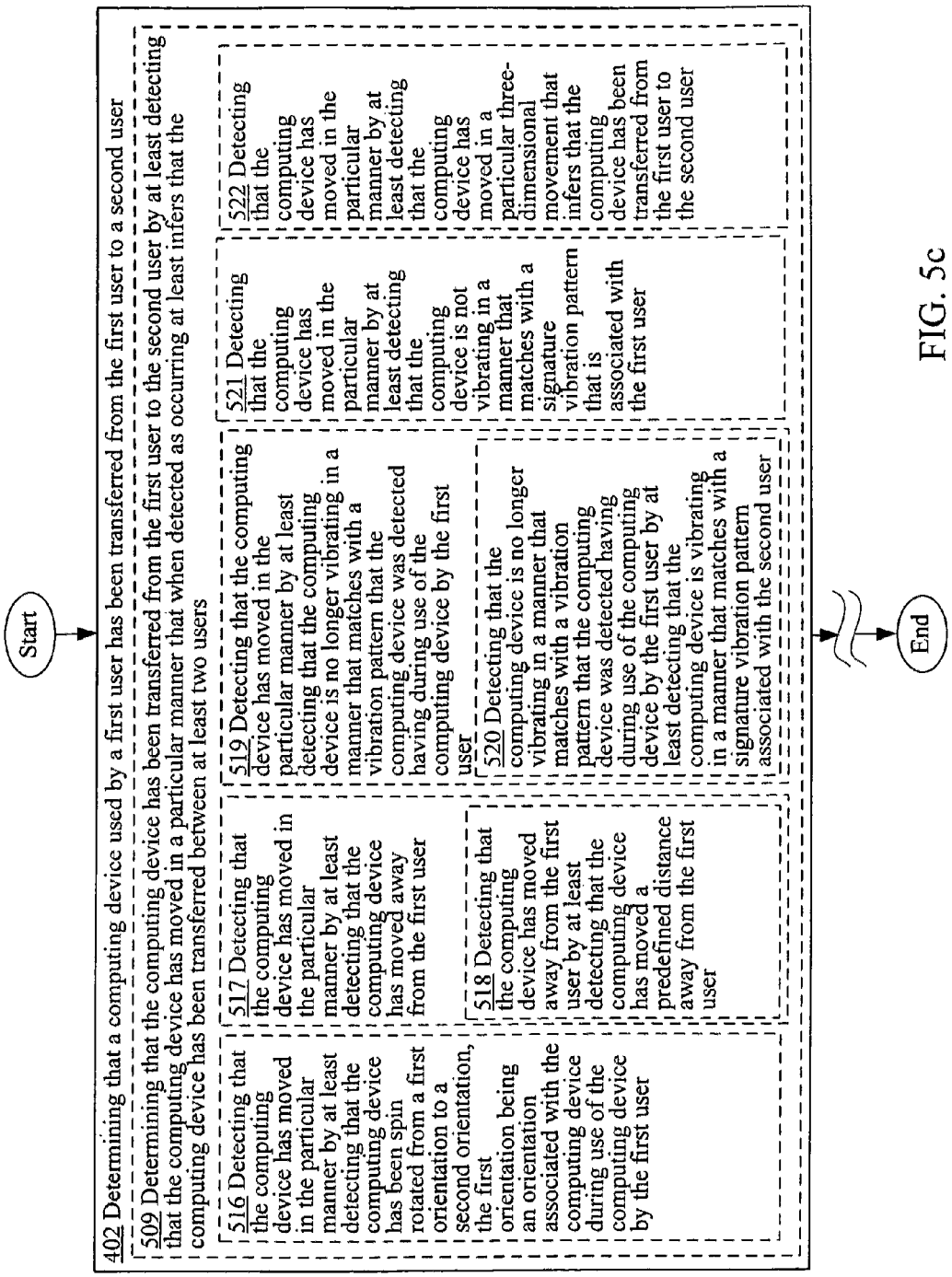
FIG. 5c is a high-level logic flowchart of a process depicting alternate implementations of the transfer determining operation 402 of FIG. 4.

As further illustrated in FIGS. 5b and 5c, operation 509 may in some cases involve detecting various types of movements of the computing device 10* in order to determine or at least infer that the computing device 10* has been transferred from a first user 20 to a second user 30. For example, in some implementations, operation 509 may include an operation 510 for detecting that the computing device has moved in the particular manner by at least detecting that the computing device is no longer in a particular tilt orientation that the computing device was detected in during use of the computing device by the first user as illustrated in FIG. 5b. For instance, the particular movement detecting module 210 including the tilt detecting module 212 (see FIG. 2c) of the computing device 10*detecting that the computing device 10* has moved in the particular manner when the tilt detecting module 212 at least detects that the computing device 10* is no longer in a particular tilt orientation that the computing device 10* was detected in during use of the computing device 10*by the first user 20. Thus, in some implementations, the computing device 10* may also be endowed with logic to determine whether the computing device 10 is being used by the first user 20. Such a determination may be made by a number of means including, for example, the use of facial recognition system to determine whether the face of the first user 20* is detected in the vicinity of the computing device 10*(e.g., in the visual range of a webcam or other types of image capturing devices 204 that may be part of the computing device 10*).

In some cases, operation 510 may, in turn, include an operation 511 for detecting that the computing device is no longer in a particular tilt orientation that the computing device was detected in during use of the computing device by the first user by at least detecting that the computing device has been reoriented from the particular tilt orientation to another tilt orientation that when detected infers that the computing device has been transferred from the first user to the second user as further depicted in FIG. 5b. For instance, the tilt detecting module 212 of the computing device 10* detecting that the computing device 10* is no longer in a particular tilt orientation that the computing device 10* was detected in during use of the computing device 10* by the first user 20 by at least detecting that the computing device 10* has been reoriented from the particular tilt orientation to another tilt orientation that when detected infers that the computing device 10* has been transferred from the first user 20 to the second user 30.

In the same or different implementations, operation 510 may include an operation 512 for detecting that the computing device is no longer in a particular tilt orientation that the computing device was detected in during use of the computing device by the first user by at least detecting that the computing device has been reoriented from the particular tilt orientation to another tilt orientation having an angular tilt that is at least a predefined percentage different from an angular tilt associated with the particular tilt orientation that the computing device was detected as being in during use of the computing device by the first user as further depicted in FIG. 5b. For instance, the tilt detecting module 212 of the computing device 10* detecting that the computing device 10* is no longer in a particular tilt orientation that the computing device 10* was detected in during use of the computing device 10* by the first user 20 by at least detecting that the computing device 10* has been reoriented from the particular tilt orientation to another tilt orientation having an angular tilt that is at least a predefined percentage different from an angular tilt associated with the particular tilt orientation that the computing device 10* was detected as being in during use of the computing device 10* by the first user 20. Such an operation may be executed in order to, for example, filter out "noise" tilts (e.g., random changes in tilt caused by the first user 20 when, for example, the first user 20 accidentally or intentionally moves his/her body or hands in order to, for example, get in a more comfortable body position causing the computing device 10* to move and change in tilt orientation).

In various implementations, the operation 509 for determining that the computing device has been transferred from the first user to the second user by at least detecting that the computing device has moved in a particular manner that when detected as occurring at least infers that the computing device has been transferred between at least two users may involve detecting that the computing device 10* has at least been relocated away from a particular location. For example, in some implementations, operation 509 may include an operation 513 for detecting that the computing device has moved in the particular manner by at least detecting that the computing device is no longer at a particular spatial location that the computing device was detected as being located at during use of the computing device by the first user as depicted in FIG. 5b. For instance, the particular movement detecting module 210 including the spatial location detecting module 214 (see FIG. 2c) of the computing device 10* detecting that the computing device 10* has moved in a particular manner when the spatial location detecting module 214 detects that the computing device 10* is no longer at a particular spatial location (e.g., see spatial location 46 of FIG. 3c) that the computing device 10* was detected as being located at during use of the computing device 10* by the first user 20 (e.g., when the computing device 10* was in the possession of the first user 20).

In various implementations, operation 513 may include an operation 514 for detecting that the computing device is no longer at a particular spatial location that the computing device was detected as being located at during use of the computing device by the first user by at least detecting that the computing device has been relocated from the particular spatial location to another spatial location that when detected infers that the computing device has been transferred from the first user to the second user. For instance, the spatial location detecting module 214 of the computing device 10* detecting that the computing device 10* is no longer at a particular spatial location 46 (see FIG. 3c) that the computing device 10* was detected as being located at during use of the computing device 10* by the first user 20 by at least detecting that the computing device 10* has been relocated from the particular spatial location 46 to another spatial location 48 that when detected infers that the computing device 10* has been transferred from the first user 20 to the second user 30.

In the same or different implementations, operation 513 may include an operation 515 for detecting that the computing device is no longer at a particular spatial location that the computing device was detected as being located at during use of the computing device by the first user by at least detecting that the computing device has been relocated from the particular spatial location to another spatial location that is at least a predefined distance away from the particular spatial location that the computing device was detected as being located at during use of the computing device by the first user. For instance, the spatial location detecting module 214 of the computing device 10* detecting that the computing device 10* is no longer at a particular spatial location (e.g., spatial location 46 of FIG. 3c) that the computing device 10* was detected as being located at during use of the computing device 10* by the first user 20 by at least detecting that the computing device 10* has been relocated from the particular spatial location 46 to another spatial location 48 that is at least a predefined distance away from the particular spatial location 46 that the computing device 10* was detected as being located at during use of the computing device 10* by the first user 20 (and prior to the relocation of the computing device 10*).

In various implementations, operation 509 for determining that the computing device has been transferred from the first user to the second user by at least detecting that the computing device has moved in a particular manner that when detected as occurring at least infers that the computing device has been transferred between at least two users may include an operation 516 for detecting that the computing device has moved in the particular manner by at least detecting that the computing device has been spin rotated from a first orientation to a second orientation, the first orientation being an orientation associated with the computing device during use of the computing device by the first user as illustrated in FIG. 5c. For instance, the particular movement detecting module 210 including the spin rotation detecting module 216 (see FIG. 2c) of the computing device 10* determining that the computing device 10* has moved in a particular manner when the spin rotation detecting module 216 at least detects that the computing device 10* has been spin rotated from a first orientation to a second orientation, the first orientation being an orientation associated with the computing device 10* during use of the computing device 10* by the first user 20.

In the same or different implementations, operation 509 may include an operation 517 for detecting that the computing device has moved in the particular manner by at least detecting that the computing device has moved away from the first user. For instance, the particular movement detecting module 210 including the moving away detecting module 217 (see FIG. 2c) of the computing device 10* detecting that the computing device 10* has moved in a particular manner when the moving away detecting module 217 detects that the computing device 10* has moved away from the first user 20. Such detection may be based on data provided by one or more sensors 120 including one or more movement sensors 202, one or more image capturing devices 204 (which may detect the face of the first user 20 moving away from the computing device 10*), and/or one or more audio capturing devices 206 (which may detect a voice having the voice signature of the first user 20 diminishing in volume thus inferring that the first user 20 moving away from the computing device 10*).

In some implementations, operation 517 may further include an operation 518 for detecting that the computing device has moved away from the first user by at least detecting that the computing device has moved a predefined distance away from the first user. For instance, the moving away detecting module 217 of the computing device 10* detecting that the computing device 10* has moved away from the first user 20 by at least detecting that the computing device 10* has moved a predefined distance away from the first user 20. In doing so, the computing device 10* may filter out movements that may be considered "noise" (e.g., random or accidental relocation movements of the computing device 10* caused by, for example, the random or accidental movements of the first user 20 holding the computing device 10*).

In various embodiments, operation 509 for determining that the computing device has been transferred from the first user to the second user by at least detecting that the computing device has moved in a particular manner that when detected as occurring at least infers that the computing device has been transferred between at least two users may involve tracking or sensing vibrations that have been transferred to (e.g., by contact with users) the computing device 10*. That is, each user may be associated with relatively unique signature vibration patterns (e.g., heart rate). Thus, by detecting at least a change in vibration exhibited by the computing device 10* as a result of, for example, its contact with different individuals, at least an inference may be made that a transfer of the computing device 10* may have occurred. Thus, in various implementations, operation 509 may include an operation 519 for detecting that the computing device has moved in the particular manner by at least detecting that the computing device is no longer vibrating in a manner that matches with a vibration pattern that the computing device was detected having during use of the computing device by the first user as illustrated in FIG. 5c. For instance, the particular movement detecting module 210 including the vibration detecting module 218 (see FIG. 2c) of the computing device 10* determining that the computing device 10* has moved in a particular manner when the vibration detecting module 218 at least detects that the computing device 10* is no longer vibrating in a manner that matches with a vibration pattern that the computing device 10* was detected having during use of the computing device 10* by the first user 20.

As further illustrated in FIG. 5c, in some implementations, operation 519 may further include an operation 520 for detecting that the computing device is no longer vibrating in a manner that matches with a vibration pattern that the computing device was detected having during use of the computing device by the first user by at least detecting that the computing device is vibrating in a manner that matches with a signature vibration pattern associated with the second user. For instance, the vibration detecting module 218 of the computing device 10* detecting that the computing device 10* is no longer vibrating in a manner that matches with a vibration pattern that the computing device 10* was detected having during use of the computing device 10* by the first user 20 by at least detecting that the computing device 10* is vibrating in a manner that matches with a signature vibration pattern associated with the second user 30.

In the same or different implementations, operation 509 may include an operation 521 for detecting that the computing device has moved in the particular manner by at least detecting that the computing device is not vibrating in a manner that matches with a signature vibration pattern that is associated with the first user. For instance, particular movement detecting module 210 including the vibration detecting module 218 of the computing device 10* determining that the computing device 10* has moved in a particular manner when the vibration detecting module 218 at least detects that the computing device 10* is not vibrating in a manner that matches with a signature vibration pattern that is associated with the first user 20.

In various implementations, operation 509 for determining that the computing device has been transferred from the first user to the second user by at least detecting that the computing device has moved in a particular manner that when detected as occurring at least infers that the computing device has been transferred between at least two users may involve tracking the overall movements of the computing device 10* rather than tracking a particular type of movements (e.g., tilt movements, spin rotation movements, spatial relocation movements, vibration movements, etc.) in order to determine whether the computing device 10* has been transferred from the first user 20 to the second user 30. For example, in some implementations, operation 509 may include an operation 522 for detecting that the computing device has moved in the particular manner by at least detecting that the computing device has moved in a particular three-dimensional movement that infers that the computing device has been transferred from the first user to the second user. For instance, the particular movement detecting module 210 including the three-dimensional movement detecting module 219 (see FIG. 2c) of the computing device 10* determining that the computing device 10* has moved in a particular manner when the three-dimensional movement detecting module 219 at least detects that the computing device 10* has moved in a particular three-dimensional movement that infers that the computing device 10* has been transferred from the first user 20 to the second user 30.

Figure 5D:
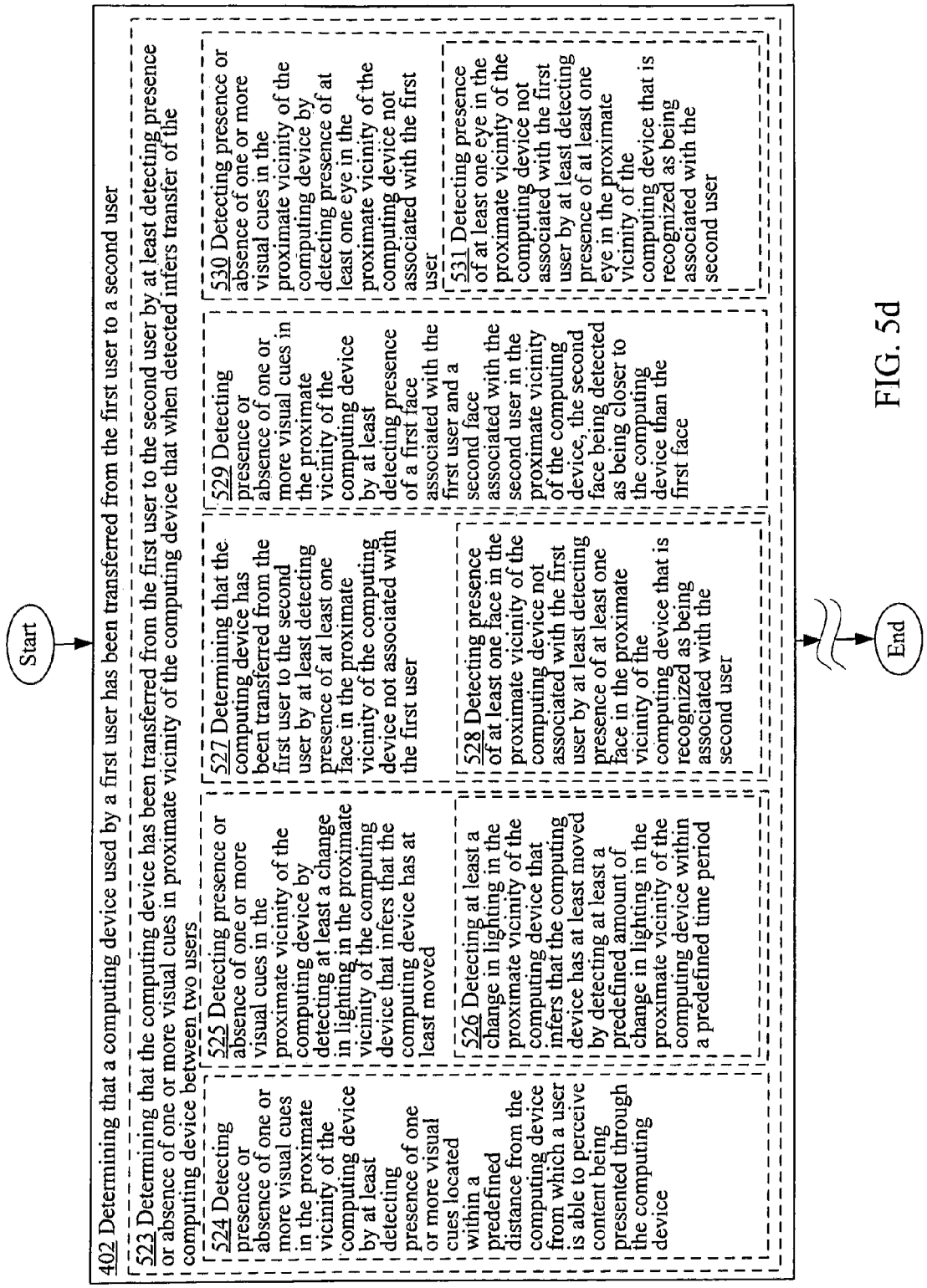
FIG. 5d is a high-level logic flowchart of a process depicting alternate implementations of the transfer determining operation 402 of FIG. 4.

In various implementations, the transfer determining operation 402 of FIG. 4 may involve determining that the computing device 10* has been transferred from the first user 20 to the second user 30 based, at least in part, on visual cues. For example, in some implementations, the transfer determining operation 402 may include an operation 523 for determining that the computing device has been transferred from the first user to the second user by at least detecting presence or absence of one or more visual cues in proximate vicinity of the computing device that when detected infers transfer of the computing device between two users as illustrated in FIG. 5d. For instance, the transfer determining module 102* including the visual cue detecting module 220 (see FIG. 2c) of the computing device 10* determining that the computing device 10* has been transferred from the first user 20 to the second user 30 when the visual cue detecting module 220 at least detects presence or absence of one or more visual cues (e.g., detecting presence or absence of faces of the first user 20 and/or second user 30, detecting background movement relative to the computing device 10*, and so forth) in proximate vicinity (e.g., within a distance from the computing device 10* from which an object or a person is visually discernable or identifiable by the computing device 10*) of the computing device 10* that when detected as occurring infers transfer of the computing device 10* between two users.

Figure 5E:
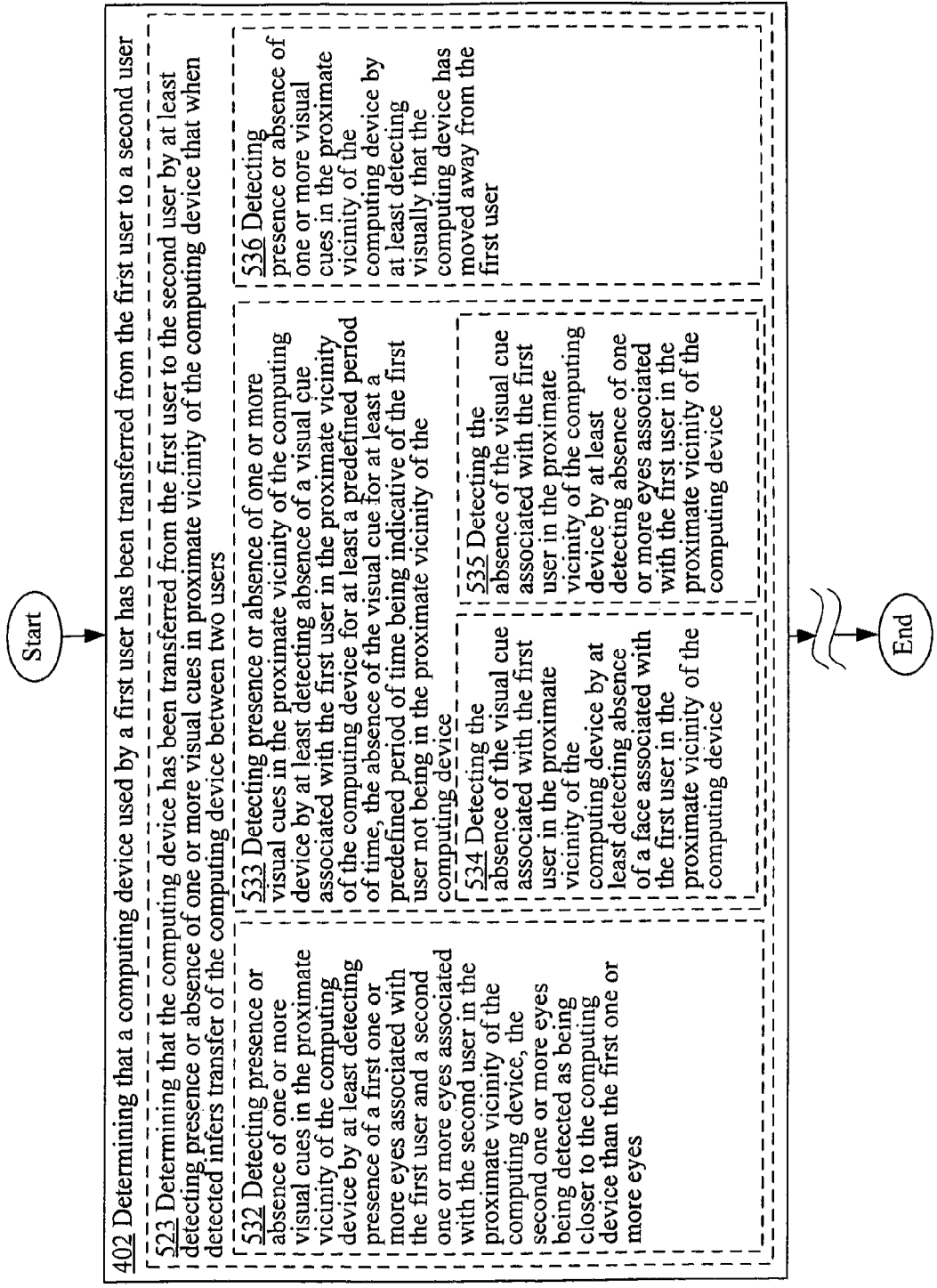
FIG. 5e is a high-level logic flowchart of a process depicting alternate implementations of the transfer determining operation 402 of FIG. 4.

As further illustrated in FIGS. 5d and 5e, operation 523 may be implemented in a number of different ways in various alternative implementations. For example, in some implementations, operation 523 may include an operation 524 for detecting presence or absence of one or more visual cues in the proximate vicinity of the computing device by at least detecting presence of one or more visual cues located within a predefined distance from the computing device from which a user is able to perceive content being presented through the computing device. For instance, the visual cue detecting module 220 of the computing device 10* detecting presence or absence of one or more visual cues in the proximate vicinity of the computing device 10* by at least detecting presence of one or more visual cues located within a predefined distance from the computing device 10* from which a user is able to perceive content being presented through the computing device 10*. For example, if the face of the second user 30 is determined to be within a distance from the computing device 10* from which the second user 30 is able to ascertain what is being displayed through the computing device 10*, then determining that the transfer of the computing device 10* has occurred from the first user 20 to the second user 30.

In the same or different implementations, operation 523 may include an operation 525 for detecting presence or absence of one or more visual cues in the proximate vicinity of the computing device by detecting at least a change in lighting in the proximate vicinity of the computing device that infers that the computing device has at least moved. For instance, the visual cue detecting module 220 including the lighting change detecting module 221 (see FIG. 2c) of the computing device 10* detecting presence or absence of one or more visual cues in the proximate vicinity of the computing device 10\* when the lighting change detecting module 221 detects at least a change in lighting in the proximate vicinity of the computing device 10\* that infers that the computing device 10\* has at least moved. That is, typically when an item such as a computing device 10\* is moved from one location to another location, there may be a variation in the type/amount of light being exposed to the item. Thus, by merely detecting changes in lighting conditions surrounding the computing device 10\*, an inference could be made that, for example, a computing device 10\* is being moved and being transferred.

In some cases, operation 525 may further include an operation 526 for detecting at least a change in lighting in the proximate vicinity of the computing device that infers that the computing device has at least moved by detecting at least a predefined amount of change in lighting in the proximate vicinity of the computing device within a predefined time period as further depicted in FIG. 5*d*. For instance, the lighting change detecting module 221 of the computing device 10\* detecting at least a change in lighting in the proximate vicinity of the computing device 10\* that infers that the computing device 10\* has at least moved (e.g. has been relocated) by detecting at least a predefined amount of change in lighting in the proximate vicinity of the computing device 10\* within a predefined time period. In doing so, inconsequential lighting changes will be filtered out such as those as a result of changes in daylight, which typically occurs slowly.

In the same or different implementations, operation 523 may include an operation 527 for determining that the computing device has been transferred from the first user to the second user by at least detecting presence of at least one face in the proximate vicinity of the computing device not associated with the first user. For instance, the transfer determining module 102\* including the face detecting module 222 (see FIG. 2*c*) of the computing device 10\* determining that the computing device 10\* has been transferred from the first user 20 to the second user 30 when the face detecting module 222 at least detects presence of at least one face (e.g., detecting presence of the at least one face based on image data provided by an image capturing device 204) in the proximate vicinity of the computing device 10\* not associated with the first user 20.

As further illustrated in FIG. 5*d*, in some implementations, operation 527 may include an operation 528 for detecting presence of at least one face in the proximate vicinity of the computing device not associated with the first user by at least detecting presence of at least one face in the proximate vicinity of the computing device that is recognized as being associated with the second user. For instance, the face detecting module 222 of the computing device 10\* detecting presence of at least one face in the proximate vicinity of the computing device 10\* not associated with the first user 20 by at least detecting presence of at least one face in the proximate vicinity of the computing device 10\* that is recognized as being associated with the second user 30. In some cases, the computing device 10\* may store in its memory 114 facial images of one or more third parties including, for example, a facial image of the second user 30.

In some cases, operation 523 may alternatively or additionally include an operation 529 for detecting presence or absence of one or more visual cues in the proximate vicinity of the computing device by at least detecting presence of a first face associated with the first user and a second face associated with the second user in the proximate vicinity of the computing device, the second face being detected as being closer to the computing device than the first face. For instance, the visual cue detecting module 220 including the face detecting module 222 of the computing device 10\* detecting presence or absence of one or more visual cues in the proximate vicinity of the computing device 10\* when the face detecting module 222 at least detects presence of a first face associated with the first user 20 and a second face associated with the second user 30 in the proximate vicinity of the computing device 10\*, the second face being detected as being closer to the computing device 10\*than the first face of the first user 20. Note that in this particular implementation, the second face does not necessarily need to be detected as belonging to the second user 30. Instead, the computing device 10\* or at least the logic endowed with the computing device 10\* may only need to recognize that the second face is not associated with the first user 20.

In the same or different implementations, operation 523 may include an operation 530 for detecting presence or absence of one or more visual cues in the proximate vicinity of the computing device by detecting presence of at least one eye in the proximate vicinity of the computing device not associated with the first user as further depicted in FIG. 5*d*. For instance, the visual cue detecting module 220 including the eye detecting module 223 of the computing device 10\* detecting presence or absence of one or more visual cues in the proximate vicinity of the computing device 10\* when the eye detecting module 223 detects presence of at least one eye (e.g., iris or retina characteristics) in the proximate vicinity of the computing device 10\* not associated with the first user 20. In other words, determining that there is at least one eye having iris or retina characteristics in the proximate vicinity of the computing device 10\* that is different from the iris or retina characteristics of the eye or eyes of the first user 20.

In some cases operation 530 may further include an operation 531 for detecting presence of at least one eye in the proximate vicinity of the computing device not associated with the first user by at least detecting presence of at least one eye in the proximate vicinity of the computing device that is recognized as being associated with the second user. For instance, the eye detecting module 223 of the computing device 10\* detecting presence of at least one eye in the proximate vicinity of the computing device 10\* not associated with the first user 20 by at least detecting presence of at least one eye in the proximate vicinity of the computing device 10\* that is recognized as being associated with the second user 30. Thus, in some cases, the computing device 10\* may store in its memory 114 images of eyes (e.g., images of irises or retinas) belonging to one or more third parties including, for example, the second user 30.

In the same or different implementations, operation 523 may include an operation 532 for detecting presence or absence of one or more visual cues in the proximate vicinity of the computing device by at least detecting presence of a first one or more eyes associated with the first user and a second one or more eyes associated with the second user in the proximate vicinity of the computing device, the second one or more eyes being detected as being closer to the computing device than the first one or more eyes as illustrated in FIG. 5*e*. For instance, the visual cue detecting module 220 including the eye detecting module 223 of the computing device 10\* detecting presence or absence of one or more visual cues in the proximate vicinity of the computing device 10\* when the eye detecting module 223 at least detects presence of a first one or more eyes associated with the first user 20 and a second one or more eyes associated with the second user 30 in the proximate vicinity of the computing device 10\*, the second one or more eyes being detected as being closer to the computing device 10\* than the first one or more eyes.

In the same or different implementations, operation 523 may include an operation 533 for detecting presence or absence of one or more visual cues in the proximate vicinity of the computing device by at least detecting absence of a visual cue associated with the first user in the proximate vicinity of the computing device for at least a predefined period of time, the absence of the visual cue for at least a predefined period of time being indicative of the first user not being in the proximate vicinity of the computing device as further illustrated in FIG. 5e. For instance, the visual cue detecting module 220 of the computing device 10* detecting presence or absence of one or more visual cues in the proximate vicinity of the computing device 10* by at least detecting absence of a visual cue associated with the first user 20 in the proximate vicinity of the computing device 10* for at least a predefined period of time, the absence of the visual cue (e.g., an eye or a face associated with the first user 20*) for at least a predefined period of time being indicative of the first user 20 not being in the proximate vicinity of the computing device 10*. Note that since it is possible for the visual cues (e.g., an eye or a face) of the first user 20 to disappear momentarily or for short periods of time (such as when the head of the first user 20 turns to look at something other than the computing device 10*) even though the first user 20 has not actually given up control of the computing device 10* or has not transferred the computing device 10* to another user (e.g., the second user 30), the computing device 10*(or its logic) may not infer or conclude that the computing device 10* has been transferred unless the visual cue (e.g., eye or face of the first user 20) is detected as being absence in the proximate vicinity of the computing device 10* for at least a certain amount of predefined time (e.g., 10 second, 20 seconds, 25 seconds, or some other time period).

As further illustrated in FIG. 5e, in some implementations, operation 533 may include one or more additional operations including an operation 534 for detecting the absence of the visual cue associated with the first user in the proximate vicinity of the computing device by at least detecting absence of a face associated with the first user in the proximate vicinity of the computing device. For instance, the visual cue detecting module 220 including the face detecting module 222 of the computing device 10 detecting absence of a visual cue associated with the first user 20 in the proximate vicinity of the computing device 10* when the face detecting module 222 at least detects absence of a face associated with the first user 20 in the proximate vicinity of the computing device 10*. For example, if the computing device 10* includes an image capturing device 204, such as a webcam, then the computing device 10* may detect the absence of the visual cue of the first user 20 when the webcam does not detect the face of the first user 20* near the computing device 10*(e.g., within 5 feet, 10 feet, 12 feet, or within some other distance from the computing device 10* that a face of the first user 20 can be detected/identified by the computing device 10*).

In the same or different implementations, operation 533 may include an operation 535 for detecting the absence of the visual cue associated with the first user in the proximate vicinity of the computing device by at least detecting absence of one or more eyes associated with the first user in the proximate vicinity of the computing device as further depicted in FIG. 5e. For instance, the visual cue detecting module 220 including the eye detecting module 223 of the computing device 10* detecting absence of a visual cue associated with the first user 20 in the proximate vicinity of the computing device 10* when the eye detecting module 223 at least detects absence of one or more eyes associated with the first user 20 in the proximate vicinity of the computing device 10*. For example, if the computing device 10* includes an image capturing device 204, then the computing device 10* may detect the absence of the visual cue of the first user 20 when the image capturing device 204 does not detect the one or more eyes of the first user 20* near the computing device 10*(e.g., within 2 feet, 4 feet, 6 feet, or within some other distance from the computing device 10* that an eyeball of the first user 20 can be detected/identified by the computing device 10*).

In various implementations, operation 523 for determining that the computing device has been transferred from the first user to the second user by at least detecting presence or absence of one or more visual cues in proximate vicinity of the computing device that when detected infers transfer of the computing device between two users may further include an operation 536 for detecting presence or absence of one or more visual cues in the proximate vicinity of the computing device by at least detecting visually that the computing device has moved away from the first user as further depicted in FIG. 5e. For instance, the visual cue detecting module 220 including the visual moving away detecting module 224 of the computing device 10* detecting presence or absence of one or more visual cues in the proximate vicinity of the computing device 10* when the visual moving away detecting module 224 at least detects visually (e.g., via an image capturing device 204) that the computing device 10* has moved away from the first user 20.

Figure 5F:
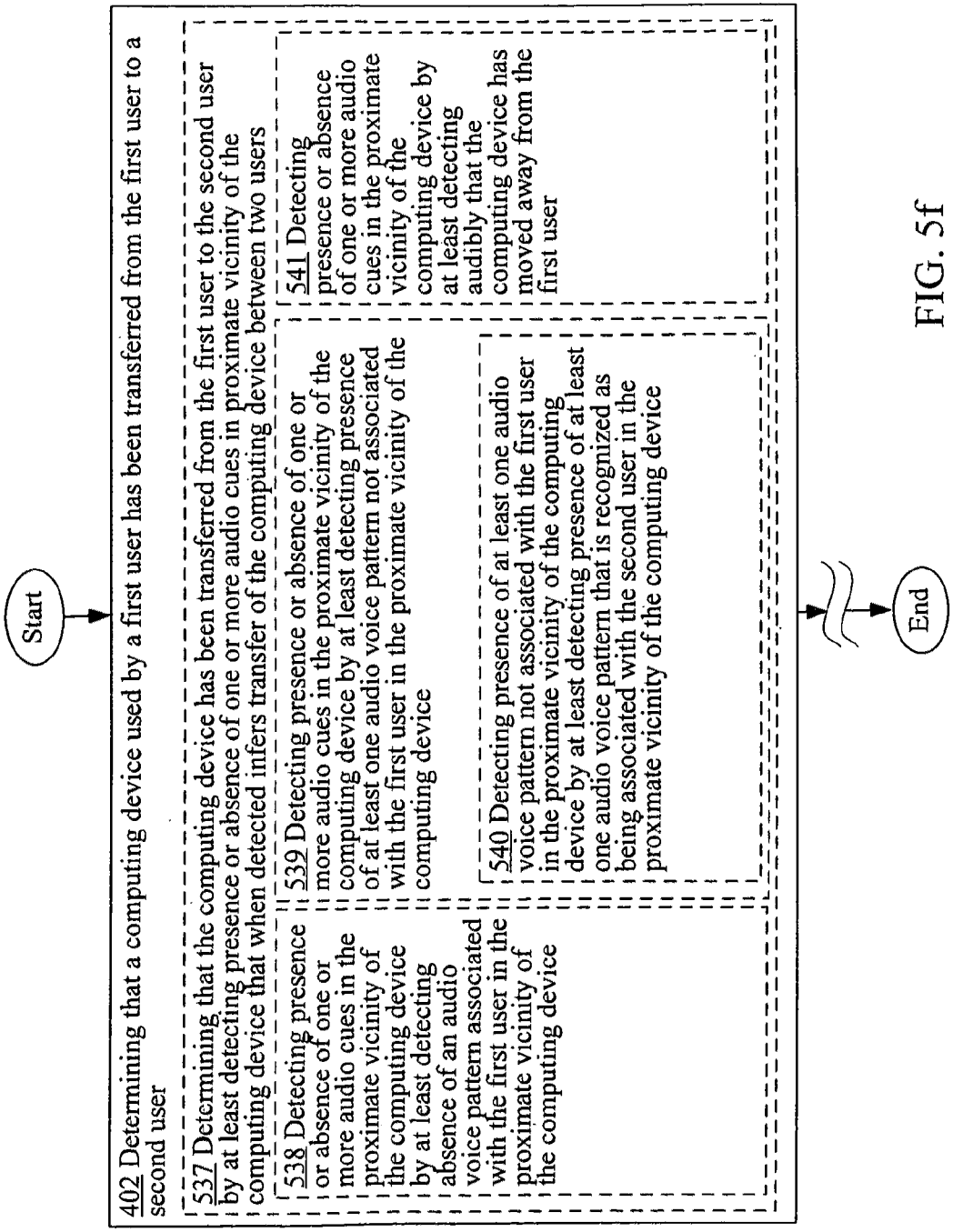
FIG. 5f is a high-level logic flowchart of a process depicting alternate implementations of the transfer determining operation 402 of FIG. 4.

In various implementations, the transfer determining operation 402 of FIG. 4 for determining that a computing device used by a first user has been transferred from the first user to a second user may involve making the transfer determination based, at least in part, on audio cues. For example, and as illustrated in FIG. 5f, in some implementations, the transfer determining operation 402 may include an operation 537 for determining that the computing device has been transferred from the first user to the second user by at least detecting presence or absence of one or more audio cues in proximate vicinity of the computing device that when detected infers transfer of the computing device between two users. For instance, the transfer determining module 102* including the audio cue detecting module 226 of the computing device 10* determining that the computing device 10* has been transferred from the first user 20 to the second user 30 when the audio cue detecting module 226 at least detects presence or absence of one or more audio cues (e.g., audio cues associated specifically with the first user 20) in proximate vicinity of the computing device 10*.

As further illustrated in 5f, operation 537 may include one or more additional operations in various alternative implementations. For example, in some implementations, operation 537 may include an operation 538 for detecting presence or absence of one or more audio cues in the proximate vicinity of the computing device by at least detecting absence of an audio voice pattern associated with the first user in the proximate vicinity of the computing device. For instance, the audio cue detecting module 226 including the voice pattern detecting module 227 of the computing device 10* detecting presence or absence of one or more audio cues in the proximate vicinity of the computing device 10* when the voice pattern detecting module 227 at least detects absence (e.g., detects absence for at least a predefined amount of time) of an audio voice pattern associated with the first user 20 in the proximate vicinity (e.g., within 10 feet or within some other distance from which voice of the first user 20 is at least clearly discernable) of the computing device 10*.

In the same or different implementations, operation 537 may include an operation 539 for detecting presence or absence of one or more audio cues in the proximate vicinity of the computing device by at least detecting presence of at least one audio voice pattern not associated with the first user in the proximate vicinity of the computing device. For instance, the audio cue detecting module 226 including the voice pattern detecting module 227 of the computing device 10* detecting presence or absence of one or more audio cues in the proximate vicinity of the computing device 10* when the voice pattern detecting module 227 at least detects presence of at least one audio voice pattern not associated with the first user 20 in the proximate vicinity (e.g., within 5 feet or within some other distance from which voice of the second user 30 is at least clearly discernable or identifiable) of the computing device 10*.

As further illustrated in FIG. 5f, in some cases, operation 539 may further include an operation 540 for detecting presence of at least one audio voice pattern not associated with the first user in the proximate vicinity of the computing device by at least detecting presence of at least one audio voice pattern that is recognized as being associated with the second user in the proximate vicinity of the computing device. For instance, the voice pattern detecting module 227 of the computing device 10* detecting presence of at least one audio voice pattern not associated with the first user 20 in the proximate vicinity of the computing device 10* by at least detecting presence of at least one audio voice pattern that is recognized as being associated with the second user 30 in the proximate vicinity of the computing device 10*.

In the same or different implementations, operation 537 may include an operation 541 for detecting presence or absence of one or more audio cues in the proximate vicinity of the computing device by at least detecting audibly that the computing device has moved away from the first user. For instance, the audio cue detecting module 226 including the audio moving away detecting module 228 of the computing device 10* detecting presence or absence of one or more audio cues in the proximate vicinity of the computing device 10* when the audio moving away detecting module 228 at least detects audibly (e.g., using one or more audio capturing device 206) that the computing device 10* has moved away from the first user 20. For example, the audio moving away detecting module 228 detecting that the volume of an audio cue, such as a voice pattern, that is associated with the first user 20 is diminishing or has diminished, which would be an inference that the computing device 10* may be or may have moved away from the first user 20.

Figure 5G:
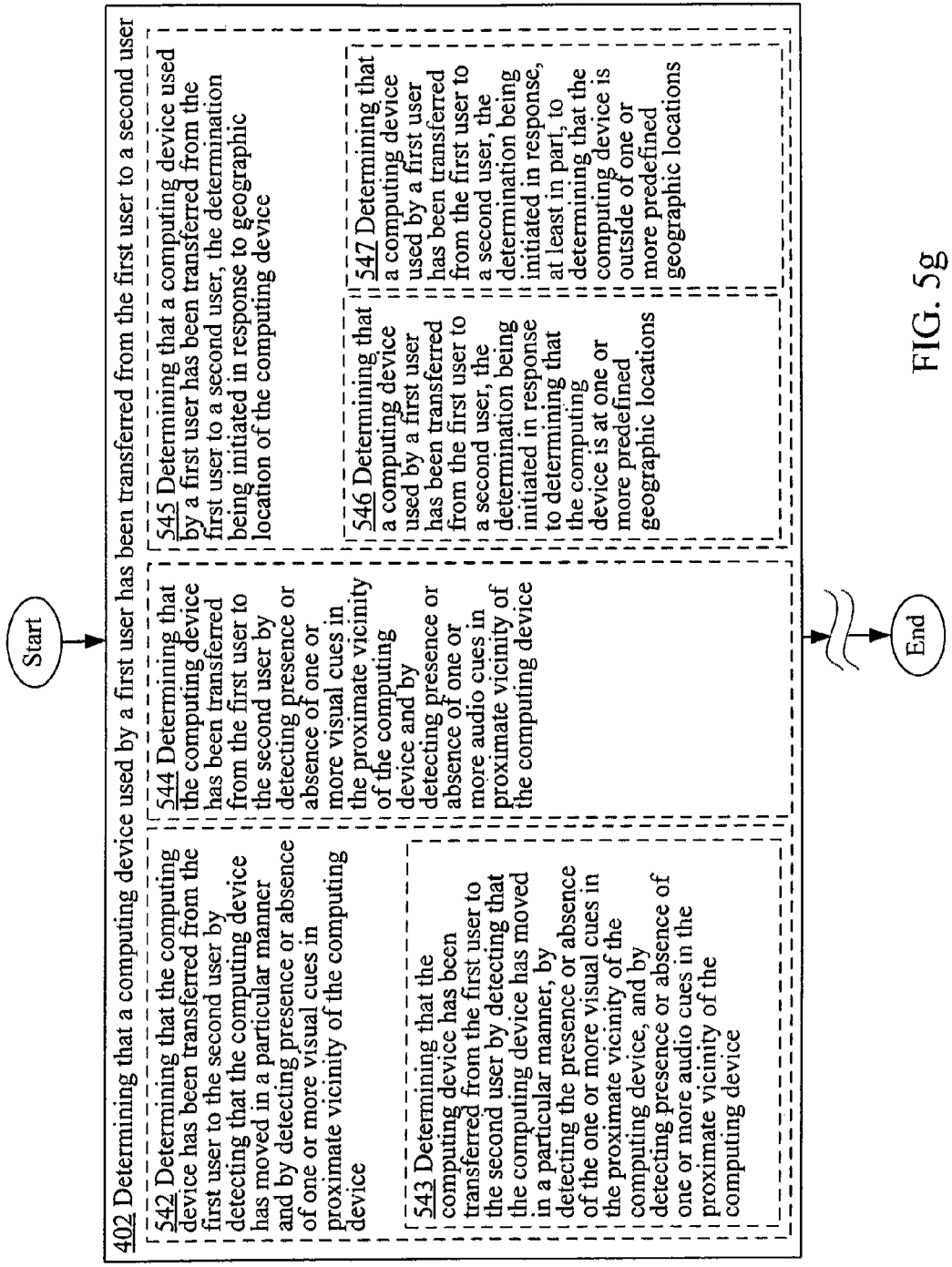
FIG. 5g is a high-level logic flowchart of a process depicting alternate implementations of the transfer determining operation 402 of FIG. 4.

In various implementations, the transfer determining operation 402 of FIG. 4 for determining that a computing device used by a first user has been transferred from the first user to a second user may involve determining the transfer of the computing device 10* based on a combination of detecting direct movements of the computing device 10*, detecting visual cues, and/or detecting audio cues. For example, in some implementations, the transfer determining operation 402 may include an operation 542 for determining that the computing device has been transferred from the first user to the second user by detecting that the computing device has moved in a particular manner and by detecting presence or absence of one or more visual cues in proximate vicinity of the computing device as illustrated in FIG. 5g. For instance, the transfer detecting module 102* including the particular movement detecting module 210 and the visual cue detecting module 220 of the computing device 10* determining that the computing device 10* has been transferred from the first user 20 to the second user 30 when the particular movement detecting module 210 detects that the computing device 10* has moved in a particular manner and the visual cue detecting module 220 detects presence or absence of one or more visual cues in proximate vicinity of the computing device 10*.

As further illustrated in FIG. 5g, in some cases, operation 542 may further include an operation 543 for determining that the computing device has been transferred from the first user to the second user by detecting that the computing device has moved in a particular manner, by detecting the presence or absence of the one or more visual cues in the proximate vicinity of the computing device, and by detecting presence or absence of one or more audio cues in the proximate vicinity of the computing device. For instance, the transfer determining module 102* including the particular movement detecting module 210, the visual cue detecting module 220, and the audio cue detecting module 226 of the computing device 10* determining that the computing device 10* has been transferred from the first user 20 to the second user 30 when the particular movement detecting module 210 detects that the computing device 10* has moved in a particular manner, the visual cue detecting module 220 detects the presence or absence of the one or more visual cues in the proximate vicinity of the computing device 10*, and the audio cue detecting module 226 detects presence or absence of one or more audio cues in the proximate vicinity of the computing device 10*.

In some alternative implementations, the transfer determining operation 402 may include an operation 544 for determining that the computing device has been transferred from the first user to the second user by detecting presence or absence of one or more visual cues in the proximate vicinity of the computing device and by detecting presence or absence of one or more audio cues in proximate vicinity of the computing device as further depicted in FIG. 5g. For instance, the transfer determining module 102* including the visual cue detecting module 220 and the audio cue detecting module 226 of the computing device 10* determining that the computing device 10* has been transferred from the first user 20 to the second user 30 when the visual cue detecting module 220 detects presence or absence of one or more visual cues in the proximate vicinity of the computing device 10* and the audio cue detecting module 226 detects presence or absence of one or more audio cues in proximate vicinity of the computing device 10*.

In various implementations, the transfer determining operation 402 of FIG. 4 may be prompted to be performed in response to occurrence of one or more events. That is, in some cases, it may be desirable to perform the transfer determining operation 402 (as well as the access restricting operation 404) only after occurrence of certain conditions have been detected. For example, in some implementations, the transfer determining operation 402 may include an operation 545 for determining that a computing device used by a first user has been transferred from the first user to a second user, the determination being initiated in response to geographic location of the computing device. For instance, the transfer determining module 102* including the geographic location determination module 230 of the computing device 10* determining that a computing device 10* used by a first user 20 has been transferred from the first user 20 to a second user 30, the determination being initiated in response to geographic location (as determined by the geographic location determination module 230 using, for example, data provided by a GPS 208) of the computing device 10*. For example, whenever the computing device 10* is determined to be located at the home of the first user 20, the transfer determining operation 402 (as well as the access restricting operation 404) may be disabled.

As further illustrated in FIG. 5g, in some implementations, operation 545 may further include an operation 546 for determining that a computing device used by a first user has been transferred from the first user to a second user, the determination being initiated in response to determining that the computing device is at one or more predefined geographic locations. For instance, the transfer determining module 102* including the geographic location determination module 230 of the computing device 10* determining that a computing device 10* used by a first user 20 has been transferred from the first user 20 to a second user 30, the determination being initiated in response to the geographic location determination module 230 using, for example, data provided by a GPS 208 determining that the computing device 10* is at one or more predefined geographic locations.

In some implementations, operation 545 may alternatively include an operation 547 for determining that a computing device used by a first user has been transferred from the first user to a second user, the determination being initiated in response, at least in part, to determining that the computing device is outside of one or more predefined geographic locations. For instance, the transfer determining module 102* including the geographic location determination module 230 of the computing device 10* determining that a computing device 10* used by a first user 20 has been transferred from the first user 20 to a second user 30, the determination being initiated in response, at least in part, to the geographic location determination module 230 determining that the computing device 10* is outside of one or more predefined geographic locations (e.g., home of first user 20).

Figure 6A:
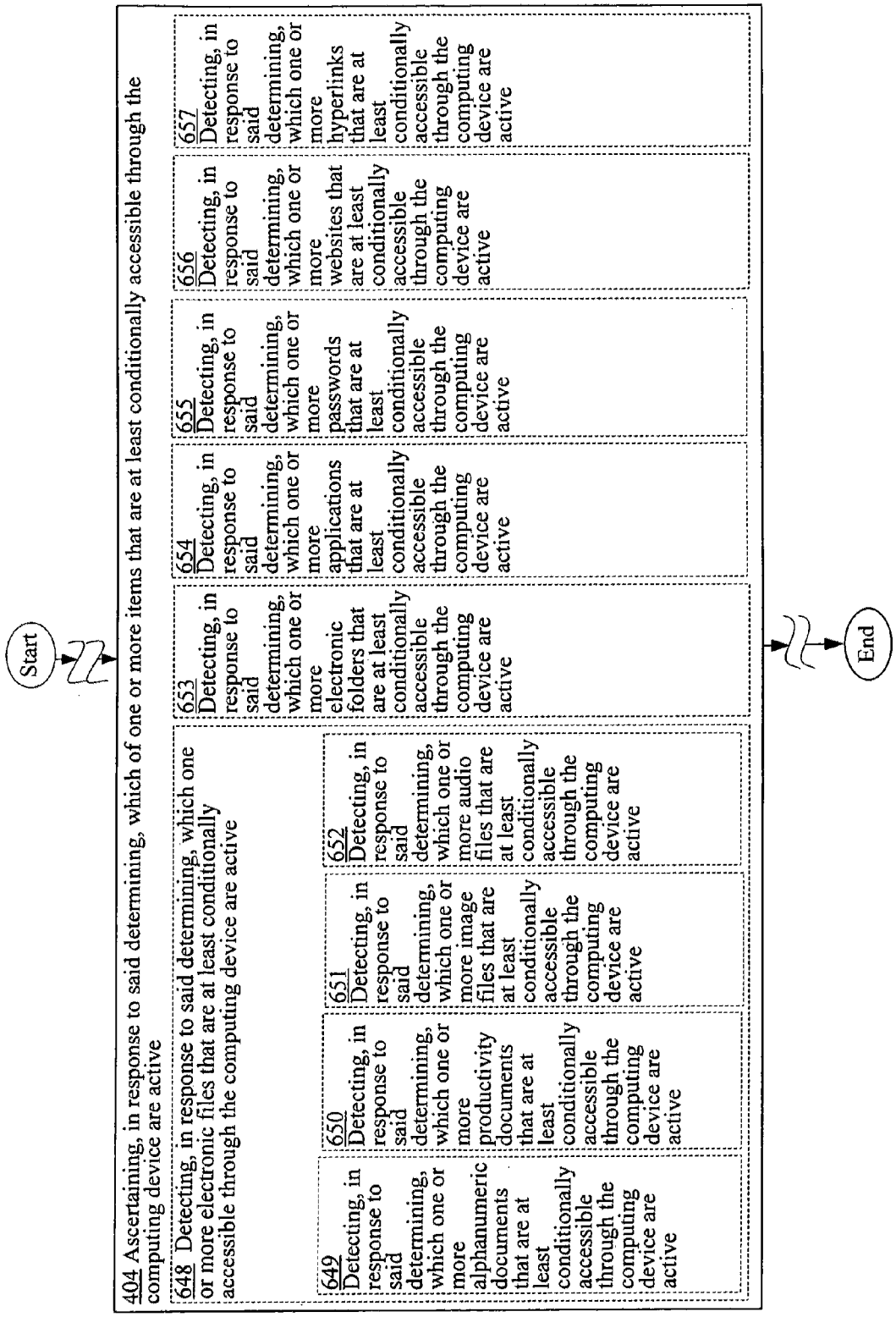
FIG. 6a is a high-level logic flowchart of a process depicting alternate implementations of the active ascertaining operation 404 of FIG. 4.
Figure 6B:
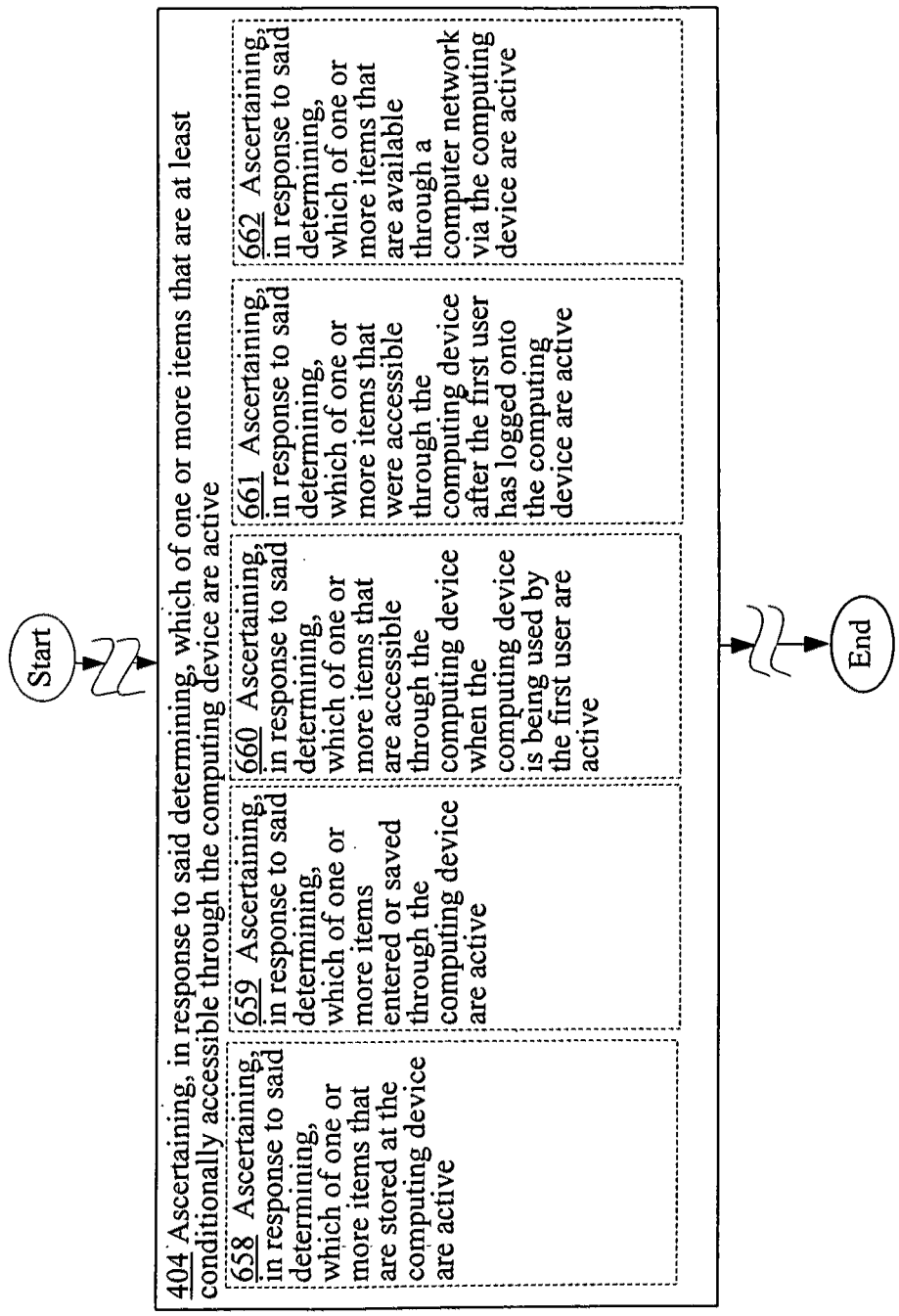
FIG. 6b is a high-level logic flowchart of a process depicting alternate implementations of the active ascertaining operation 404 of FIG. 4.
Figure 6C:
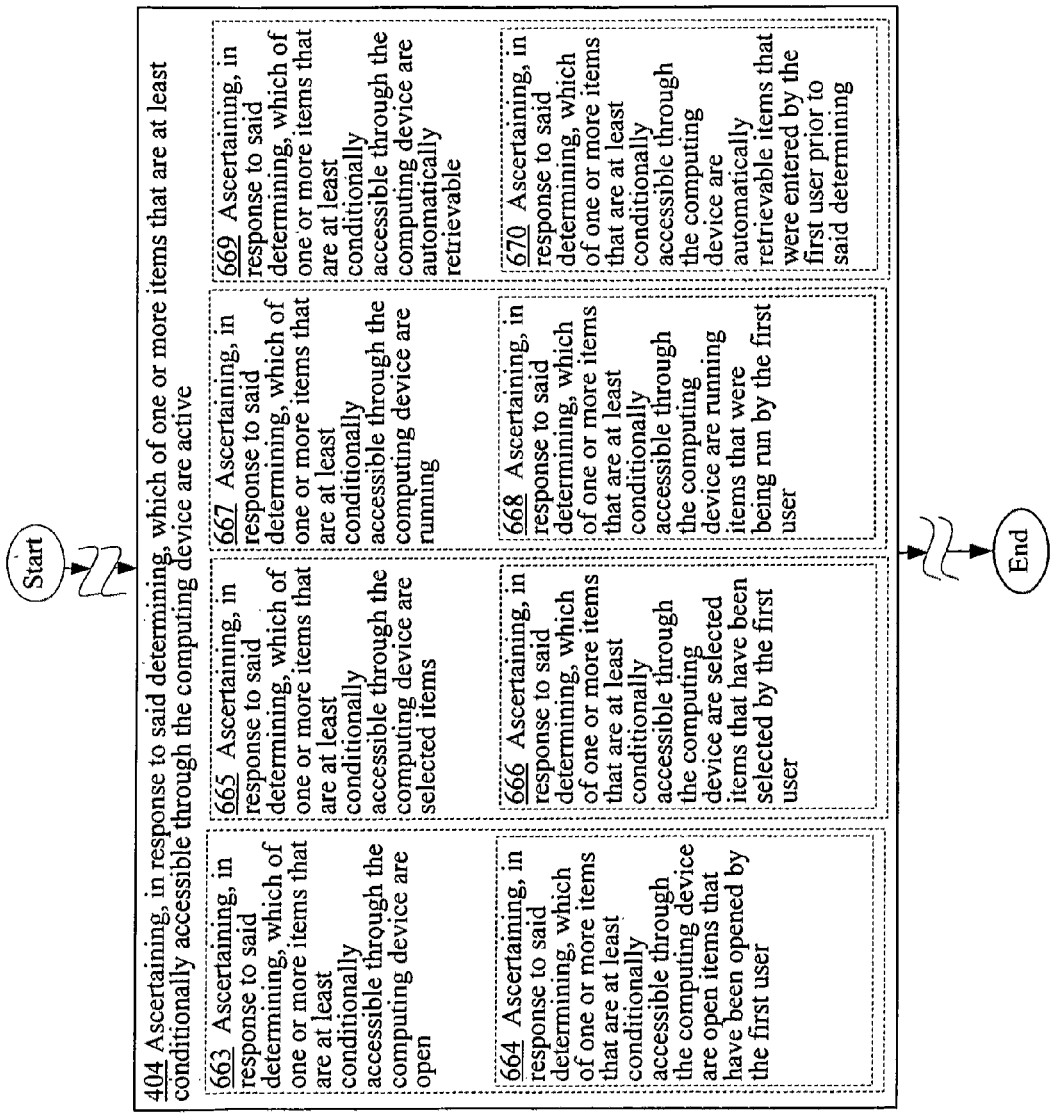
FIG. 6c is a high-level logic flowchart of a process depicting alternate implementations of the active ascertaining operation 404 of FIG. 4.

Referring back to the active ascertaining operation 404 of FIG. 4, the active ascertaining operation 404 similar to the transfer determining operation 402 of FIG. 4 may be executed in a number of different ways in various alternative embodiments as illustrated in FIGS. 6a, 6b, and 6c. In some implementations, for example, the active ascertaining operation 404 of FIG. 4 may include an operation 648 for detecting, in response to said determining, which one or more electronic files that are at least conditionally accessible through the computing device are active as illustrated in FIG. 6a. For instance, the active electronic file detecting module 232 of the computing device 10*(e.g., the computing device 10' of FIG. 2a or the computing device 10" of FIG. 2b) detecting in response to said determining by the transfer determining module 102*, which one or more electronic files (e.g., word processing files, audio files, image files, video files, and/or other types of electronic files) that are at least conditionally accessible through the computing device 10* are active (e.g., are open, are being visually and/or audibly presented, and so forth).

As further illustrated in FIG. 6a, operation 648 may be implemented in a number of different ways in various alternative implementations. For example, in some implementations, operation 648 may include an operation 649 for detecting, in response to said determining, which one or more alphanumeric documents that are at least conditionally accessible through the computing device are active. For instance, the active electronic file detecting module 232 (see FIG. 2d) of the computing device 10* detecting, in response to said determining by the transfer determining module 102*, which one or more alphanumeric documents (e.g., textual documents such as word processing documents, spreadsheet documents, email messages, and so forth) that are at least conditionally accessible through the computing device 10* are active.

In the same or different implementations, operation 648 may include an operation 650 for detecting, in response to said determining, which one or more productivity documents that are at least conditionally accessible through the computing device are active. For instance, the active electronic file detecting module 232 of the computing device 10* detecting, in response to said determining by the transfer determining module 102*, which one or more productivity documents (e.g., word processing documents, spreadsheet documents, presentation documents, and so forth) that are at least conditionally accessible through the computing device 10* are active (e.g., productivity documents that are open or being displayed).

In the same or different implementations, operation 648 may include an operation 651 for detecting, in response to said determining, which one or more image files that are at least conditionally accessible through the computing device are active. For instance, the active electronic file detecting module 232 of the computing device 10* detecting, in response to said determining by the transfer determining module 102*, which one or more image files (e.g., digital photos or video files) that are at least conditionally accessible through the computing device are active (e.g., were open or being displayed).

In the same or different implementations, operation 648 may include an operation 652 for detecting, in response to said determining, which one or more audio files that are at least conditionally accessible through the computing device are active. For instance, the active electronic file detecting module 232 of the computing device 10* detecting, in response to said determining by the transfer determining module 102*, which one or more audio files (e.g., voice mail, audio recording, music files, and so forth) that are at least conditionally accessible through the computing device 10* are active (e.g., were open).

In some cases, the active ascertaining operation 404 of FIG. 4 may additionally or alternatively include an operation 653 for detecting, in response to said determining, which one or more electronic folders that are at least conditionally accessible through the computing device are active as further illustrated in FIG. 6a. For instance, the active electronic folder detecting module 234 (see FIG. 2d) of the computing device 10* detecting, in response to said determining by the transfer determining module 102*, which one or more electronic folders (e.g., word processing folders, email folders, digital image folders, and so forth) that are at least conditionally accessible through the computing device 10*) are active (e.g., has been accessed or opened by the first user 20).

In the same or different implementations, the active ascertaining operation 404 may include an operation 654 for detecting, in response to said determining, which one or more applications that are at least conditionally accessible through the computing device are active. For instance, the active application detecting module 236 (see FIG. 2d) of the computing device 10* detecting, in response to said determining by the transfer determining module 102*, which one or more applications (e.g., productivity applications, messaging applications such as email applications, personal information manager applications such as Microsoft Outlook, and so forth) that are at least conditionally accessible through the computing device 10* are active (e.g., open or running applications).

In the same or different implementations, the active ascertaining operation 404 may include an operation 655 for detecting, in response to said determining, which one or more passwords that are at least conditionally accessible through the computing device are active. For instance, the active password detecting module 237 (see FIG. 2d) of the computing device 10* detecting, in response to said determining by the transfer determining module 102*, which one or more passwords that are at least conditionally accessible through the computing device 10* are active (e.g., the first user 20* had automatic access to the one or more passwords because the first user 20 had, for example, properly logged onto the computing device 10*).

In the same or different implementations, the active ascertaining operation 404 may include an operation 656 for detecting, in response to said determining, which one or more websites that are at least conditionally accessible through the computing device are active. For instance, the active website detecting module 238 (see FIG. 2*d*) of the computing device 10* detecting, in response to said determining by the transfer determining module 102*, which one or more websites that are at least conditionally accessible through the computing device 10* are active (e.g., opened websites).

In the same or different implementations, the active ascertaining operation 404 may include an operation 657 for detecting, in response to said determining, which one or more hyperlinks that are at least conditionally accessible through the computing device are active. For instance, the active hyperlink detecting module 240 (see FIG. 2*d*) of the computing device 10* detecting, in response to said determining by the transfer determining module 102*, which one or more hyperlinks that are at least conditionally accessible through the computing device 10* are active (e.g., active hyperlinks used by the first user 20).

In various implementations, the one or more items that may be "conditionally accessible" through the computing device 10* may be conditionally accessible for a number of different reasons. For example, and turning now to FIG. 6*b*, in various implementations, the active ascertaining operation 404 of FIG. 4 may include an operation 658 for ascertaining, in response to said determining, which of one or more items that are stored at the computing device are active as illustrated in FIG. 6*b*. For instance, the active ascertaining module 104* of the computing device 10* ascertaining, in response to said determining by the transfer determining module 102*, which of one or more items that are stored at the computing device 10*(e.g., stored in memory 114) are active.

In the same or different implementations, the active ascertaining operation 404 may include an operation 659 for ascertaining, in response to said determining, which of one or more items entered or saved through the computing device are active. For instance, the active ascertaining module 104* of the computing device 10* ascertaining, in response to said determining by the transfer determining module 102*, which of one or more items (e.g., documents, passwords, files) entered or saved through the computing device 10* are active.

In the same or different implementations, the active ascertaining operation 404 may include an operation 660 for ascertaining, in response to said determining, which of one or more items that are accessible through the computing device when the computing device is being used by the first user are active. For instance, the active ascertaining module 104* of the computing device 10* ascertaining, in response to said determining by the transfer determining module 102*, which of one or more items that are accessible through the computing device 10* when the computing device 10* is being used by the first user 20 are active. Examples of such items include, for example, an email account or an email message directed to the first user 20.

In the same or different implementations, the active ascertaining operation 404 may include an operation 661 for ascertaining, in response to said determining, which of one or more items that were accessible through the computing device after the first user has logged onto the computing device are active. For instance, the active ascertaining module 104* of the computing device 10* ascertaining, in response to said determining by the transfer determining module 102*, which of one or more items that were accessible through the computing device 10* after the first user 20 has logged onto the computing device 10* are active.

In the same or different implementations, the active ascertaining operation 404 may include an operation 662 for ascertaining, in response to said determining, which of one or more items that are available through a computer network via the computing device are active. For instance, the active ascertaining module 104* of the computing device 10* ascertaining, in response to said determining by the transfer determining module 102*, which of one or more items that are available through a computer network (e.g., cloud computing) via the computing device 10* are active (e.g., being accessed).

In various implementations, the word "active" as used herein may be in reference to a number of different things depending on the specific circumstances. For example, and turning now to FIG. 6*c*, the active ascertaining operation 404 of FIG. 4, in some implementations, may include an operation 663 for ascertaining, in response to said determining, which of one or more items that are at least conditionally accessible through the computing device are open. For instance, the open item ascertaining module 242 (see FIG. 2*d*) of the computing device 10* ascertaining, in response to said determining by the transfer determining module 102*, which of one or more items (e.g., documents, files, folders, applications, and so forth) that are at least conditionally accessible through the computing device 10* are open (e.g., are open items).

As further illustrated in FIG. 6*c*, in some cases, operation 663 may include an operation 664 for ascertaining, in response to said determining, which of one or more items that are at least conditionally accessible through the computing device are open items that have been opened by the first user. For instance, the open item ascertaining module 242 (see FIG. 2*d*) of the computing device 10* ascertaining, in response to said determining by the transfer determining module 102*, which of one or more items that are at least conditionally accessible through the computing device 10* are open items that have been opened by the first user 20.

In the same or different implementations, the active ascertaining operation 404 may include an operation 665 for ascertaining, in response to said determining, which of one or more items that are at least conditionally accessible through the computing device are selected items as illustrated in FIG. 6*c*. For instance, the selected item ascertaining module 244 (see FIG. 2*d*) of the computing device 10* ascertaining, in response to said determining by the transfer determining module 102*, which of one or more items that are at least conditionally accessible through the computing device 10* are selected items (e.g., as selected for use through the computing device 10*).

In some implementations, operation 665 may further include an operation 666 for ascertaining, in response to said determining, which of one or more items that are at least conditionally accessible through the computing device are selected items that have been selected by the first user. For instance, the selected item ascertaining module 244 of the computing device 10* ascertaining, in response to said determining by the transfer determining module 102*, which of one or more items that are at least conditionally accessible through the computing device 10* are selected items that have been selected by the first user 20.

In the same or different implementations, the active ascertaining operation 404 may include an operation 667 for ascertaining, in response to said determining, which of one or more items that are at least conditionally accessible through the computing device are running. For instance, the running item ascertaining module 246 (see FIG. 2*d*) of the computing device 10\* ascertaining, in response to said determining by the transfer determining module 102\*, which of one or more items (e.g., applications) that are at least conditionally accessible through the computing device 10\* are running.

In some implementations, operation 667 may further include an operation 668 for ascertaining, in response to said determining, which of one or more items that are at least conditionally accessible through the computing device are running items that were being run by the first user. For instance, the running item ascertaining module 246 of the computing device 10\* ascertaining, in response to said determining by the transfer determining module 102\*, which of one or more items (e.g., software applications) that are at least conditionally accessible through the computing device 10\* are running items that were being run by the first user 20.

In the same or different implementations, the active ascertaining operation 404 may include an operation 669 for ascertaining, in response to said determining, which of one or more items that are at least conditionally accessible through the computing device are automatically retrievable. For instance, the automatically retrievable item ascertaining module 248 (see FIG. 2*d*) of the computing device 10\* ascertaining, in response to said determining by the transfer determining module 102\*, which of one or more items that are at least conditionally accessible through the computing device 10\* are automatically retrievable. In various embodiments, references to "automatically retrievable items" may be in reference to items such as passwords that may be automatically available for filling, for example, an entry field for entering a password.

In some implementations, operation 669 may further include an operation 670 for ascertaining, in response to said determining, which of one or more items that are at least conditionally accessible through the computing device are automatically retrievable items that were entered by the first user prior to said determining. For instance, the automatically retrievable item ascertaining module 248 of the computing device 10\* ascertaining, in response to said determining by the transfer determining module 102\*, which of one or more items that are at least conditionally accessible through the computing device 10\* are automatically retrievable items that were entered by the first user 20 prior to said determining (e.g., within 5 minutes, 15 minutes, 1 hour, 2 hours, and so forth prior to said determining).

Figure 7A:
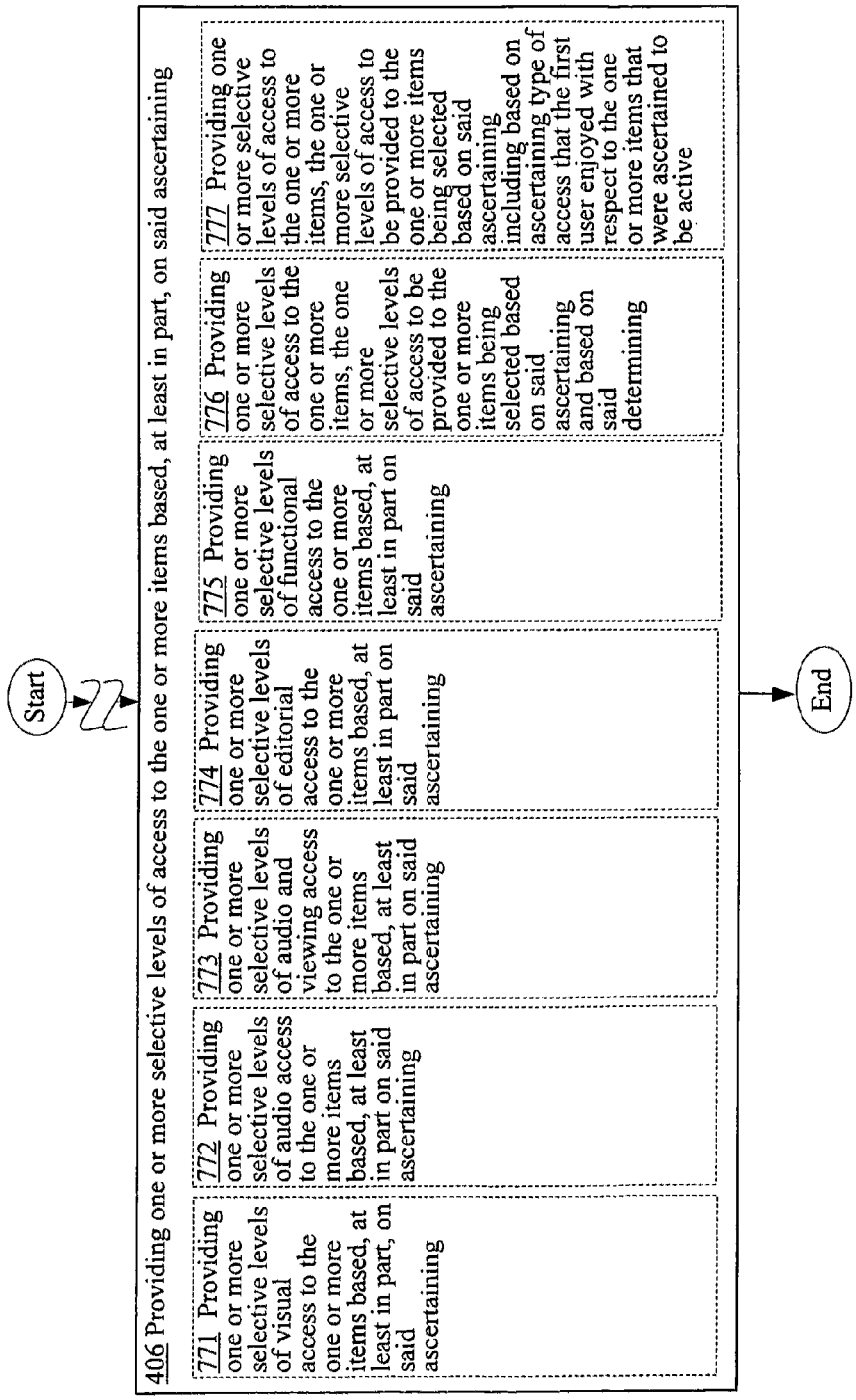
FIG. 7a is a high-level logic flowchart of a process depicting alternate implementations of the access providing operation 406 of FIG. 4.

Referring back to the access providing module 406 of FIG. 4, the access providing module 406 similar to the transfer determining operation 402 and the active ascertaining operation 404 of FIG. 4 may be executed in a number of different ways in various alternative embodiments as illustrated in FIGS. 7*a*, 7*b*, 7*c*, and 7*d*. In some implementations, for example, the access providing module 406 of FIG. 4 may include an operation 771 for providing one or more selective levels of visual access to the one or more items based, at least in part, on said ascertaining as illustrated in FIG. 7*a*. For instance, the visual access providing module 250 (see FIG. 2*e*) of the computing device 10\* providing (e.g., displaying) one or more selective levels of visual access (e.g., as provided through a display monitor or touchscreen) to the one or more items based, at least in part, on said ascertaining by the active ascertaining module 104\*.

As further illustrated in FIG. 7*a*, in some implementations, the access providing module 406 may additionally or alternatively include an operation 772 for providing one or more selective levels of audio access to the one or more items based, at least in part on said ascertaining. For instance, the audio access providing module 252 (see FIG. 2*e*) of the computing device 10\* providing one or more selective levels of audio access (e.g., as provided through one or more speakers) to the one or more items based, at least in part on said ascertaining by the active ascertaining module 104\*.

In some implementations, the access providing module 406 may include an operation 773 for providing one or more selective levels of audio and viewing access to the one or more items based, at least in part on said ascertaining. For instance, the visual access providing module 250 and the audio access providing module 252 of the computing device 10\* providing one or more selective levels of audio and viewing access to the one or more items based, at least in part on said ascertaining by the active ascertaining module 104\*.

In some implementations, the access providing module 406 may additionally or alternatively include an operation 774 for providing one or more selective levels of editorial access to the one or more items based, at least in part on said ascertaining. For instance, the editorial access providing module 254 (see FIG. 2*e*) of the computing device 10\* providing one or more selective levels of editorial access to the one or more items based, at least in part on said ascertaining by the active ascertaining module 104\*.

In some implementations, the access providing module 406 may additionally or alternatively include an operation 775 for providing one or more selective levels of functional access to the one or more items based, at least in part on said ascertaining. For instance, the functional access providing module 256 (see FIG. 2*e*) of the computing device 10\* providing one or more selective levels of functional access to the one or more items based, at least in part on said ascertaining by the active ascertaining module 104\*. For example, if the one or more items that access is to be provided to includes one or more applications (e.g., software applications), than providing varying degrees of access to the various functionalities available through such applications. As a further illustration, if the one or more items include an email application or a word processing application, access to functionalities of such applications may include, for example, access to a copying functionality, to a sending functionality, to a saving functionality, to editing functionality including deleting functionality, and so forth.

In some implementations, the access providing module 406 may additionally or alternatively include an operation 776 for providing one or more selective levels of access to the one or more items, the one or more selective levels of access to be provided to the one or more items being selected based on said ascertaining and based on said determining. For instance, the access providing module 106\*(e.g., the access providing module 106' of FIG. 2*a* or the access providing module 106" of FIG. 2*b*) of the computing device 10\* providing one or more selective levels of access to the one or more items, the one or more selective levels of access to be provided to the one or more items being selected based on said ascertaining by the active ascertaining module 104\* and based on said determining by the transfer determining module 102\*.

In some implementations, the access providing module 406 may additionally or alternatively include an operation 777 for providing one or more selective levels of access to the one or more items, the one or more selective levels of access to be provided to the one or more items being selected based on said ascertaining including based on ascertaining type of access that the first user enjoyed with respect to the one or more items that were ascertained to be active. For instance, the access providing module 106\* of the computing device 10\* providing one or more selective levels of access to the one or more items, the one or more selective levels of access to be provided to the one or more items being selected based on said ascertaining by the active ascertaining module 104\* including based on ascertaining by the active ascertaining module 104\* of type of access that the first user 20 enjoyed with respect to the one or more items that were ascertained to be active.

Turning now to FIG. 7*b*, in various implementations, the access providing operation 406 of FIG. 4 may involve an operation 778 for providing a plurality of selective levels of access to a plurality of items based, at least in part, on said ascertaining. For instance, the access providing module 106\* of the computing device 10\* providing (e.g., visually and/or audibly presenting) a plurality of selective levels (e.g., at least two levels) of access to a plurality of items (e.g., plurality of files and/or a plurality of applications) based, at least in part, on said ascertaining by the active ascertaining module 104\*.

As further illustrated in FIG. 7*b*, operation 778 may include one or more additional operations in various alternative implementations. For example, in various implementations, operation 778 may include an operation 779 for providing at least two selective levels of access to the plurality of items including at least a first level of access to a first one or more items and a second level of access to a second one or more items in response to said ascertaining, the first level of access being a greater extent of access than the second level of access. For instance, the access providing module 106\* of the computing device 10\* providing at least two selective levels of access to the plurality of items including at least a first level of access to a first one or more items (e.g., first one or more word email messages) and a second level of access to a second one or more items (e.g., second one or more email messages) in response to said ascertaining by the active ascertaining module 104\*, the first level of access (e.g., viewing access) being a greater extent of access than the second level of access (e.g., no viewing access).

In some implementations, operation 779 may include an operation 780 for providing the first level of access to the first one or more items and the second level of access to the second one or more items, the first one or more items being one or more items that were ascertained to be active and the second one or more items being one or more items that were ascertained not to be active. For instance, the access providing module 106\* of the computing device 10\* providing the first level of access to the first one or more items and the second level of access to the second one or more items, the first one or more items being one or more items that were ascertained by the active ascertaining module 104\* to be active (e.g., open or running) and the second one or more items being one or more items that were ascertained by the active ascertaining module 104\* not to be active (e.g., not open or not running).

In some implementations, operation 779 may include an operation 781 for providing the first level of access to the first one or more items and the second level of access to the second one or more items, the first one or more items including one or more items that are determined to be associated with one or more items that were ascertained to be active. For instance, the access providing module 106\* including an associated item determining module 260 (see FIG. 2*e*) of the computing device 10\* providing the first level of access to the first one or more items (e.g., audio and/or image files) and the second level of access to the second one or more items (e.g., audio and/or image files), the first one or more items including one or more items that are determined by the associated item determining module 260 to be associated with one or more items that were ascertained by the active ascertaining module 104\* to be active. As will be further described herein, there are a number of ways that one item could be associated with another item.

For example, in some implementations, operation 781 may include an operation 782 for providing the first level of access to the first one or more items and the second level of access to the second one or more items, the first one or more items including one or more items that are determined to be included in one or more folders that include the one or more items that were ascertained to be active. For example, the access providing module 106\* including the common folder item determining module 262 (see FIG. 2*e*) of the computing device 10\* providing the first level of access to the first one or more items (e.g., word processing or spreadsheet documents) and the second level of access to the second one or more items (e.g., word processing or spreadsheet documents), the first one or more items including one or more items that are determined by the common folder item determining module 262 to be included in one or more folders that include the one or more items that were ascertained by the active ascertaining module 104\* to be active. As a further illustration, suppose it is ascertained that a first image file (e.g., a digital photo) from a particular folder was active (e.g., being displayed) when the computing device 10\* was determined to have been transferred from the first user 20 to the second user 30, then at least viewing access may be provided to the first image file as well as to other image files that are determined to be included in the particular folder that includes the first image file. Further, in various implementations no viewing access may be provided to those image files that are determined by the common folder item determining module 262 to be not included in the particular folder.

In the same or different implementations, operation 781 may include an operation 783 for providing the first level of access to the first one or more items and the second level of access to the second one or more items, the first one or more items including one or more items that are determined to be the same type of items as the one or more items that were ascertained to be active. For example, the access providing module 106\* including the same type item determining module 264 (see FIG. 2*e*) of the computing device 10\* providing the first level of access to the first one or more items (image files) and the second level of access to the second one or more items (e.g., word processing files), the first one or more items including one or more items (e.g., image files) that are determined by the same type item determining module 264 to be the same type of items as the one or more items (e.g., image files) that were ascertained by the active ascertaining module 104\* to be active.

In the same or different implementations, operation 781 may include an operation 784 for providing the first level of access to the first one or more items and the second level of access to the second one or more items, the first one or more items including one or more items that are determined to be associated with one or more third party entities that are associated with the one or more items that were ascertained to be active. For example, the access providing module 106\* including the common third party entity association determining module 266 (see FIG. 2*e*) of the computing device 10\* providing the first level of access to the first one or more items and the second level of access to the second one or more items, the first one or more items including one or more items that are determined by the common third party entity association determining module 266 to be associated with one or more third party entities that are associated with the one or more items that were ascertained by the active ascertaining module 104\* to be active. As a further illustration, suppose a first email message from a particular company is ascertained to be active (e.g., open or being displayed) when the computing device 10* was determined to have been transferred from the first user 20 to the second user 30, then at least viewing access may be provided to the first email message as well as to any other email messages that are determined to be associated with (e.g., sent by) the particular company. Further, in various implementations no viewing access may be provided to those email messages that are determined by the common third party entity association determining module 266 not to be associated with the particular company.

In the same or different implementations, operation 781 may include an operation 785 for providing the first level of access to the first one or more items and the second level of access to the second one or more items, the first one or more items including one or more items that are determined to have been associated with one or more predefined time segments or points in time that are associated with the one or more items that were ascertained to be active. For example, the access providing module 106* including the common predefined time association determining module 268 (see FIG. 2e) of the computing device 10* providing the first level of access to the first one or more items (e.g., first one or more image files) and the second level of access to the second one or more items (e.g., second one or more image files), the first one or more items including one or more items that are determined by the common predefined time association determining module 268 to have been associated with one or more predefined time segments or points in time that are associated with the one or more items that were ascertained by the active ascertaining module 104* to be active. As a further illustration, suppose a first digital photo image taken on a particular day is ascertained to be active (e.g., open or being displayed) when the computing device 10* was determined to have been transferred from the first user 20 to the second user 30, then at least viewing access may be provided to the first digital photo image as well as to any other digital photo images that are determined to have been taken on the same day (or same week). Further, in various implementations no viewing access may be provided to those digital photo images that are determined by the common predefined time association determining module 268 not to be associated with one or more predefined time segments or points in time that are associated with the first digital photo image.

Figure 7C:
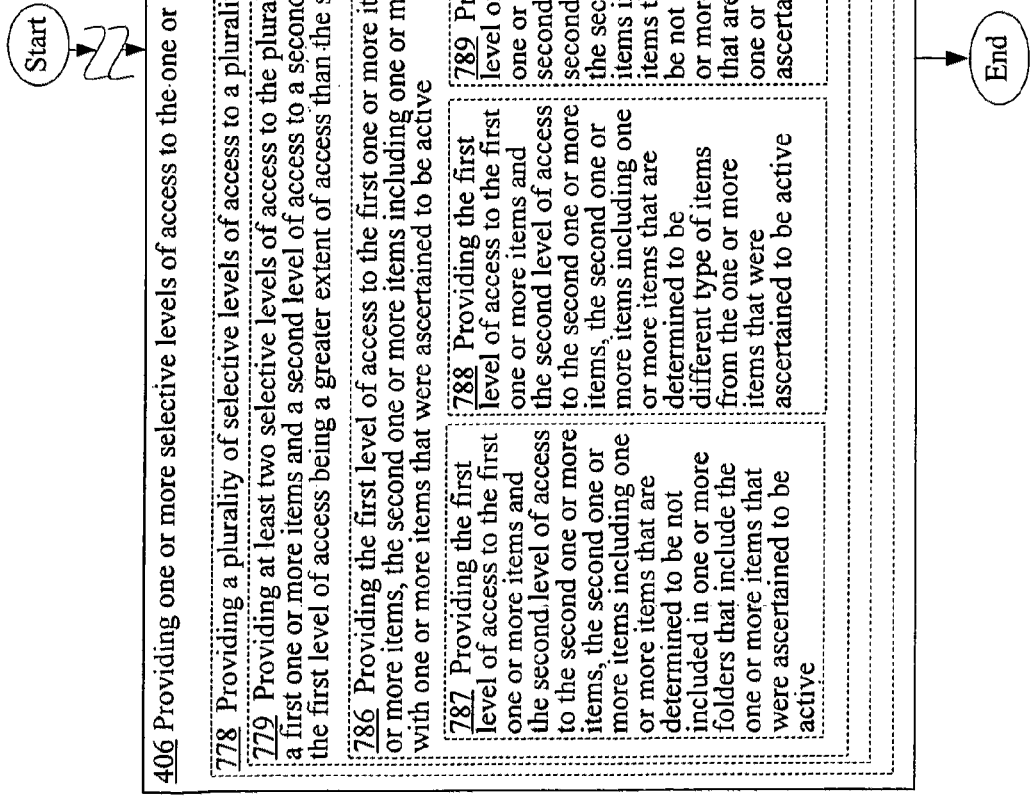
FIG. 7c is a high-level logic flowchart of a process depicting alternate implementations of the access providing operation 406 of FIG. 4.

Turning to FIG. 7c, in the some implementations, operation 779 for providing at least two selective levels of access to the plurality of items including at least a first level of access to a first one or more items and a second level of access to a second one or more items in response to said ascertaining, the first level of access being a greater extent of access than the second level of access may include an operation 786 for providing the first level of access to the first one or more items and the second level of access to the second one or more items, the second one or more items including one or more items that are determined to be not associated with one or more items that were ascertained to be active. For example, the access providing module 106* including the unassociated item determining module 270 (see FIG. 2e) of the computing device 10* providing the first level of access to the first one or more items and the second level of access to the second one or more items, the second one or more items including one or more items that are determined by the unassociated item determining module 270 to be not associated with one or more items that were ascertained by the active ascertaining module 104* to be active.

As further illustrated in FIG. 7c, operation 786 may further include an operation 787 for providing the first level of access to the first one or more items and the second level of access to the second one or more items, the second one or more items including one or more items that are determined to be not included in one or more folders that include the one or more items that were ascertained to be active. For example, the access providing module 106* including the folder excluded item determining module 272 (see FIG. 2e) of the computing device 10* providing the first level of access to the first one or more items and the second level of access to the second one or more items, the second one or more items including one or more items that are determined by the folder excluded item determining module 272 to be not included in one or more folders that include the one or more items that were ascertained by the active ascertaining module 104* to be active.

In the same or different implementations, operation 786 may include an operation 788 for providing the first level of access to the first one or more items and the second level of access to the second one or more items, the second one or more items including one or more items that are determined to be different type of items from the one or more items that were ascertained to be active. For example, the access providing module 106* including the different type item determining module 274 (see FIG. 2e) of the computing device 10* providing the first level of access to the first one or more items and the second level of access to the second one or more items, the second one or more items including one or more items (e.g., image files) that are determined by the different type item determining module 274 to be different type of items from the one or more items (e.g., email messages) that were ascertained by the active ascertaining module 104* to be active (e.g., being open or displayed).

In the same or different implementations, operation 786 may include an operation 789 for providing the first level of access to the first one or more items and the second level of access to the second one or more items, the second one or more items including one or more items that are determined to be not associated with one or more third party entities that are associated with the one or more items that were ascertained to be active. For example, the access providing module 106* including the third party entity unassociated item determining module 276 (see FIG. 2e) of the computing device 10* providing the first level of access to the first one or more items and the second level of access to the second one or more items, the second one or more items including one or more items that are determined by the third party entity unassociated item determining module 276 to be not associated with one or more third party entities that are associated with the one or more items that were ascertained by the active ascertaining module 104* to be active.

In the same or different implementations, operation 786 may include an operation 790 for providing the first level of access to the first one or more items and the second level of access to the second one or more items, the first one or more items including one or more items that are determined to have not been associated with one or more predefined time segments or points in time that are associated with the one or more items that were ascertained to be active. For example, the access providing module 106* including the predefined time unassociated item determining module 278 (see FIG. 2e) of the computing device 10* providing the first level of access to the first one or more items and the second level of access to the second one or more items, the first one or more items including one or more items that are determined by the predefined time unassociated item determining module 278 to have not been associated with one or more predefined time segments or points in time that are associated with the one or more items that were ascertained by the active ascertaining module 104* to be active.

Figure 7D:
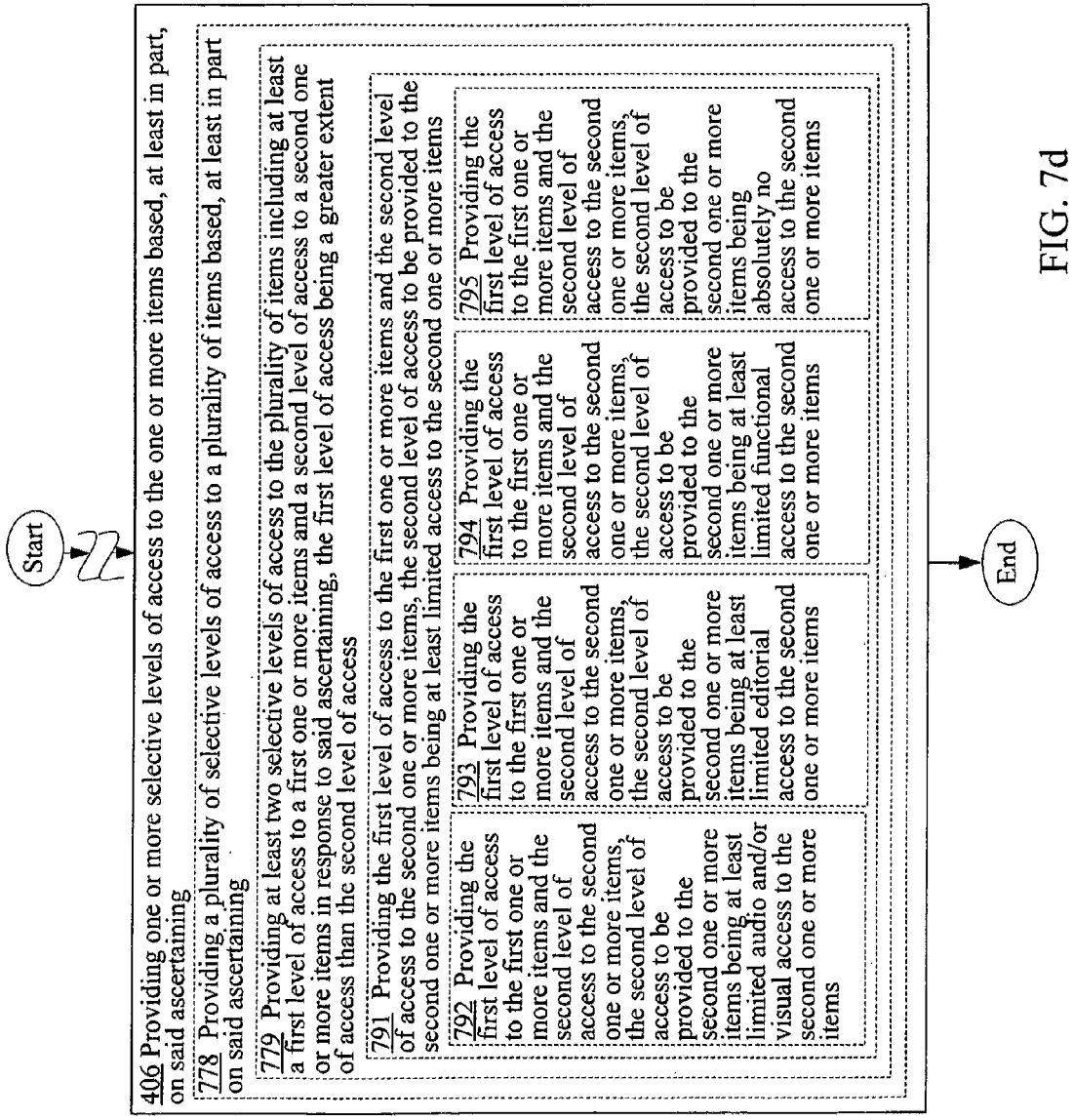
FIG. 7d is a high-level logic flowchart of a process depicting alternate implementations of the access providing operation 406 of FIG. 4.

Referring now to FIG. 7d, in some implementations, the operation 779 for providing at least two selective levels of access to the plurality of items including at least a first level of access to a first one or more items and a second level of access to a second one or more items in response to said ascertaining, the first level of access being a greater extent of access than the second level of access may include an operation 791 for providing the first level of access to the first one or more items and the second level of access to the second one or more items, the second level of access to be provided to the second one or more items being at least limited access to the second one or more items. For example, the access providing module 106* of the computing device 10* providing the first level of access to the first one or more items and the second level of access to the second one or more items, the second level of access to be provided to the second one or more items being at least limited access (e.g., partial or no functional and/or editorial access) to the second one or more items (e.g., word processing documents).

As further illustrated in FIG. 7d, operation 791 may include one or more additional operations in various alternative implementations. For example, in some implementations, operation 791 may include an operation 792 for providing the first level of access to the first one or more items and the second level of access to the second one or more items, the second level of access to be provided to the second one or more items being at least limited audio and/or visual access to the second one or more items. For instance, the access providing module 106* including the visual access providing module 250 and/or the audio access providing module 252 of the computing device 10* providing the first level of access to the first one or more items and the second level of access to the second one or more items, the second level of access to be provided to the second one or more items being at least limited audio and/or visual access (e.g., partial or no audio and/or visual access) to the second one or more items as provided by the visual access providing module 250 and/or by the audio access providing module 252.

In some implementations, operation 791 may include an operation 793 for providing the first level of access to the first one or more items and the second level of access to the second one or more items, the second level of access to be provided to the second one or more items being at least limited editorial access to the second one or more items. For instance, the access providing module 106* including the editorial access providing module 254 of the computing device 10* providing the first level of access to the first one or more items and the second level of access to the second one or more items, the second level of access to be provided by the editorial access providing module 254 to the second one or more items being at least limited editorial access to the second one or more items.

In some implementations, operation 791 may include an operation 794 for providing the first level of access to the first one or more items and the second level of access to the second one or more items, the second level of access to be provided to the second one or more items being at least limited functional access to the second one or more items. For instance, the access providing module 106* including the functional access providing module 256 of the computing device 10* providing the first level of access to the first one or more items and the second level of access to the second one or more items, the second level of access to be provided by the functional access providing module 256 to the second one or more items being at least limited functional access to the second one or more items.

In some implementations, operation 791 may include an operation 795 for providing the first level of access to the first one or more items and the second level of access to the second one or more items, the second level of access to be provided to the second one or more items being absolutely no access to the second one or more items. For instance, the access providing module 106* of the computing device 10* providing the first level of access to the first one or more items and the second level of access to the second one or more items, the second level of access to be provided to the second one or more items being absolutely no access to the second one or more items. For example, not even providing any indication of existence of the second one or more items.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, alone, alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, alone, alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:
    a transfer determining module configured to determine that a computing device used by a first user has been transferred from the first user to a second user, the transfer determining module including at least:
        a transfer determining module including a visual cue detecting module configured to determine that the computing device has been transferred from the first user to the second user when the visual cue detecting module at least detects presence or absence of one or more visual cues in proximate vicinity of the computing device that when detected implies transfer of the computing device between two users, the transfer determining module including a visual cue detecting module including at least:
            a visual cue detecting module including a face detecting module configured to detect presence or absence of one or more visual cues in the proximate vicinity of the computing device when the face detecting module at least detects presence of a first face associated with the first user and a second face associated with the second user in the proximate vicinity of the computing device, the second face being detected as being closer to the computing device than the first face;
    an active ascertaining module configured to ascertain, responsive, at least in part, to said transfer determining module, which of one or more items that are at least conditionally accessible through the computing device are active; and
    an access providing module configured to provide one or more selective levels of access to the one or more items responsive, at least in part, to said active ascertaining module; and
    wherein at least one of the transfer determining module configured to determine that a computing device used by a first user has been transferred from the first user to a second user, the active ascertaining module, or the access providing module is implemented at least in part with one or more processing devices.

2. The system of claim 1, wherein said transfer determining module comprises:
    a transfer determining module including a particular movement detecting module configured to determine that the computing device has been transferred from the first user to the second user when the particular movement detecting module at least detects that the computing device has moved in a particular manner that upon being detected as occurring at least implies that the computing device has been transferred between at least two users.

3. The system of claim 2, wherein said transfer determining module including a particular movement detecting module comprises:
    a particular movement detecting module including the moving away detecting module configured to detect that the computing device has moved in the particular manner when the moving away detecting module at least detects that the computing device has moved away from the first user.

4. The system of claim 2, wherein said transfer determining module including a particular movement detecting module comprises:
    a particular movement detecting module including a vibration detecting module configured to detect that the computing device has moved in the particular manner when the vibration detecting module at least detects that the computing device is no longer vibrating in a manner that matches with a vibration pattern that the computing device was detected having during use of the computing device by the first user.

5. The system of claim 2, wherein said transfer determining module including a particular movement detecting module comprises:
    a particular movement detecting module including a three-dimensional movement detecting module configured to detect that the computing device has moved in the particular manner when the three-dimensional movement detecting module at least detects that the computing device has moved in a particular three-dimensional movement that implies that the computing device has been transferred from the first user to the second user.

6. The system of claim 1, wherein said transfer determining module including a visual cue detecting module comprises:
    a visual cue detecting module including a lighting change detecting module configured to detect presence or absence of one or more visual cues in the proximate vicinity of the computing device when the lighting change detecting module detects at least a change in lighting in the proximate vicinity of the computing device that implies that the computing device has at least moved.

7. The system of claim 1, wherein said transfer determining module including a visual cue detecting module comprises:
    a transfer determining module including a face detecting module configured to determine that the computing device has been transferred from the first user to the second user when the face detecting module at least detects presence of at least one face in the proximate vicinity of the computing device not associated with the first user.

8. The system of claim 1, wherein said transfer determining module including a visual cue detecting module comprises:
    a visual cue detecting module including an eye detecting module configured to detect presence or absence of one or more visual cues in the proximate vicinity of the computing device when the eye detecting module detects presence of at least one eye in the proximate vicinity of the computing device not associated with the first user.

9. The system of claim 8, wherein said visual cue detecting module including an eye detecting module comprises:
    an eye detecting module configured to detect presence of at least one eye in the proximate vicinity of the computing device not associated with the first user by at least detecting presence of at least one eye in the proximate vicinity of the computing device that is recognized as being associated with the second user.

10. The system of claim 1, wherein said transfer determining module including a visual cue detecting module comprises:
a visual cue detecting module configured to detect presence or absence of one or more visual cues in the proximate vicinity of the computing device by at least detecting absence of a visual cue associated with the first user in the proximate vicinity of the computing device for at least a predefined period of time, the absence of the visual cue for at least a predefined period of time being indicative of the first user not being in the proximate vicinity of the computing device.

11. The system of claim 1, wherein said transfer determining module comprises:
a transfer determining module including an audio cue detecting module configured to determine that the computing device has been transferred from the first user to the second user when the audio cue detecting module at least detects presence or absence of one or more audio cues in proximate vicinity of the computing device that when detected implies transfer of the computing device between two users.

12. The system of claim 11, wherein said transfer determining module including an audio cue detecting module comprises:
an audio cue detecting module including a voice pattern detecting module configured to detect presence or absence of one or more audio cues in the proximate vicinity of the computing device when the voice pattern detecting module at least detects presence of at least one audio voice pattern not associated with the first user in the proximate vicinity of the computing device.

13. The system of claim 12, wherein said audio cue detecting module including a voice pattern detecting module comprises:
a voice pattern detecting module configured to detect presence of at least one audio voice pattern not associated with the first user in the proximate vicinity of the computing device by at least detecting presence of at least one audio voice pattern that is recognized as being associated with the second user in the proximate vicinity of the computing device.

14. The system of claim 1, wherein said transfer determining module comprises:
a transfer determining module including a geographic location determination module configured to determine that a computing device used by a first user has been transferred from the first user to a second user, the determination being initiated in response to geographic location of the computing device as determined by the geographic location determination module.

15. The system of claim 1, wherein said active ascertaining module comprises:
an active electronic file detecting module configured to detect, in response to said determining by the transfer determining module, which one or more electronic files that are at least conditionally accessible through the computing device are active.

16. The system of claim 1, wherein said active ascertaining module comprises:
an active application detecting module configured to detect, in response to said determining by the transfer determining module, which one or more applications that are at least conditionally accessible through the computing device are active.

17. The system of claim 1, wherein said active ascertaining module comprises:
an active password detecting module configured to detect, in response to said determining by the transfer determining module, which one or more passwords that are at least conditionally accessible through the computing device are active.

18. The system of claim 1, wherein said active ascertaining module comprises:
an active website detecting module configured to detect, in response to said determining by the transfer determining module, which one or more websites that are at least conditionally accessible through the computing device are active.

19. The system of claim 1, wherein said active ascertaining module comprises:
an active ascertaining module configured to ascertain, in response to said determining by the transfer determining module, which of one or more items that were accessible through the computing device when the computing device was being used by the first user are active.

20. The system of claim 1, wherein said active ascertaining module comprises:
an open item ascertaining module configured to ascertain, in response to said determining by the transfer determining module, which of one or more items that are at least conditionally accessible through the computing device are open.

21. The system of claim 20, wherein said open item ascertaining module comprises:
an open item ascertaining module configured to ascertain, in response to said determining by the transfer determining module, which of one or more items that are at least conditionally accessible through the computing device are open items that have been opened by the first user.

22. The system of claim 1, wherein said active ascertaining module comprises:
a running item ascertaining module configured to ascertain, in response to said determining by the transfer determining module, which of one or more items that are at least conditionally accessible through the computing device are running.

23. The system of claim 22, wherein said running item ascertaining module comprises:
a running item ascertaining module configured to ascertain, in response to said determining by the transfer determining module, which of one or more items that are at least conditionally accessible through the computing device are running items that were being run by the first user.

24. The system of claim 1, wherein said active ascertaining module comprises:
an automatically retrievable item ascertaining module configured to ascertain, in response to said determining by the transfer determining module, which of one or more items that are at least conditionally accessible through the computing device are automatically retrievable.

25. The system of claim 1, wherein said access providing module comprises:
a visual access providing module and an audio access providing module configured to provide one or more selective levels of audio and viewing access to the one or more items based, at least in part on said ascertaining by the active ascertaining module.

26. The system of claim 1, wherein said access providing module comprises:

an editorial access providing module configured to provide one or more selective levels of editorial access to the one or more items based, at least in part on said ascertaining by the active ascertaining module.

27. The system of claim 1, wherein said access providing module comprises:
a functional access providing module configured to provide one or more selective levels of functional access to the one or more items based, at least in part on said ascertaining by the active ascertaining module.

28. The system of claim 1, wherein said access providing module comprises:
an access providing module configured to provide one or more selective levels of access to the one or more items, the one or more selective levels of access to be provided to the one or more items being selected based at least in part on said ascertaining by the active ascertaining module and based at least in part on said determining by the transfer determining module.

29. The system of claim 1, wherein said access providing module comprises:
an access providing module configured to provide one or more selective levels of access to the one or more items, the one or more selective levels of access to be provided to the one or more items being selected based at least in part on type of access that the first user enjoyed with respect to the one or more items that were ascertained to be active.

30. The system of claim 1, wherein said access providing module comprises:
an access providing module configured to provide a plurality of selective levels of access to a plurality of items based, at least in part, on said ascertaining by the active ascertaining module.

31. The system of claim 30, wherein said access providing module comprises:
an access providing module configured to provide at least two selective levels of access to the plurality of items including at least a first level of access to a first one or more items and a second level of access to a second one or more items in response to said ascertaining by the active ascertaining module, the first level of access being a greater extent of access than the second level of access.

32. The system of claim 31, wherein said access providing module comprises:
an access providing module configured to provide the first level of access to the first one or more items and the second level of access to the second one or more items, the first one or more items being one or more items that were ascertained by the active ascertaining module to be active and the second one or more items being one or more items that were ascertained by the active ascertaining module not to be active.

33. The system of claim 31, wherein said access providing module comprises:
an access providing module including an associated item determining module configured to provide the first level of access to the first one or more items and the second level of access to the second one or more items, the first one or more items including one or more items that are determined by the associated item determining module to be associated with one or more items that were ascertained by the active ascertaining module to be active.

34. The system of claim 33, wherein said access providing module including an associated item determining module comprises:

an access providing module including a common folder item determining module configured to provide the first level of access to the first one or more items and the second level of access to the second one or more items, the first one or more items including one or more items that are determined by the common folder item determining module to be included in one or more folders that include the one or more items that were ascertained by the active ascertaining module to be active.

35. The system of claim 33, wherein said access providing module including an associated item determining module comprises:
an access providing module including a same type item determining module configured to provide the first level of access to the first one or more items and the second level of access to the second one or more items, the first one or more items including one or more items that are determined by the same type item determining module to be the same type of items as the one or more items that were ascertained by the active ascertaining module to be active.

36. The system of claim 33, wherein said access providing module including an associated item determining module comprises:
an access providing module including a common third party entity association determining module configured to provide the first level of access to the first one or more items and the second level of access to the second one or more items, the first one or more items including one or more items that are determined by the common third party entity association determining module to be associated with one or more third party entities that are associated with the one or more items that were ascertained by the active ascertaining module to be active.

37. The system of claim 33, wherein said access providing module including an associated item determining module comprises:
an access providing module including a common predefined time association determining module configured to provide the first level of access to the first one or more items and the second level of access to the second one or more items, the first one or more items including one or more items that are determined by the common predefined time association determining module to have been associated with at least one of predefined time segments or points in time that are associated with the one or more items that were ascertained by the active ascertaining module to be active.

38. The system of claim 31, wherein said access providing module comprises:
an access providing module including an unassociated item determining module configured to provide the first level of access to the first one or more items and the second level of access to the second one or more items, the second one or more items including one or more items that are determined by the unassociated item determining module to be not associated with one or more items that were ascertained by the active ascertaining module to be active.

39. The system of claim 38, wherein said access providing module including an unassociated item determining module comprises:
an access providing module including a folder excluded item determining module configured to provide the first level of access to the first one or more items and the second level of access to the second one or more items, the second one or more items including one or more items that are determined by the folder excluded item determining module to be not included in one or more folders that include the one or more items that were ascertained by the active ascertaining module to be active.

40. The system of claim 38, wherein said access providing module including an unassociated item determining module comprises:
an access providing module including a different type item determining module configured to provide the first level of access to the first one or more items and the second level of access to the second one or more items, the second one or more items including one or more items that are determined by the different type item determining module to be different type of items from the one or more items that were ascertained by the active ascertaining module to be active.

41. The system of claim 38, wherein said access providing module including an unassociated item determining module comprises:
an access providing module including a third party entity unassociated item determining module configured to provide the first level of access to the first one or more items and the second level of access to the second one or more items, the second one or more items including one or more items that are determined by the third party entity unassociated item determining module to be not associated with one or more third party entities that are associated with the one or more items that were ascertained by the active ascertaining module to be active.

42. The system of claim 38, wherein said access providing module including an unassociated item determining module comprises:
an access providing module including a predefined time unassociated item determining module configured to provide the first level of access to the first one or more items and the second level of access to the second one or more items, the first one or more items including one or more items that are determined by the predefined time unassociated item determining module to have not been associated with at least one of predefined time segments or points in time that are associated with the one or more items that were ascertained by the active ascertaining module to be active.

43. The system of claim 31, wherein said access providing module comprises:
an access providing module configured to provide the first level of access to the first one or more items and the second level of access to the second one or more items, the second level of access to be provided to the second one or more items being at least limited access to the second one or more items.

44. A computationally-implemented system, comprising:
circuitry for determining that a computing device used by a first user has been transferred from the first user to a second user, the circuitry for determining including at least:
circuitry for determining that the computing device has been transferred from the first user to the second user based at least in part on a detection of a presence or absence of one or more visual cues in proximate vicinity of the computing device that when detected implies transfer of the computing device between two users, the circuitry for determining that the computing device has been transferred from the first user to the second user including at least:
circuitry for detecting a presence or an absence of one or more visual cues in the proximate vicinity of the computing device based at least in part on a detection of a presence of a first face associated with the first user and a second face associated with the second user in the proximate vicinity of the computing device, the second face being detected as being closer to the computing device than the first face;
circuitry for ascertaining, responsive, at least in part, to said circuitry for determining that a computing device used by a first user has been transferred from the first user to a second user, which of one or more items that are at least conditionally accessible through the computing device are active; and
circuitry for providing one or more selective levels of access to the one or more items responsive, at least in part, to said circuitry for ascertaining.

45. An article of manufacture, comprising:
a non-transitory storage medium bearing at least:
one or more instructions for determining that a computing device used by a first user has been transferred from the first user to a second user, the one or more instructions for determining including at least:
one or more instructions for determining that the computing device has been transferred from the first user to the second user based at least in part on a detection that the computing device has moved in a particular manner that upon being detected as occurring at least implies that the computing device has been transferred between at least two users, the one or more instructions for determining that the computing device has been transferred from the first user to the second user including at least:
one or more instructions for detecting that the computing device has moved in the particular manner based at least in part on a detection that the computing device is no longer vibrating in a manner that matches with a vibration pattern that the computing device was detected having during use of the computing device by the first user;
one or more instructions for ascertaining, in response to said determining, which of one or more items that are at least conditionally accessible through the computing device are active; and
one or more instructions for providing one or more selective levels of access to the one or more items based, at least in part, on said ascertaining.

46. The system of claim 1, wherein said visual cue detecting module including a face detecting module configured to detect presence or absence of one or more visual cues in the proximate vicinity of the computing device when the face detecting module at least detects presence of a first face associated with the first user and a second face associated with the second user in the proximate vicinity of the computing device, the second face being detected as being closer to the computing device than the first face comprises:
a face detecting module configured to detect the presence of the first face associated with the first user and the second face associated with the second user during a hand-off of the computing device from the first user to the second user, the hand-off consuming a finite period of time.

47. The system of claim 46, wherein the face detecting module configured to detect the presence of the first face associated with the first user and the second face associated with the second user during a hand-off of the computing device from the first user to the second user, the hand-off consuming a finite period of time comprises:

a face detecting module configured to detect the first face at a first time associated with the hand-off of the computing device from the first user to the second user and to detect the second face at a second time associated with the hand-off of the computing device from the first user to the second user, the second time being later in time than the first time.

\* \* \* \* \*